US012693399B2

(12) United States Patent　　　　(10) Patent No.: US 12,693,399 B2
Ibrahim et al.　　　　　　　　　　　(45) Date of Patent: Jul. 28, 2026

(54) SYSTEMS AND METHODS FOR MEASUREMENT INTEGRATION AND ACCURATE DIGITAL TWIN CREATION

(71) Applicant: LocationDAS INC., Falls Church, VA (US)

(72) Inventors: Ahmed Sallam Mohamed Ibrahim, New Cairo (EG); Ahmed Magdy Mohamed Mohamed Aransa, Port Said (EG)

(73) Assignee: LocationDAS INC., Falls Church, VA (US)

( * ) Notice: Subject to any disclaimer, the term of this patent is extended or adjusted under 35 U.S.C. 154(b) by 221 days.

(21) Appl. No.: 18/600,534

(22) Filed: Mar. 8, 2024

(65) Prior Publication Data

US 2024/0302516 A1　　Sep. 12, 2024

Related U.S. Application Data

(60) Provisional application No. 63/489,166, filed on Mar. 8, 2023.

(51) Int. Cl.
　　*G01S 13/42*　　　(2006.01)
　　*G01S 13/62*　　　(2006.01)
　　(Continued)

(52) U.S. Cl.
　　CPC .............. *G01S 13/42* (2013.01); *G01S 13/62* (2013.01); *H04W 16/18* (2013.01); *H04W 64/00* (2013.01)

(58) Field of Classification Search
None
See application file for complete search history.

(56) References Cited

U.S. PATENT DOCUMENTS 4,916,460 A * 4/1990 Powell ................. H01Q 3/2676
　　　　　　　　　　　　　　　　　　　　398/115
5,280,472 A　1/1994 Gilhousen et al.
　　　　　　　(Continued)

FOREIGN PATENT DOCUMENTS

CN　　　106060782 A　10/2016
EP　　　3091367 A1　11/2016
　　　　　　(Continued)

OTHER PUBLICATIONS

Ibrahim, Ahmed Sallam Mohamed, A Study of DAS Delays and Their Impact on the Wireless Channels with Application to Indoor Localization, Thesis/Dissertation Collections, Aug. 2015, 99 pages, Rochester Institute of Technology, RIT Scholar Works, Dubai, Access from https://scholarworks.rit.edu/theses/8872.
(Continued)

*Primary Examiner* — Bernarr E Gregory
(74) *Attorney, Agent, or Firm* — Aka Chan LLP

(57) ABSTRACT

Capturing, presenting parameters related to and affecting physical systems to generate a digital twin that helps in operating, maintaining, monitoring, upgrading systems to deliver the desired operational results, such as for distributed antenna systems and in-building systems. Systems, methods are for seamless measurement collection, analysis, and integration with design software to create and maintaining exact as-built digital twins and capturing deviation of deployed systems from designs. Facilitate determining positioning using distributed antenna system with service availability monitoring. Positioning methods include network-based methods, handset-assisted methods in addition to a monitoring system to report any service outage and possible location information loss. Combined monitoring system that monitors antenna output power for mobile coverage and service availability helps also in monitoring the availability of the localization system and dynamic update of lookup (Continued)

FUNCTION OF THE DAS DELAY CONTROLLER
- PERIODICALLY / CONTINUOUSLY MONITOR THE PREDEFINED DAS CABLE LENGTHS
- MAINTAIN THE PREDEFINED SETTINGS AGAINST UNCONTROLLED CHANGES SUCH AS CABLE CHANGES AND CABLE SWAPS
- ALARM AND NOTIFICATION OF CHANGES ON CONNECTED CABLE LENGTHS
- CABLE TYPES CAN BE FIBER OR COAXIAL CABLE
LEGEND
1 RF SIGNAL SOURCE, BTS, LTE eNodeB, ETC.
2 DAS HEAD AND EQUIPMENT AND HUBS
3 DUPLEX CABLE PAIRS (2 CORE FOR UPLINK AND DOWNLINK COMMUNICATION)
4 CHANNEL CONTROLLER. EXTERNAL OR INTEGRATED WITH DAS HEAD END (FIRST STAGE)
5 DAS
6 CHANNEL CONTROLLER. EXTERNAL OR INTEGRATED WITH DAS HUB (2 ND STAGE)
7 DUPLEX CABLE PAIR OR ANY OTHER MEDIUM OF TRANSMISSION IMPLEMENTED IN DAS HUB (COAXIAL, TWISTED PAIR, ETC)
8 DAS RF REMOTE UNIT CONNECTED TO DAS HUB
9 DAS ANTENNA CONNECTED TO REMOTE UNIT USING COAXIAL CABLE.
10 DAS RF REMOTE CONNECTED DIRECTLY TO FIRST CONTROLLER
11 COAXIAL CABLES information. Monitoring system provides asset tracking, service analytics features for active or passive distributed antenna system.

19 Claims, 34 Drawing Sheets

(51) Int. Cl.

| | | |
|---|---|---|
| *H04W 16/18* | (2009.01) | |
| *H04W 64/00* | (2009.01) | |

(56) References Cited

U.S. PATENT DOCUMENTS

| | | | |
|---|---|---|---|
| 5,513,176 | A | 4/1996 | Dean et al. |
| 5,805,983 | A * | 9/1998 | Naidu ...................... H01Q 3/26 |
| | | | 455/503 |
| 6,236,365 | B1 | 5/2001 | LeBlanc et al. |
| 6,873,827 | B1 | 3/2005 | Wright |
| 7,218,275 | B2 | 5/2007 | Han |
| 8,428,584 | B2 | 4/2013 | Buckley et al. |
| 8,818,410 | B2 * | 8/2014 | Albanes ................ H04W 64/00 |
| | | | 455/456.2 |
| 8,848,643 | B2 | 9/2014 | Chung et al. |
| 8,983,301 | B2 | 3/2015 | Baker et al. |
| 9,001,811 | B2 | 4/2015 | Wala et al. |
| 9,158,864 | B2 | 10/2015 | Berlin et al. |
| 9,185,674 | B2 | 11/2015 | Sauer |
| 9,590,733 | B2 | 3/2017 | George et al. |
| 9,651,653 | B2 | 5/2017 | Fischer et al. |
| 10,966,055 | B1 | 3/2021 | Ibrahim |
| 11,671,792 | B1 * | 6/2023 | Ibrahim ................ H04B 7/0413 |
| | | | 455/456.1 |
| 12,192,853 | B1 * | 1/2025 | Ibrahim ................ H04B 7/0671 |
| 2002/0115448 | A1 | 8/2002 | Amerga et al. |
| 2003/0045284 | A1 * | 3/2003 | Copley .............. H04W 88/085 |
| | | | 455/448 |
| 2003/0125045 | A1 | 7/2003 | Riley et al. |
| 2003/0162550 | A1 | 8/2003 | Kuwahara et al. |
| 2005/0046458 | A1 | 3/2005 | Schroeder et al. |
| 2006/0246899 | A1 | 11/2006 | Buckley et al. |
| 2007/0004404 | A1 | 1/2007 | Buckley et al. |
| 2008/0192855 | A1 | 8/2008 | Shapira et al. |
| 2009/0131073 | A1 | 5/2009 | Carlson et al. |
| 2011/0009056 | A1 | 1/2011 | Hanson et al. |

| | | | |
|---|---|---|---|
| 2012/0189074 | A1 | 7/2012 | Jin et al. |
| 2012/0322366 | A1 | 12/2012 | Davies |
| 2013/0023285 | A1 | 1/2013 | Markhovsky et al. |
| 2013/0143598 | A1 | 6/2013 | Srinivasan et al. |
| 2013/0281125 | A1 | 10/2013 | Schmidt |
| 2014/0004874 | A1 | 1/2014 | Schwartz et al. |
| 2014/0112667 | A1 | 4/2014 | Neukirch et al. |
| 2014/0329546 | A1 * | 11/2014 | Albanes ................ H04W 64/00 |
| | | | 455/456.3 |
| 2015/0087329 | A1 | 3/2015 | Stratford et al. |
| 2015/0163634 | A1 | 6/2015 | Meredith et al. |
| 2015/0244562 | A1 | 8/2015 | Hanson et al. |
| 2016/0242044 | A1 | 8/2016 | Han et al. |
| 2017/0164323 | A1 | 6/2017 | Markhovsky et al. |

FOREIGN PATENT DOCUMENTS

| | | | |
|---|---|---|---|
| WO | 2005103753 | A1 | 11/2005 |
| WO | 2006076600 | A1 | 7/2006 |
| WO | 2011123336 | A1 | 10/2011 |
| WO | 2015102713 | A2 | 7/2015 |

OTHER PUBLICATIONS

Tong et al., Indoor Distributed Antenna Experiments, 2005, 5 pages.

Yanikomeroglu et al., CDMA Distributed Antenna System for Indoor Wireless Communications, Conference, 1993, 5 pages, Department of Electrical and Computer Engineering, Univeristy of Toronto, Toronto, Canada.

Sudhakar et al., Design of Distributed Antenna System Deployment for 2100 Mhz, International Journal of Innovative Research in Science, Engineering and Technology, Apr. 2014, pp. 312-318, vol. 3, Special Issue 4, www.ijirset.com, Ahmednagar, Maharastra, India.

3rd Generation Partnership Project, 3rd Generation Partnership Project; Technical Specification Group Radio Access Network; NG Radio Access Network (NG-RAN); Stage 2 functional specification of User Equipment (UE) positioning in NG-RAN (Release 15), Technical Specification, Sep. 2018, 63 pages, 3GPP TS 38.305, V15.1.0, Release 15, Valbonne, France.

PCT International Application PCT/US2024/019254 International Preliminary Report on Patentability dated Sep. 9, 2025, 5 pages.

PCT International Application PCT/US2024/019254 International Search Report and the Written Opinion of the International Searching Authority dated Aug. 11, 2024, 7 pages.

* cited by examiner

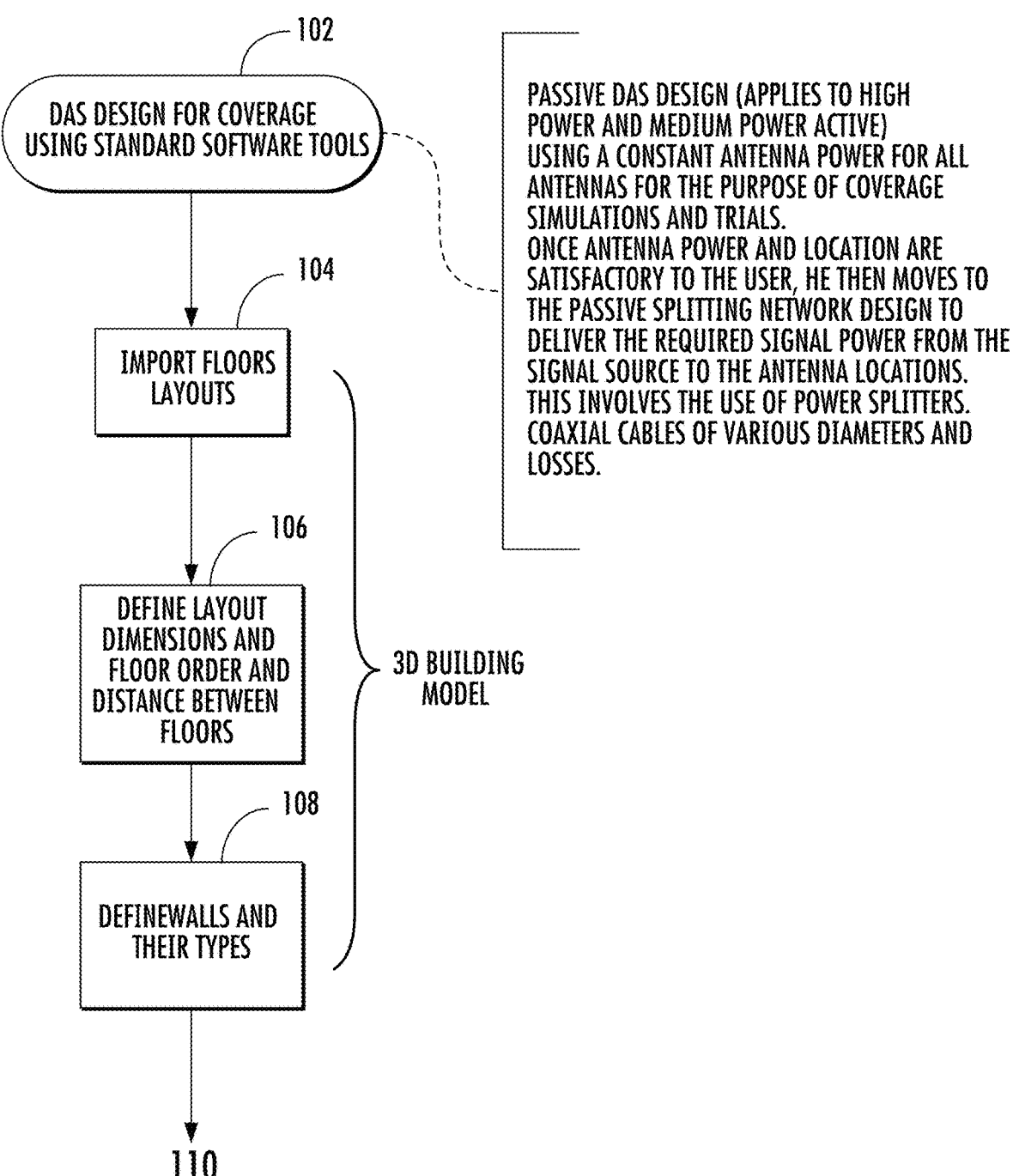

102

DAS DESIGN FOR COVERAGE
USING STANDARD SOFTWARE TOOLS

PASSIVE DAS DESIGN (APPLIES TO HIGH
POWER AND MEDIUM POWER ACTIVE)
USING A CONSTANT ANTENNA POWER FOR ALL
ANTENNAS FOR THE PURPOSE OF COVERAGE
SIMULATIONS AND TRIALS.
ONCE ANTENNA POWER AND LOCATION ARE
SATISFACTORY TO THE USER, HE THEN MOVES TO
THE PASSIVE SPLITTING NETWORK DESIGN TO
DELIVER THE REQUIRED SIGNAL POWER FROM THE
SIGNAL SOURCE TO THE ANTENNA LOCATIONS.
THIS INVOLVES THE USE OF POWER SPLITTERS.
COAXIAL CABLES OF VARIOUS DIAMETERS AND
LOSSES.

104

IMPORT FLOORS
LAYOUTS

106

DEFINE LAYOUT
DIMENSIONS AND
FLOOR ORDER AND
DISTANCE BETWEEN
FLOORS

3D BUILDING
MODEL

108

DEFINEWALLS AND
THEIR TYPES

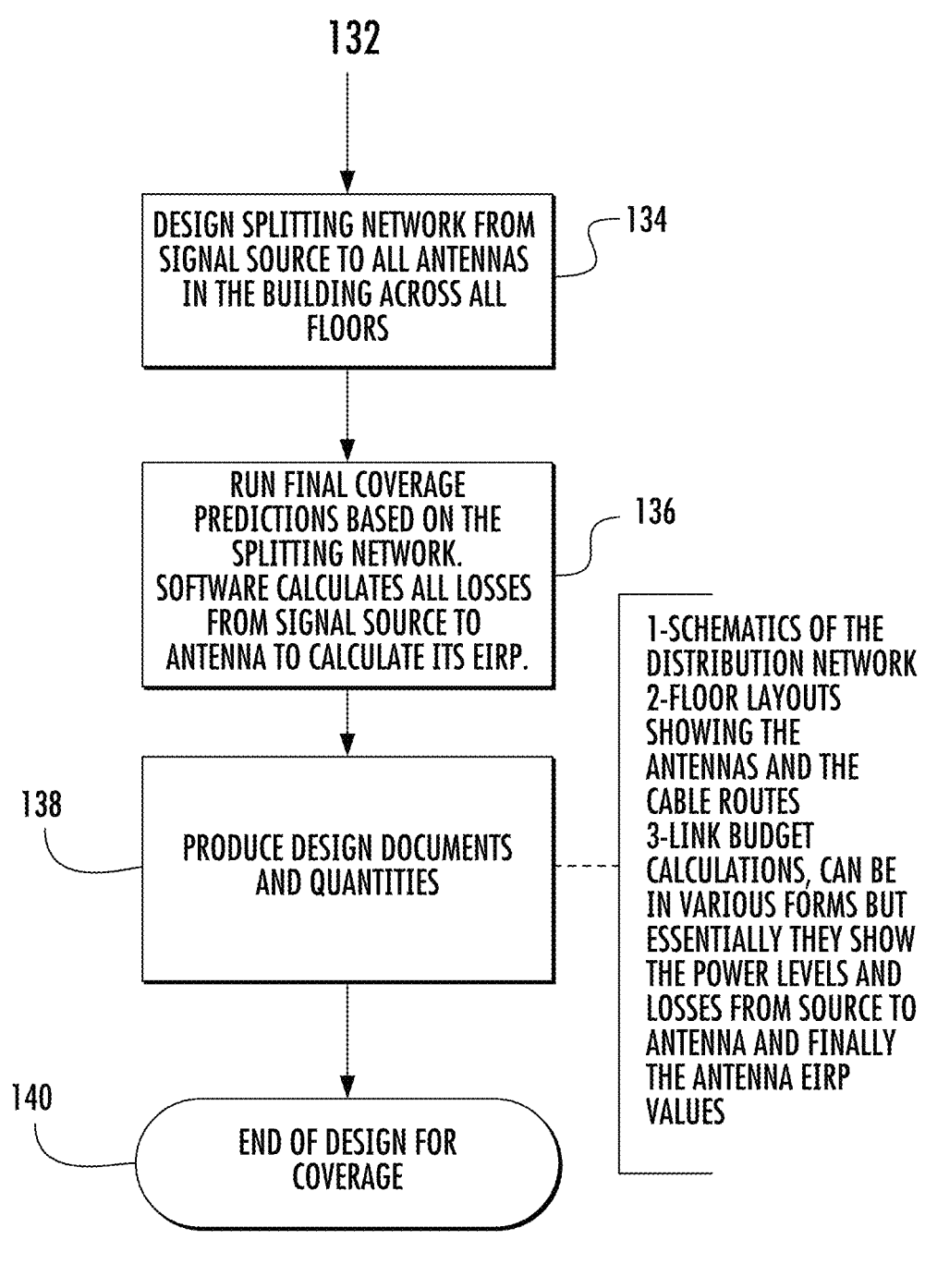

132

DESIGN SPLITTING NETWORK FROM SIGNAL SOURCE TO ALL ANTENNAS IN THE BUILDING ACROSS ALL FLOORS — 134

RUN FINAL COVERAGE PREDICTIONS BASED ON THE SPLITTING NETWORK. SOFTWARE CALCULATES ALL LOSSES FROM SIGNAL SOURCE TO ANTENNA TO CALCULATE ITS EIRP. — 136

138 — PRODUCE DESIGN DOCUMENTS AND QUANTITIES

1-SCHEMATICS OF THE DISTRIBUTION NETWORK
2-FLOOR LAYOUTS SHOWING THE ANTENNAS AND THE CABLE ROUTES
3-LINK BUDGET CALCULATIONS, CAN BE IN VARIOUS FORMS BUT ESSENTIALLY THEY SHOW THE POWER LEVELS AND LOSSES FROM SOURCE TO ANTENNA AND FINALLY THE ANTENNA EIRP VALUES

140 — END OF DESIGN FOR COVERAGE

FIG. 1C

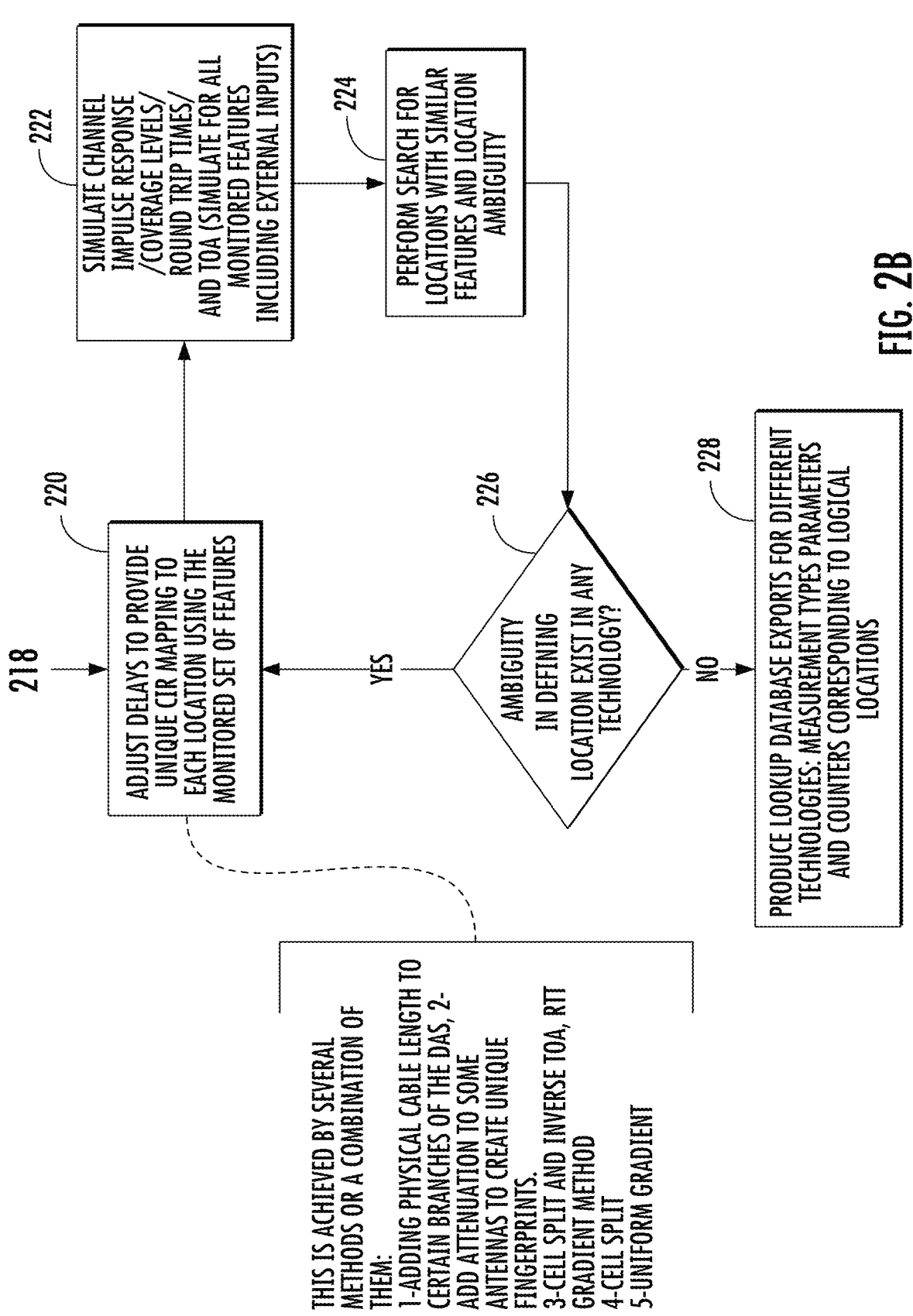

218

220

SIMULATE CHANNEL IMPULSE RESPONSE /COVERAGE LEVELS/ ROUND TRIP TIMES/ AND TOA (SIMULATE FOR ALL MONITORED FEATURES INCLUDING EXTERNAL INPUTS) — 222

ADJUST DELAYS TO PROVIDE UNIQUE CIR MAPPING TO EACH LOCATION USING THE MONITORED SET OF FEATURES

THIS IS ACHIEVED BY SEVERAL METHODS OR A COMBINATION OF THEM:
1-ADDING PHYSICAL CABLE LENGTH TO CERTAIN BRANCHES OF THE DAS, 2-ADD ATTENUATION TO SOME ANTENNAS TO CREATE UNIQUE FINGERPRINTS.
3-CELL SPLIT AND INVERSE TOA, RTT GRADIENT METHOD
4-CELL SPLIT
5-UNIFORM GRADIENT

PERFORM SEARCH FOR LOCATIONS WITH SIMILAR FEATURES AND LOCATION AMBIGUITY — 224

AMBIGUITY IN DEFINING LOCATION EXIST IN ANY TECHNOLOGY? — 226

YES

NO

PRODUCE LOOKUP DATABASE EXPORTS FOR DIFFERENT TECHNOLOGIES: MEASUREMENT TYPES PARAMETERS AND COUNTERS CORRESPONDING TO LOGICAL LOCATIONS — 228

FIG. 2B

FUNCTION OF THE DAS DELAY CONTROLLER
- PERIODICALLY / CONTINUOUSLY MONITOR THE PREDEFINED DAS CABLE LENGTHS
- MAINTAIN THE PREDEFINED SETTINGS AGAINST UNCONTROLLED CHANGES SUCH AS CABLE
  CHANGES AND CABLE SWAPS
- ALARM AND NOTIFICATION OF CHANGES ON CONNECTED CABLE LENGTHS
- CABLE TYPES CAN BE FIBER OR COAXIAL CABLE

LEGEND
1 RF SIGNAL SOURCE, BTS, LTE eNodeB, ETC.
2 DAS HEAD AND EQUIPMENT AND HUBS
3 DUPLEX CABLE PAIRS (2 CORE FOR UPLINK AND DOWNLINK COMMUNICATION)
4 CHANNEL CONTROLLER. EXTERNAL OR INTEGRATED WITH DAS HEAD END (FIRST STAGE)
5 DAS
6 CHANNEL CONTROLLER. EXTERNAL OR INTEGRATED WITH DAS HUB (2ND STAGE)
7 DUPLEX CABLE PAIR OR ANY OTHER MEDIUM OF TRANSMISSION IMPLEMENTED IN
  DAS HUB (COAXIAL, TWISTED PAIR, ETC)
8 DAS RF REMOTE UNIT CONNECTED TO DAS HUB
9 DAS ANTENNA CONNECTED TO REMOTE UNIT USING COAXIAL CABLE.
10 DAS RF REMOTE CONNECTED DIRECTLY TO FIRST CONTROLLER
11 COAXIAL CABLES

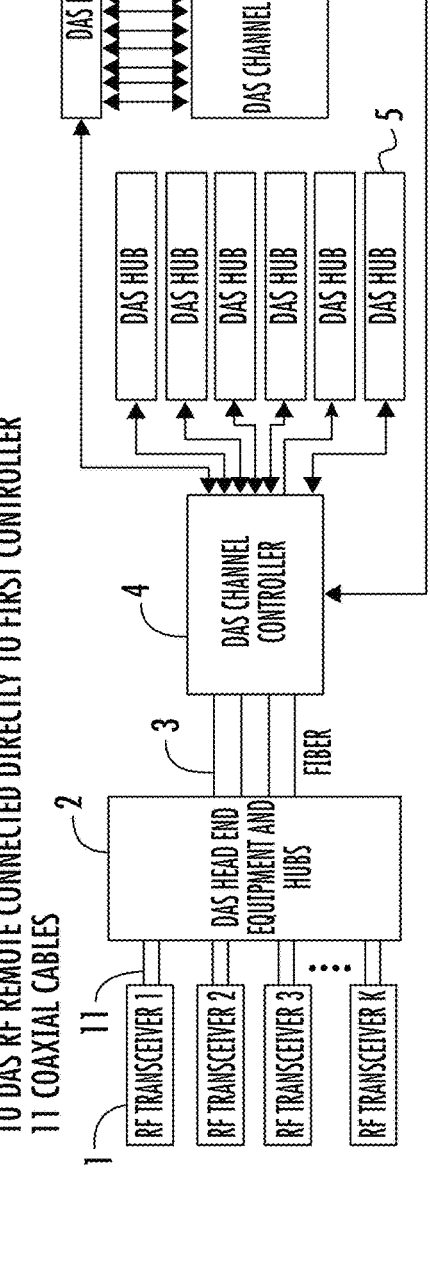

FIG. 10

1: EXTERNAL / EMBEDDED CHANNEL CONTROLLER N DUPLEX INPUTS N DUPLEX OUTPUTS
2: OPTICAL CROSS CONNECT N X N (DUPLEXED PORT)
3: DELAY LINES (FINE ADJUSTMENT STAGE 1)
4: DELAY LINES (FINE ADJUSTMENT STAGE 2)
5: DELAY LINES (COARSE ADJUSTMENT STAGE 1)
6: DUPLEX PORT

FIG. 13

FUNCTION OF THE DAS SOUNDER
- DAS CHANNEL SOUNDER IN DL WITH LOCATION LOGGING
- DAS CHANNEL SOUNDER IN UL WITH LOCATION LOGGING
- COLLECTIVE UL AND DL CHANNEL SOUNDING USING FREQUENCY TRANSLATION AND RETRANSMISSION IN TRx 2 WITH LOCATION LOGGING.
- WORKS WITH ANY TYPE OF DAS. PASSIVE ACTIVE AND HYBRID.

LEGEND
1 DAS SOUNDER TRx
2 DAS HEAD END EQUIPMENT AND HUBS
3 DUPLEX CABLE PAIRS (2 CORE FOR UPLINK AND DOWNLINK COMMUNICATION)
4 CHANNEL CONTROLLER. EXTERNAL OR INTEGRATED WITH DAS HEAD END (FIRST STAGE)
5 DAS
6 CHANNEL CONTROLLER. EXTERNAL OR INTEGRATED WITH DAS HUB (2ND STAGE)
7 DUPLEX CABLE PAIR OR ANY OTHER MEDIUM OF TRANSMISSION IMPLEMENTED IN DAS HUB (COAXIAL, TWISTED PAIR, ETC)
8 DAS RF REMOTE UNIT CONNECTED TO DAS HUB
9 DAS ANTENNA CONNECTED TO REMOTE UNIT USING COAXIAL CABLE.
10 DAS RF REMOTE UNIT CONNECTED DIRECTLY TO FIRST CONTROLLER LEVEL
11 COAXIAL CABLES.

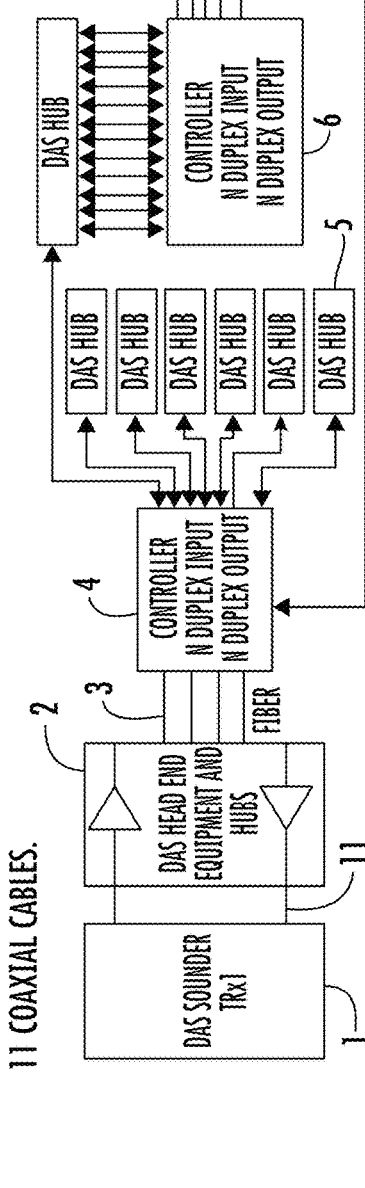

FIG. 15

EIRP 1.01 dBm
ANTENNA 01

EIRP 1.37 dBm
ANTENNA 02

SP 01

1:2

CHANNEL SOUNDER

SP 01

1:2

ANTENNA 01

ANTENNA 02

SYSTEMS AND METHODS FOR MEASUREMENT INTEGRATION AND ACCURATE DIGITAL TWIN CREATION

CROSS-REFERENCE TO RELATED APPLICATIONS

This patent application claims the benefit of U.S. patent application No. 63/489,166, filed Mar. 8, 2023, which is incorporated by reference along with all other references cited in this application.

BACKGROUND OF THE INVENTION

The invention relates to the field of antennas, and more specifically, to determining a position or location of a wireless device based in a distributed antenna system.

Various techniques are available to determine the location or position of wireless devices such as a radios, mobile phones, or smartphones. These approaches have shortcomings such as not being able to find the position of a device in a relatively dense area, such as a room or suite in a high-rise building (e.g., 61-floor tower) in an urban area.

Therefore, there is a need for an improved system, devices, and methods of determining positioning using a distributed antenna system.

BRIEF SUMMARY OF THE INVENTION

Capturing and presenting parameters related to and affecting physical systems to generate a digital twin that help in operating, maintaining, monitoring, and upgrading systems to deliver the desired operational results, such as for distributed antenna systems and in-building systems. Systems and methods for seamless measurement collection, analysis, and integration with design software to create and maintaining exact as-built digital twins and capturing deviation of deployed systems from designs are described.

System, devices, and methods facilitate determining positioning using distributed antenna system with service availability monitoring. Positioning methods include network based methods and handset assisted methods in addition to a monitoring system to report any service outage and possible location information loss. The system provides location information also at handset only level through application or apps and operating systems with online and off-line access to location database data. A combined monitoring system that monitors antenna output power for mobile coverage and service availability helps also in monitoring the availability of the localization system and dynamic update of lookup information. Monitoring system provides also asset tracking and service analytics features for the active or passive distributed antenna system.

In an implementation, a system includes: a first antenna, positioned at a first location inside a building; a second antenna, positioned at a second location inside the building; and a channel controller, including a first input, a second input, and an output, where the first antenna is connected to the first input, and the second antenna connected to a second input. The first and second locations can be on different floors of a building.

The channel controller includes a first configurable delay between the first input to the output and a second configurable delay between the second input to the output. The first configurable delay is selected to be different from the second configurable delay.

The system includes a receiver circuit, where the receiver circuit receives the output of the channel controller including a signal from the first antenna including the first configurable delay and a signal from the second antenna including the second configurable delay. Based on the received first configurable delay, the receiver circuit determines a signal is from the first antenna at the first location inside the building. And based on the received second configurable delay, the receiver circuit determines a signal is from the second antenna at the second location inside the building.

In various implementations, the first signal and second signal are radio frequency signals. The first configurable delay and second configurable delay are configured by a user (e.g., via a software interface screen). The first configurable delay and second configurable delay are created without introducing a physical delay via varying cable lengths. The first configurable delay and second configurable delay are created by way of a digital delay by way of using a digital signal processor (DSP) integrated circuit or field programmable gate array integrated circuit (FPGA). Also, the first configurable delay and the second configurable delay are not to minimize a multipath effect between the first antenna and the second antenna.

When the channel controller detects a signal loss of any of the antennas, there can be a trigger of a simulation of a lookup database to produce new set of data for lookup. The channel controller continuously produces a test signal outside the communication band to monitor any changes in the cable length. The channel controller compares the value with stored baseline values of cable lengths to trigger an alarm when these values are changed for all connected signal paths.

The system can include a channel sounder circuit, where the channel sounder circuit wireless interacts with the channel controller and receiver circuit, performing continuous tests on fiber, coaxial, and over the air channel components with result correlated to a physical position.

There can be a location logger channel sounder, where the location logger channel sounder detects channel anomaly and reports a physical change on infrastructure. Based on the location logger channel sounder, the channel controller can calibrate and auto adjust based on delays to deliver a desired channel impulse response (CIR) per location via an automated procedure at infrastructure commissioning stage and adjusting phase for baseline creation.

The system can include a distributed antenna system (DAS) channel sounder in downlink with location logging and a DAS channel sounder in uplink with location logging, wherein a collective uplink and downlink channel sounding using frequency translation and retransmission in a transceiver with location logging. The system can include DAS software design tools, wherein the DAS software design tools assists in a determining a positioning of the antennas. There can be hardware tools and digital software methods, wherein the hardware tools and digital software methods implement recommended delays on the transmission antennas.

A technique involves optimizing a distributed antenna system which will allow, for example, mobile operators to detect the location of a particular wireless user. A distributed antenna system design method can be aided by design tools and can be automated. Some examples of design tools include IBwave and iBUILDNET.

There can be hardware tools and digital software methods to implement recommended delays on the DAS transmission antennas. This can relate to DAS vendors who can benefit by offering a unique indoor location ability to their DAS systems. This includes digital DAS vendors and analog DAS vendors. A digital DAS includes all variants of digital such as software defined ratios and digital radio frequency (RF) over fiber can implement the required or desired delays digitally into their system, requiring no additional hardware. An analog hardware controller can benefit both digital and analog DAS vendors.

For a mobile operator network, the mobile operator may have a standard location determination method. A technique can help implementing these same methods for an indoor portion of the system with successful and reproducible results. Mobile location server software vendors can also benefit from the technique by implementing a lookup table that is generated by the design software and process. This system and technique will greatly improve and optimize the results as compared to previous approaches.

There are test tools to perform model tuning and verify designed parameters to calibrate results. The approach can also create fingerprints to populate a fingerprint database.

The following document has some discussion on distributed antenna systems, IBRAHIM, AHMED SALLAM MOHAMED, A Study of DAS Delays and Their Impact on the Wireless Channels with Application to Indoor Localization, Thesis/Dissertation Collections, August 2015, 99 pages, Rochester Institute of Technology, RIT Scholar Works, Dubai, Access from scholarworks.rit.edu/theses/8872, and is incorporated by reference.

Further, the following patent applications are incorporated by reference along with all other references cited in this application: U.S. patent application Ser. No. 17/196,967, filed Mar. 9, 2021, issued as U.S. Pat. No. 11,671,792 on Jun. 6, 2023, which is a continuation of U.S. patent application Ser. No. 16/733,216, filed Jan. 2, 2020, issued as U.S. Pat. No. 10,966,055 on Mart. 30, 2021, which claims the benefit of U.S. patent application No. 62/787,599, filed Jan. 2, 2019.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 1A-1C show a design process for a distributed antenna system.

FIGS. 2A-2B show a design process for indoor positioning for a distributed antenna system.

FIG. 10 shows distributed antenna system channel controller inline with active distributed antenna system components.

4

Figure 11:
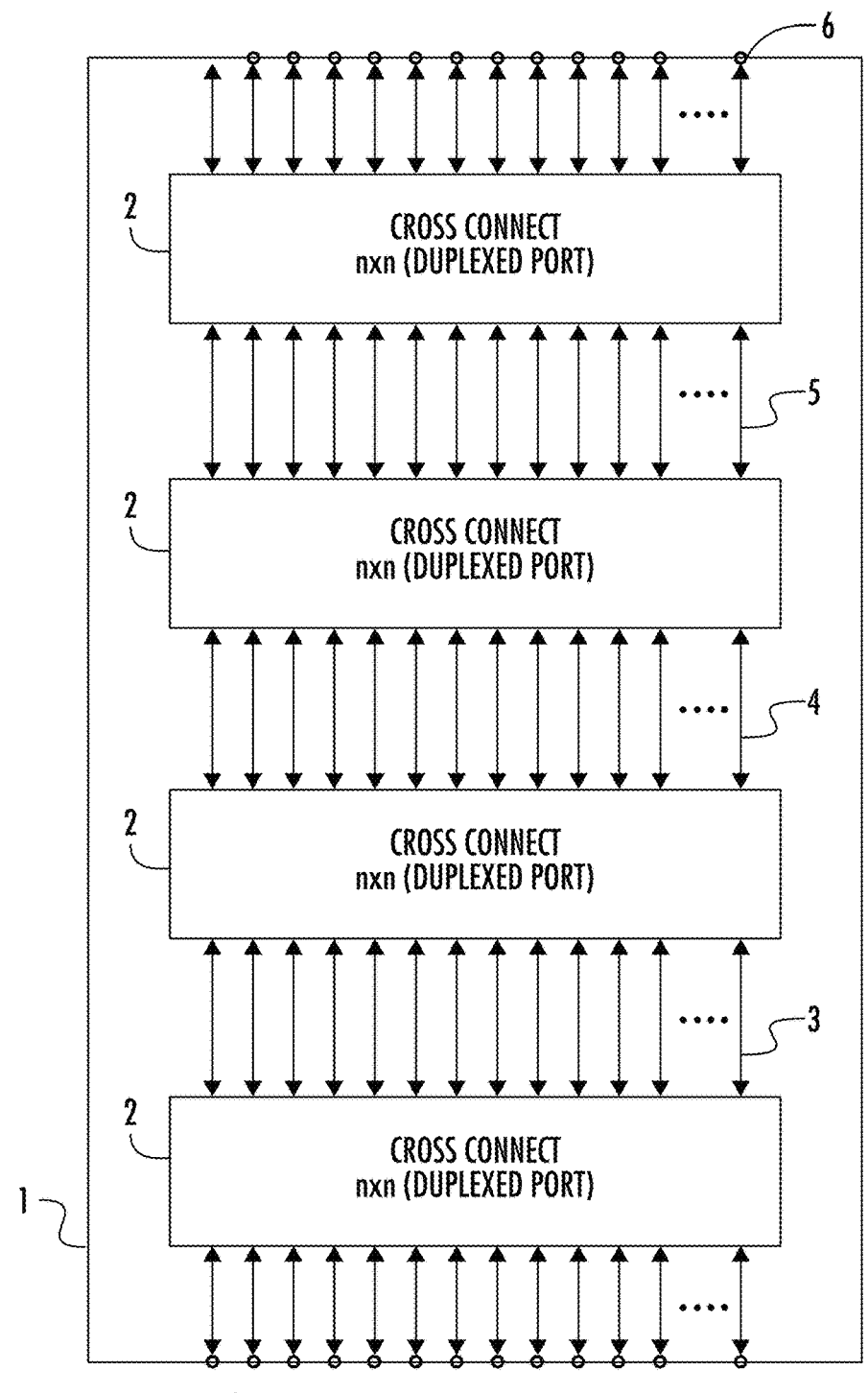

FIG. 11 shows active distributed antenna system channel controller details.

Figure 12A:
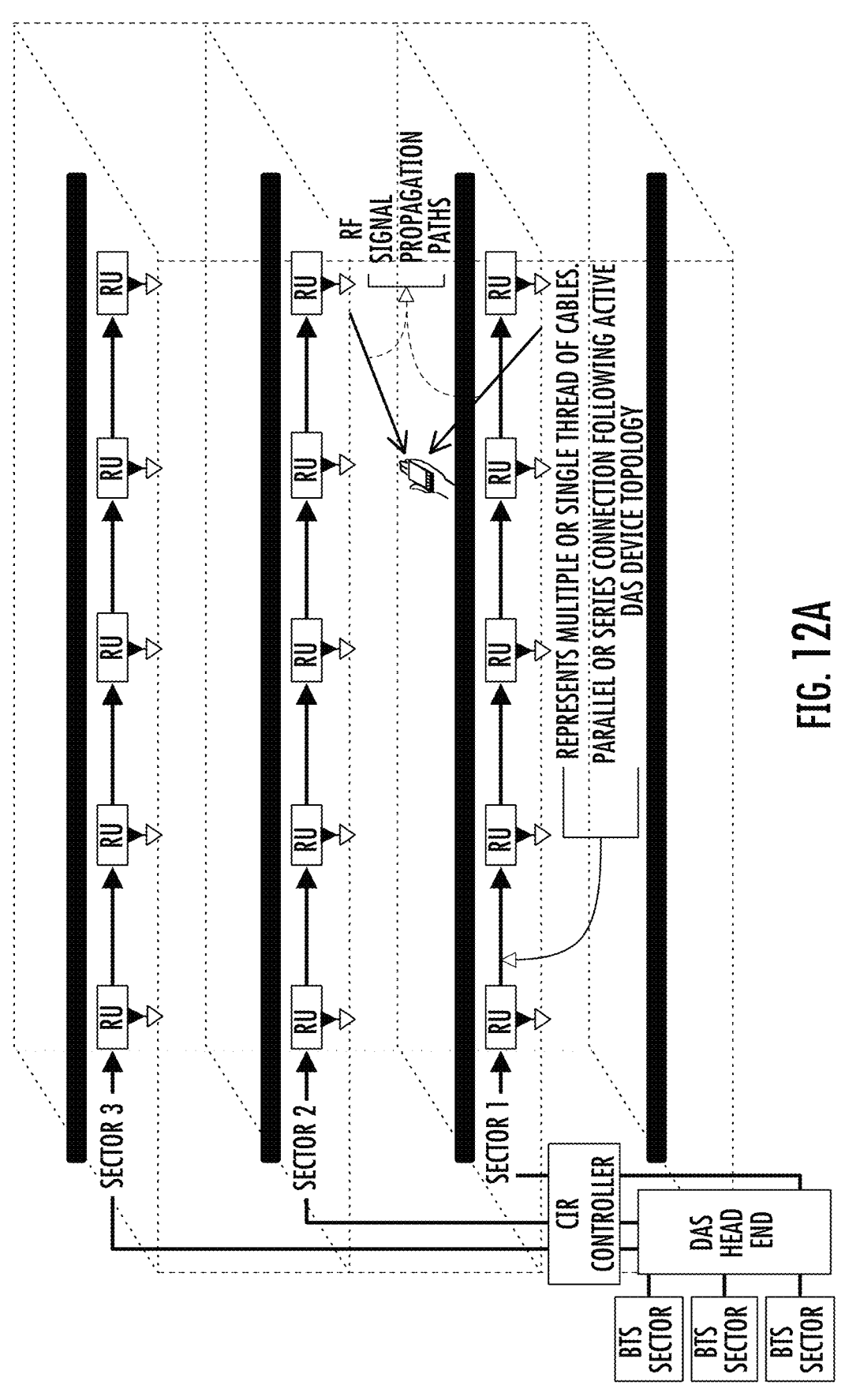
Figure 12B:
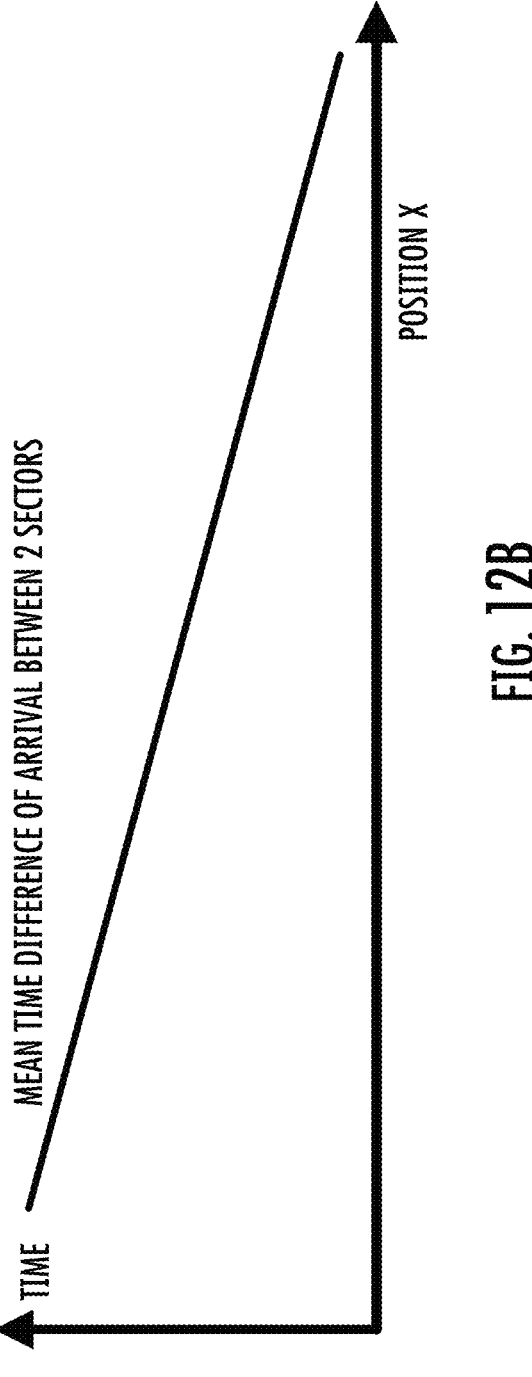

FIGS. 12A-12B show when using a distributed antenna system channel controller there is no need to change the route of cabling and hence solve a real installation and implementation problem.

Figure 13:
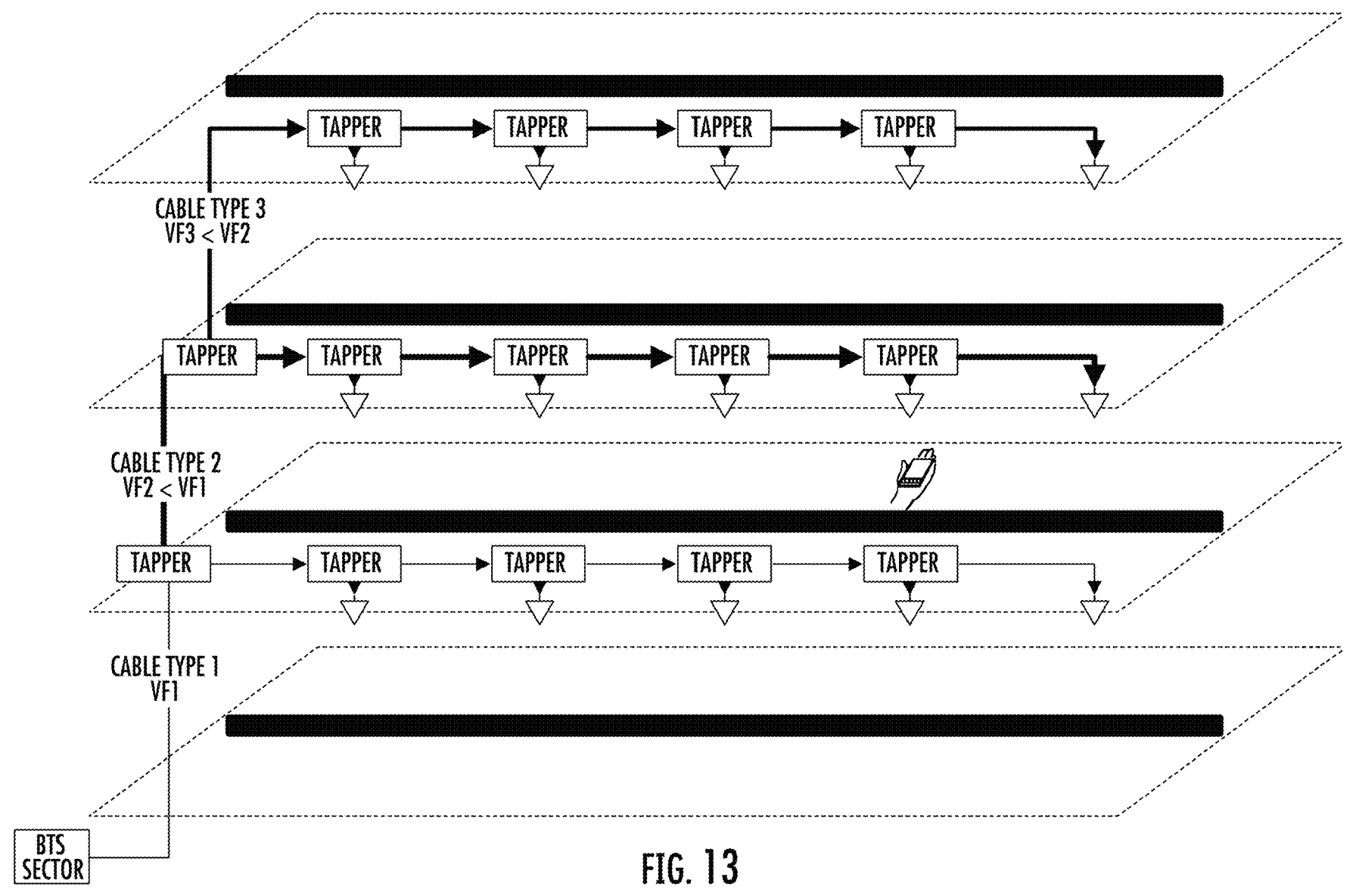

FIG. 13 shows different fiber refractive index method.

Figure 14:
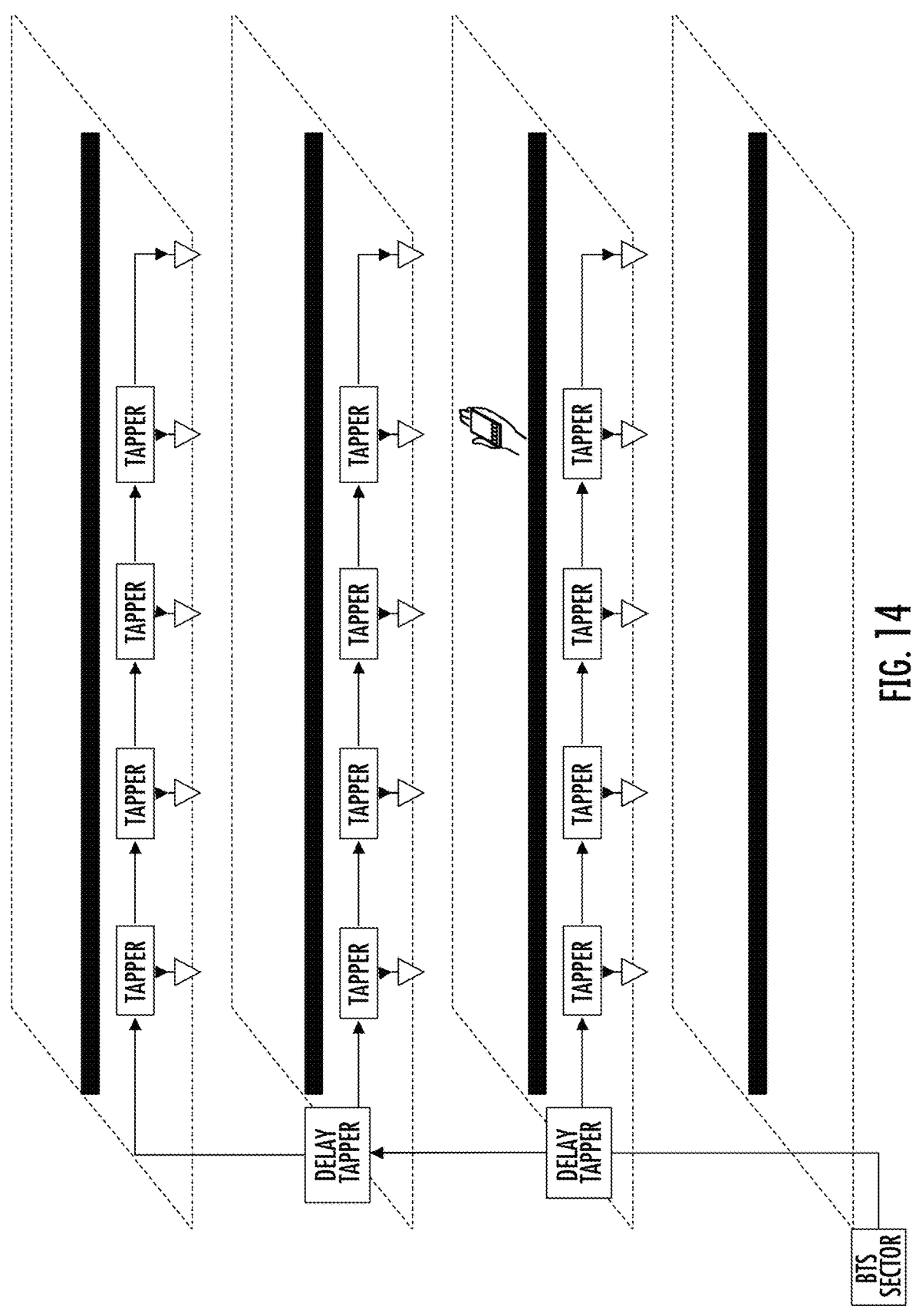

FIG. 14 shows hardware delay tapper or power divider method

FIG. 15 shows a distributed antenna system sounder interaction with a distributed antenna system.

Figure 16:
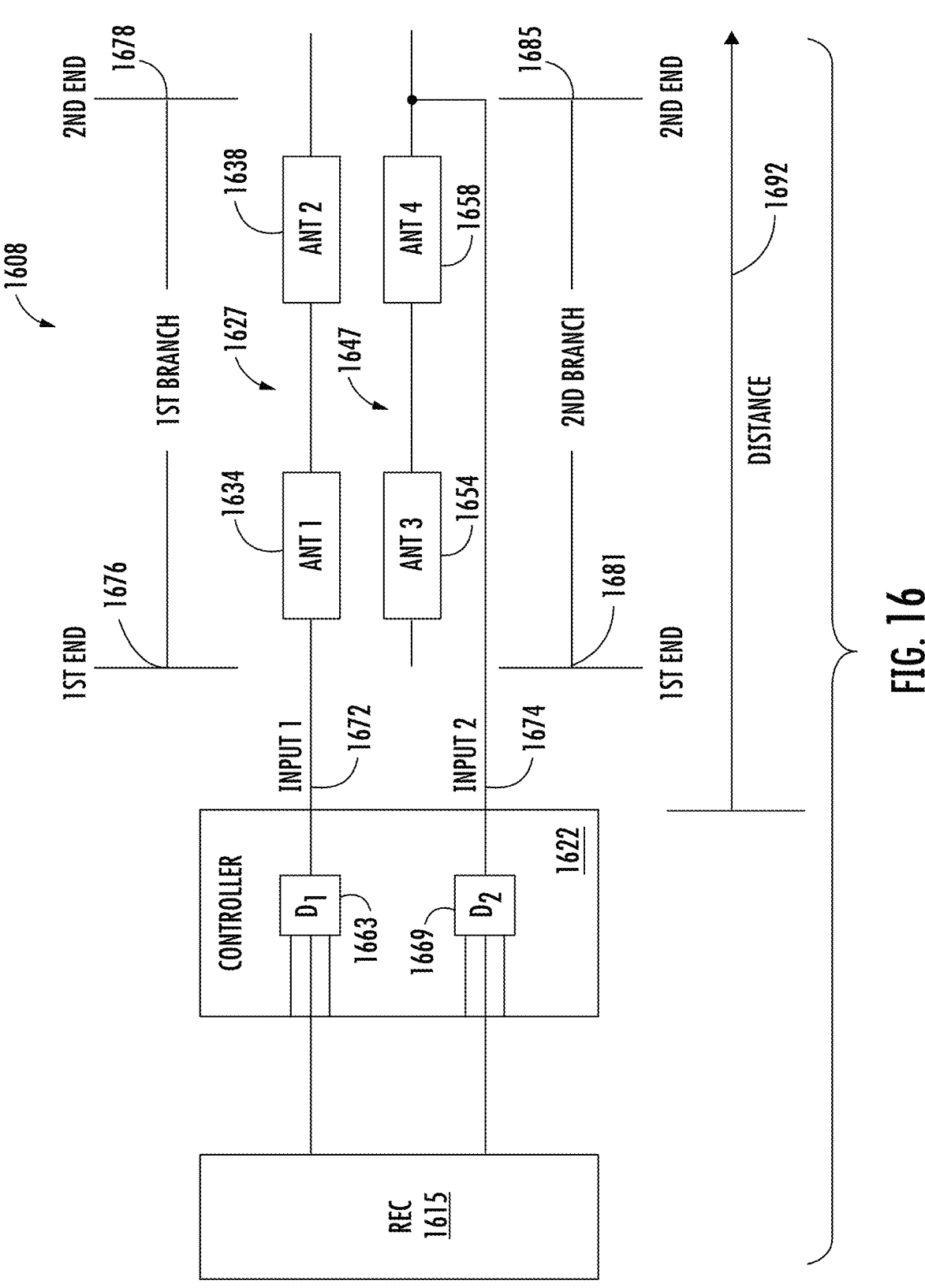

FIG. 16 shows a distributed antenna system including a receiver, channel controller, a first antenna branch having antennas 1 and 2, and a second antenna branch having antennas 3 and 4.

Figure 17:
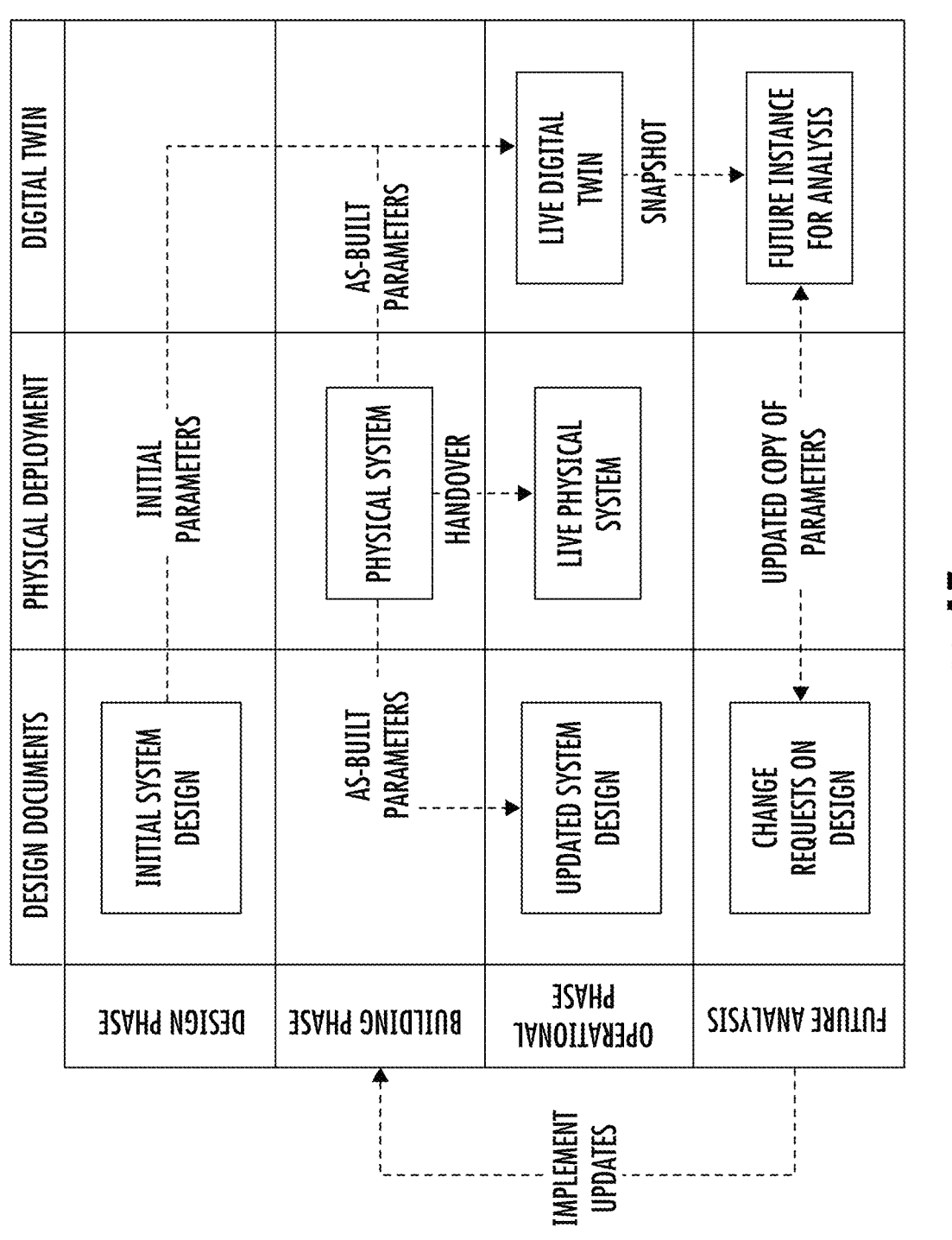

FIG. 17 shows a digital-twin life cycle.

Figure 18:
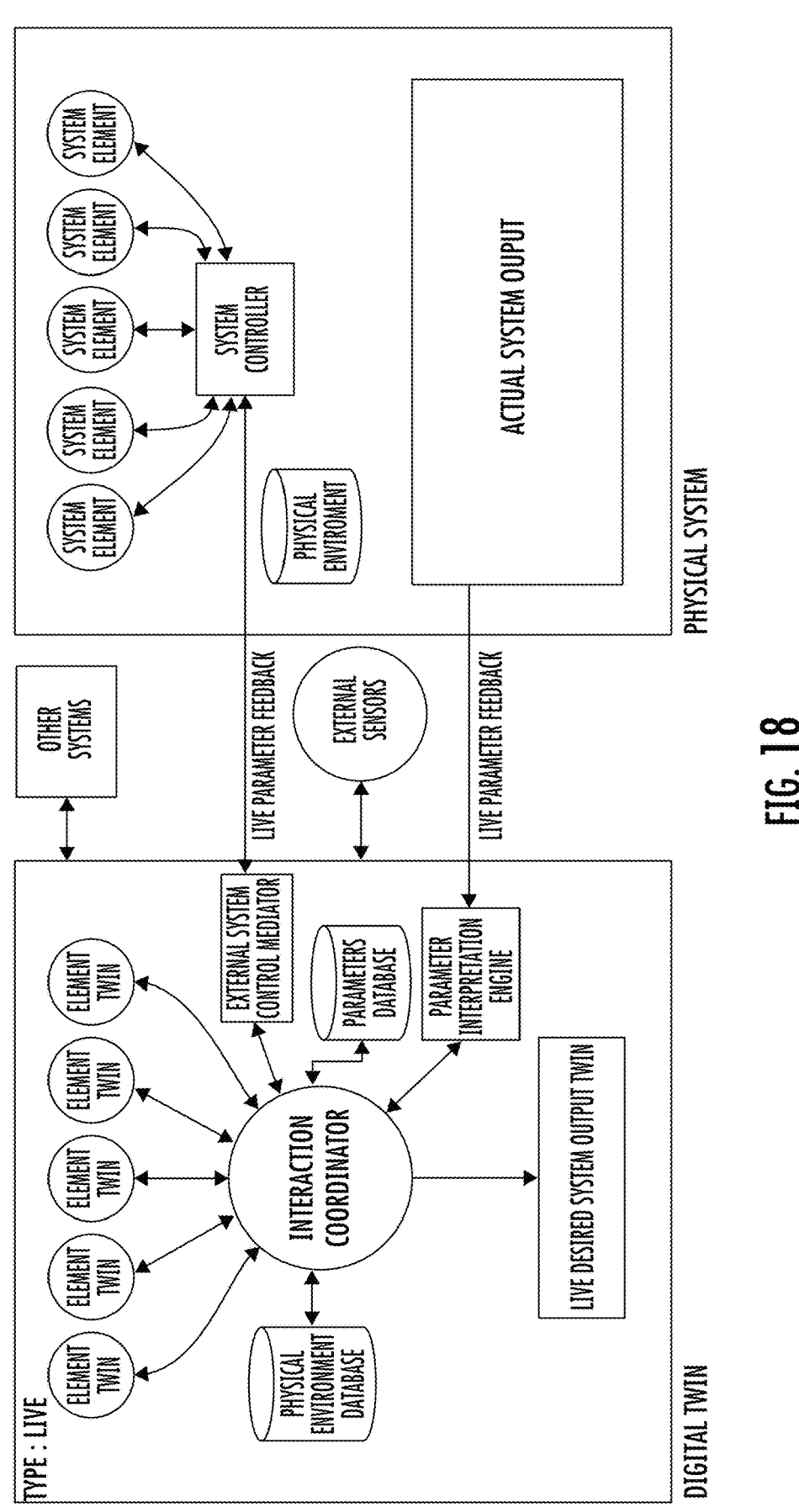

FIG. 18 shows a generic representation of live digital-twin and its interactions with actual systems.

Figure 19:
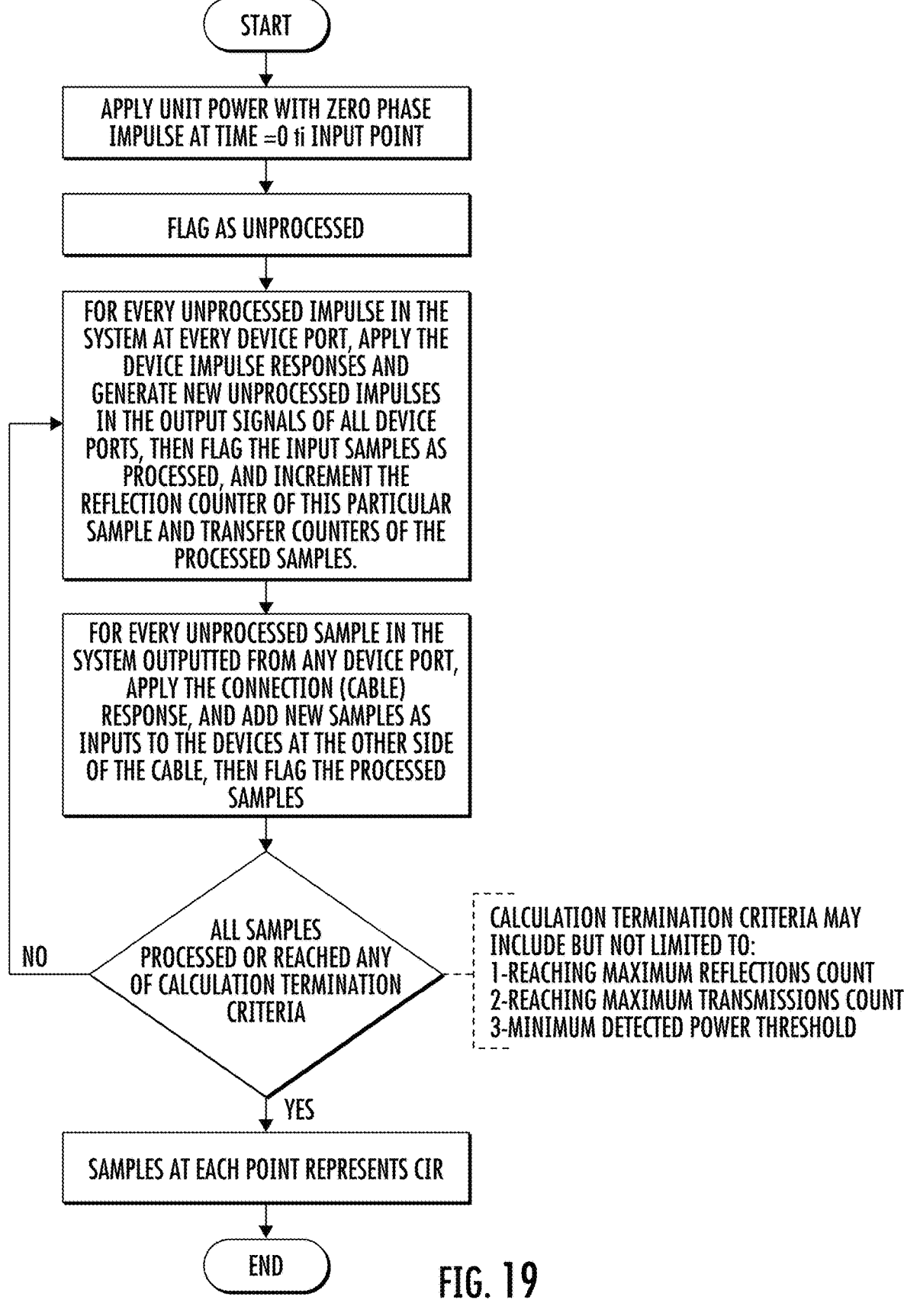

FIG. 19 shows a system impulse response generation process.

Figure 20:
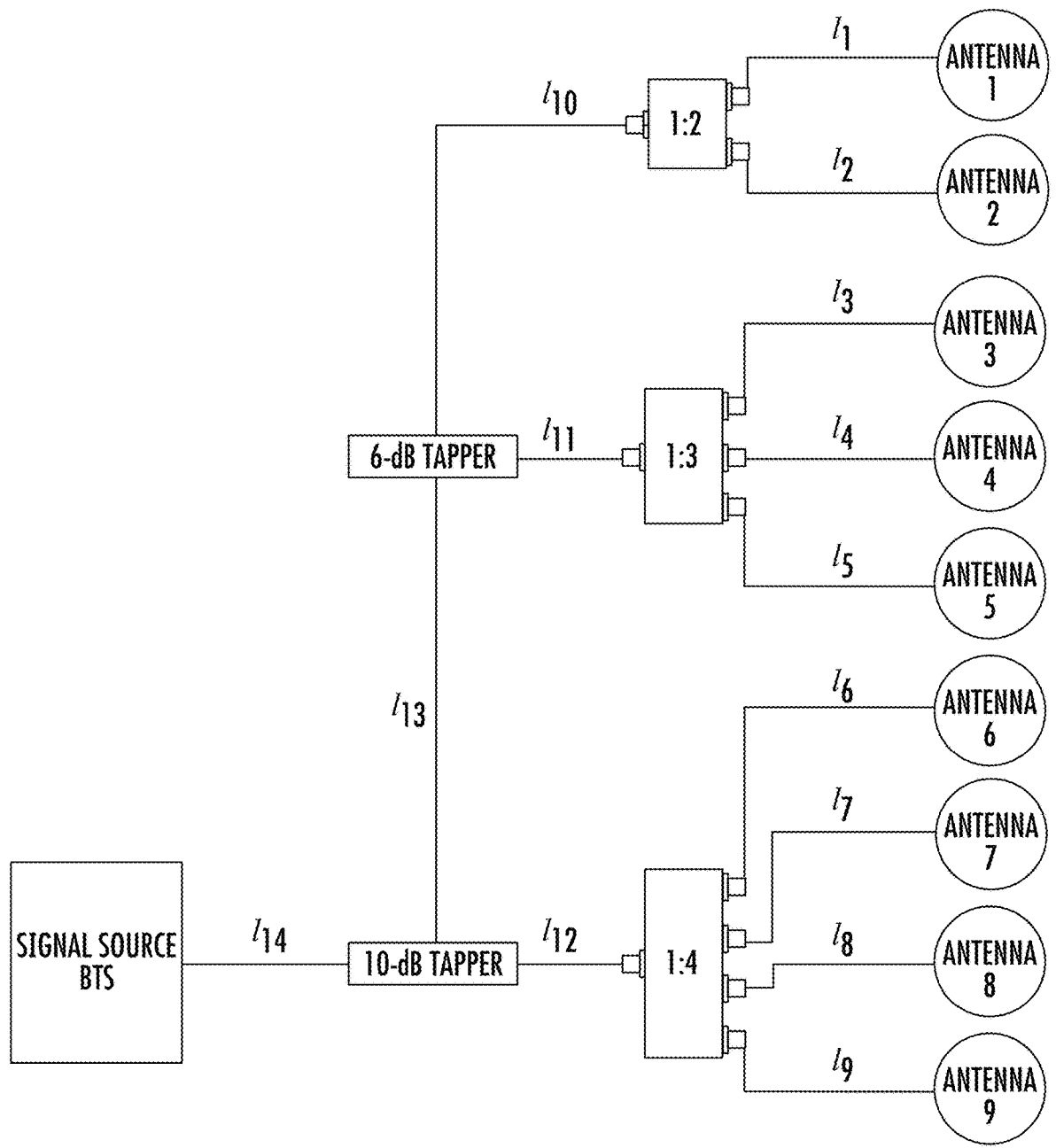

FIG. 20 shows a passive DAS or high-power DAS.

Figure 21:
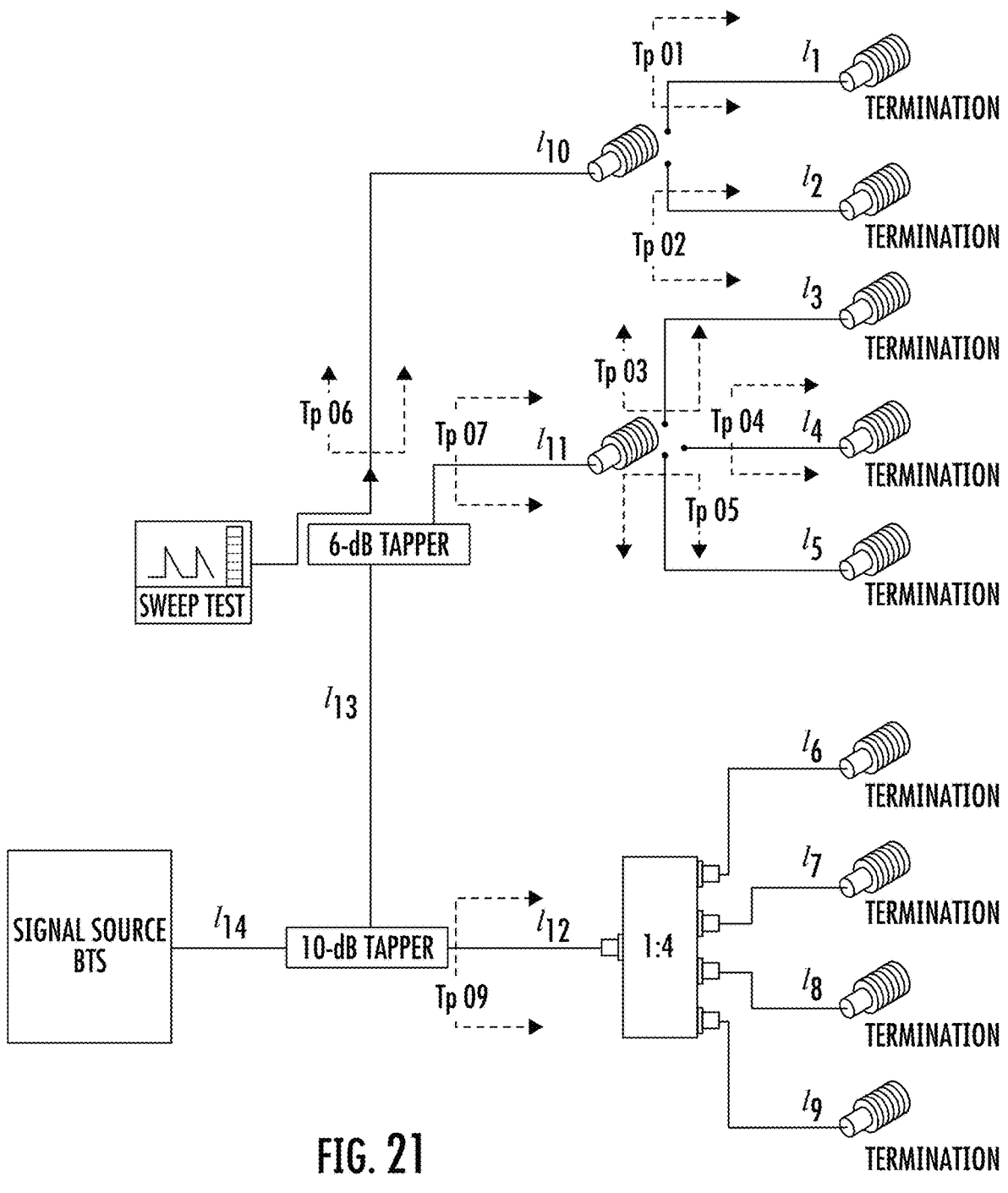

FIG. 21 shows testing points for sweep tests.

Figure 22:
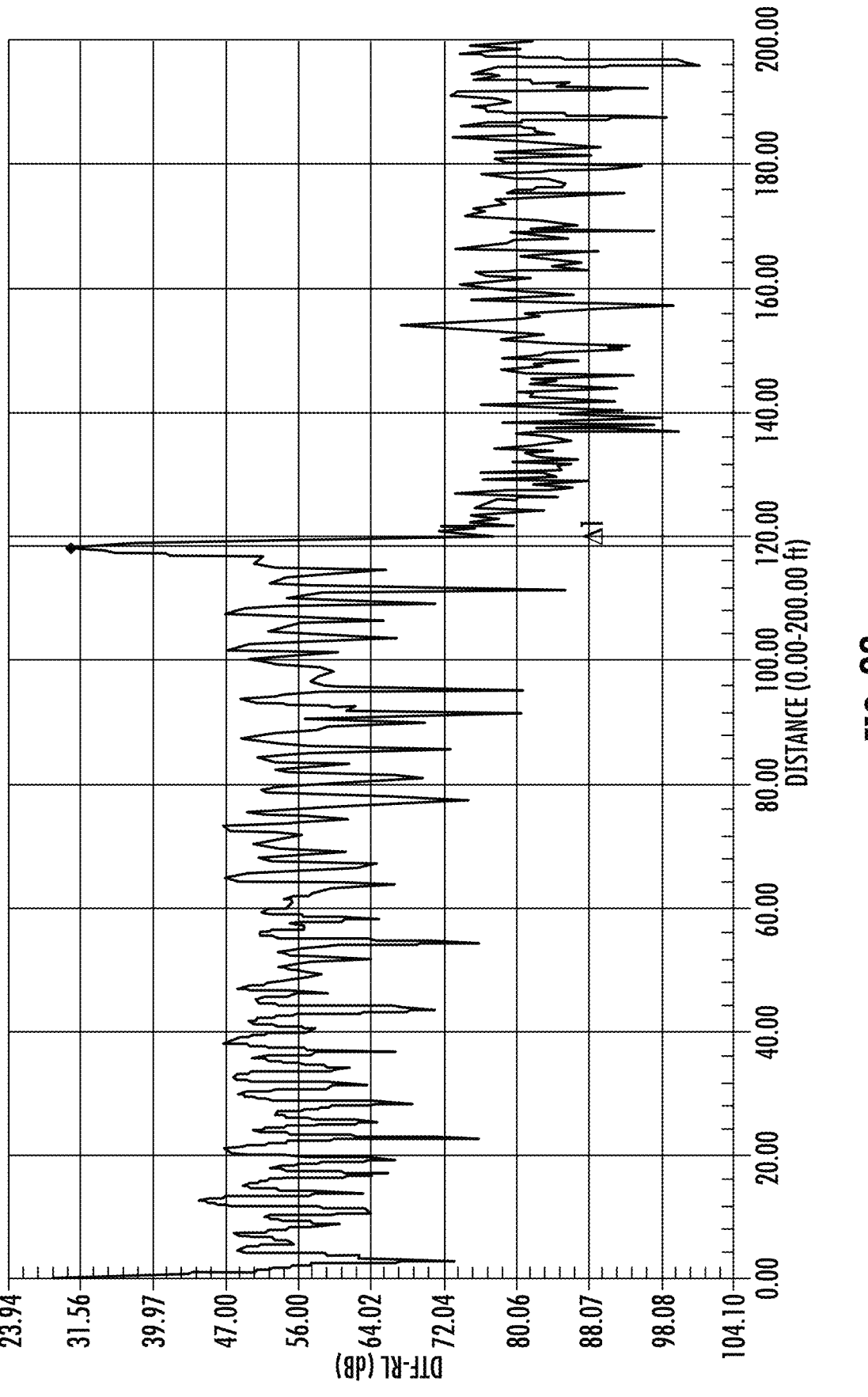

FIG. 22 shows distance to fault measurement expressed as return loss versus distance.

Figure 23:
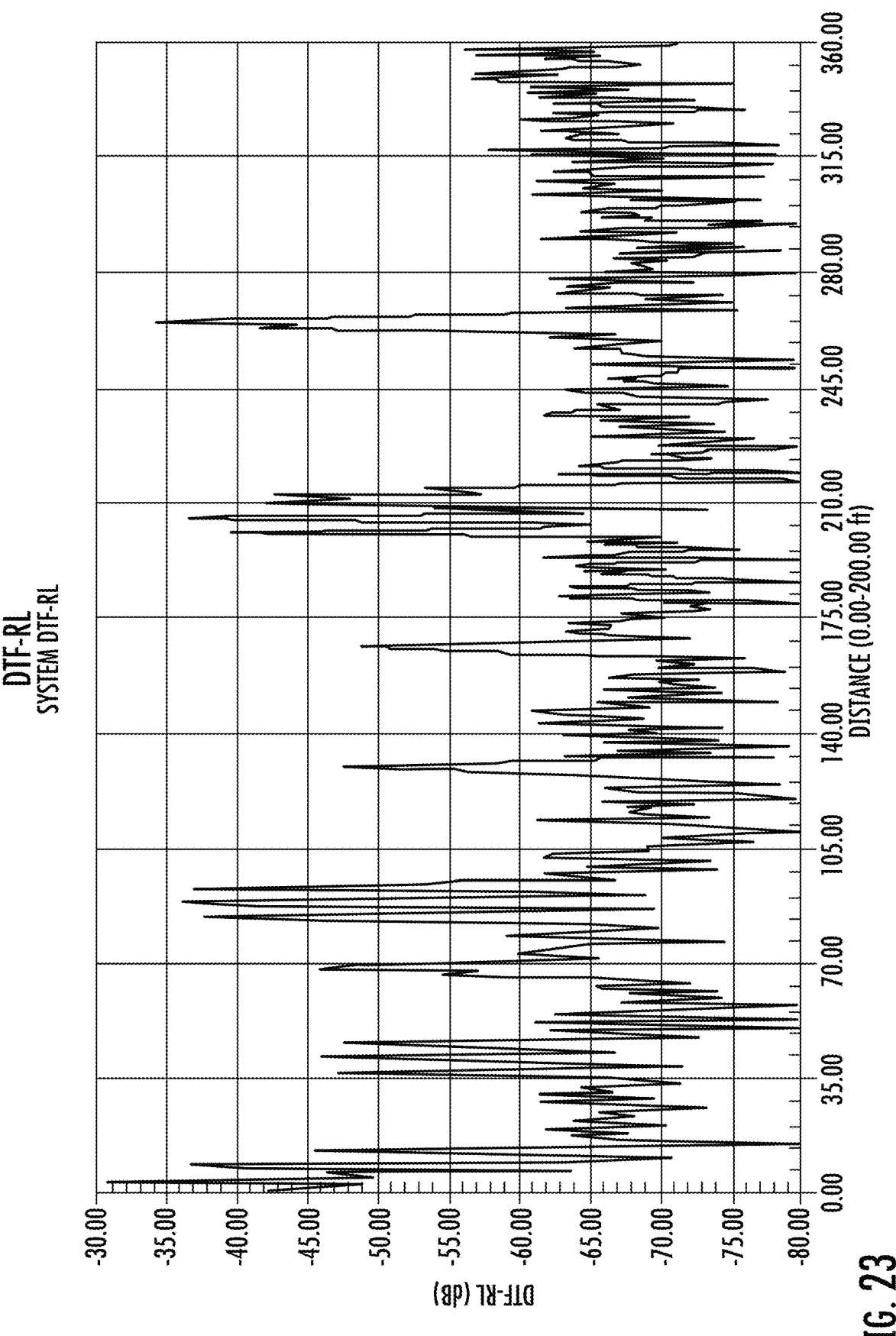

FIG. 23 shows distance to fault performed on a completed DAS system.

Figure 24:
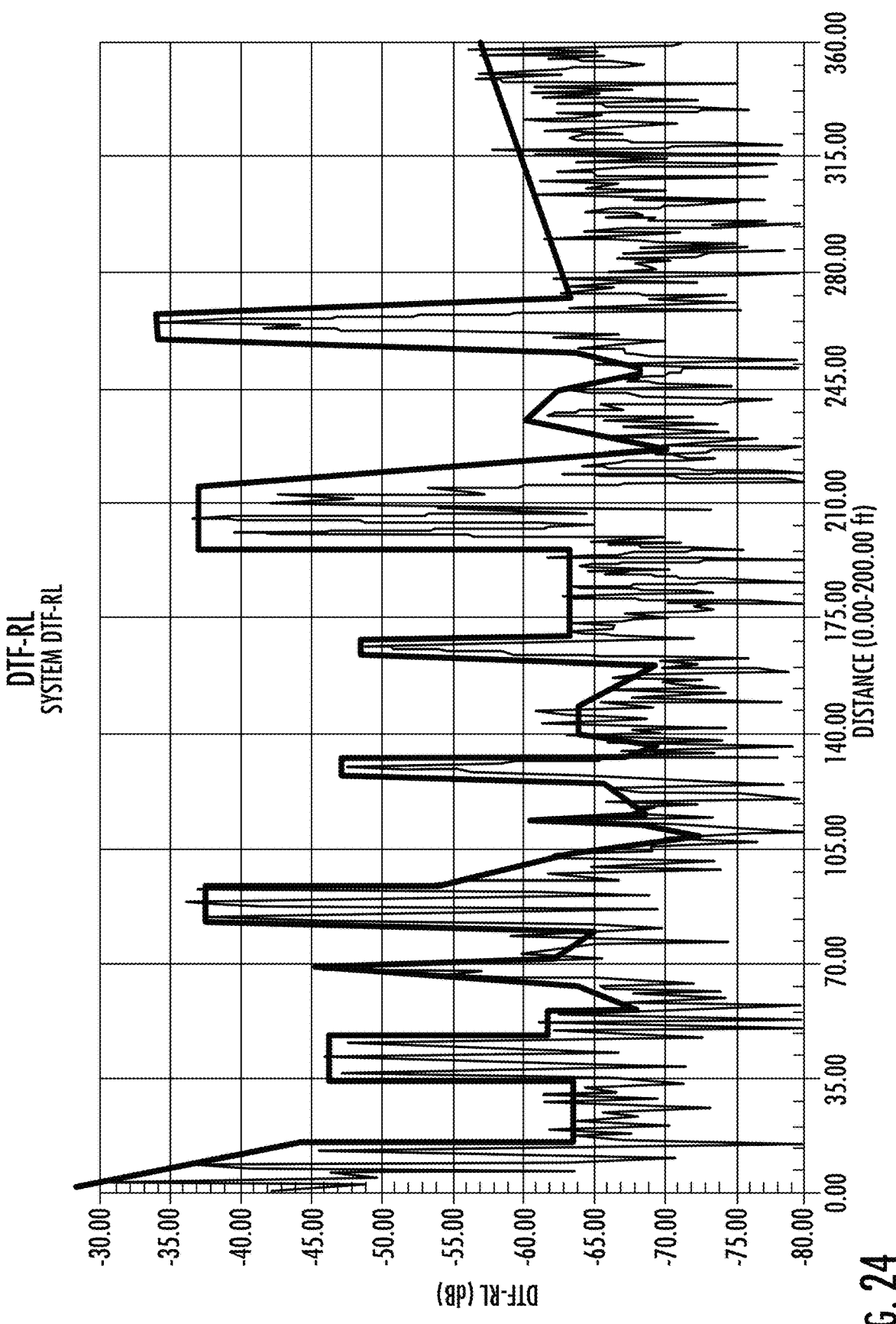

FIG. 24 shows system distance to fault measurement expressed as return loss versus distance with limit lines or limit function.

Figure 25:
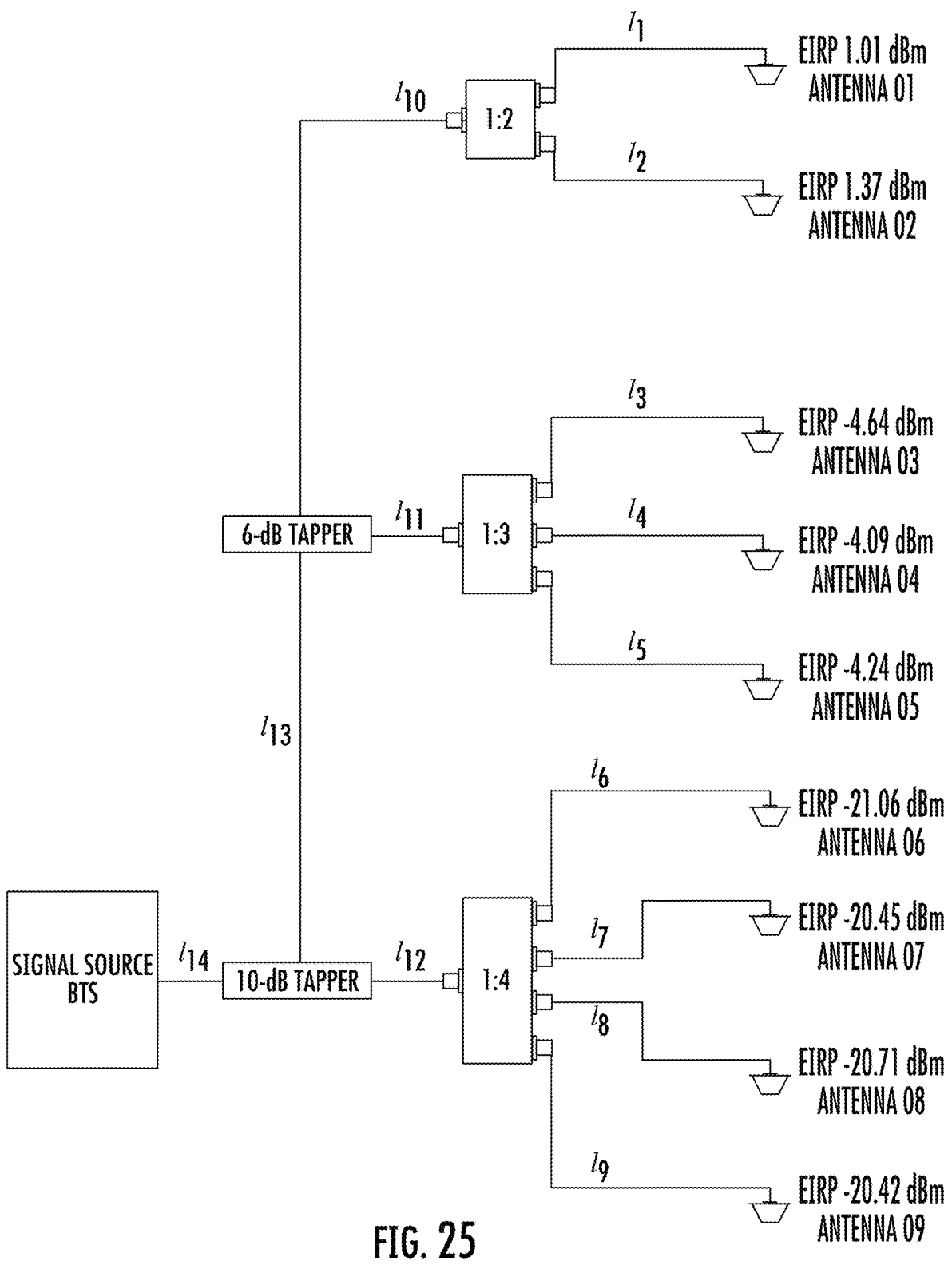

FIG. 25 shows a DAS design.

Figure 26:
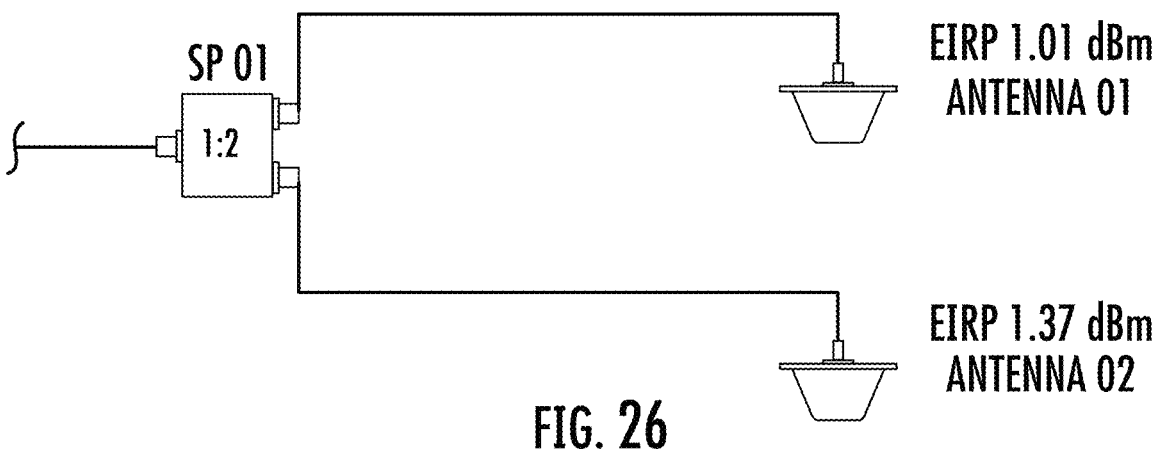

FIG. 26 shows an original DAS branch.

Figure 27:
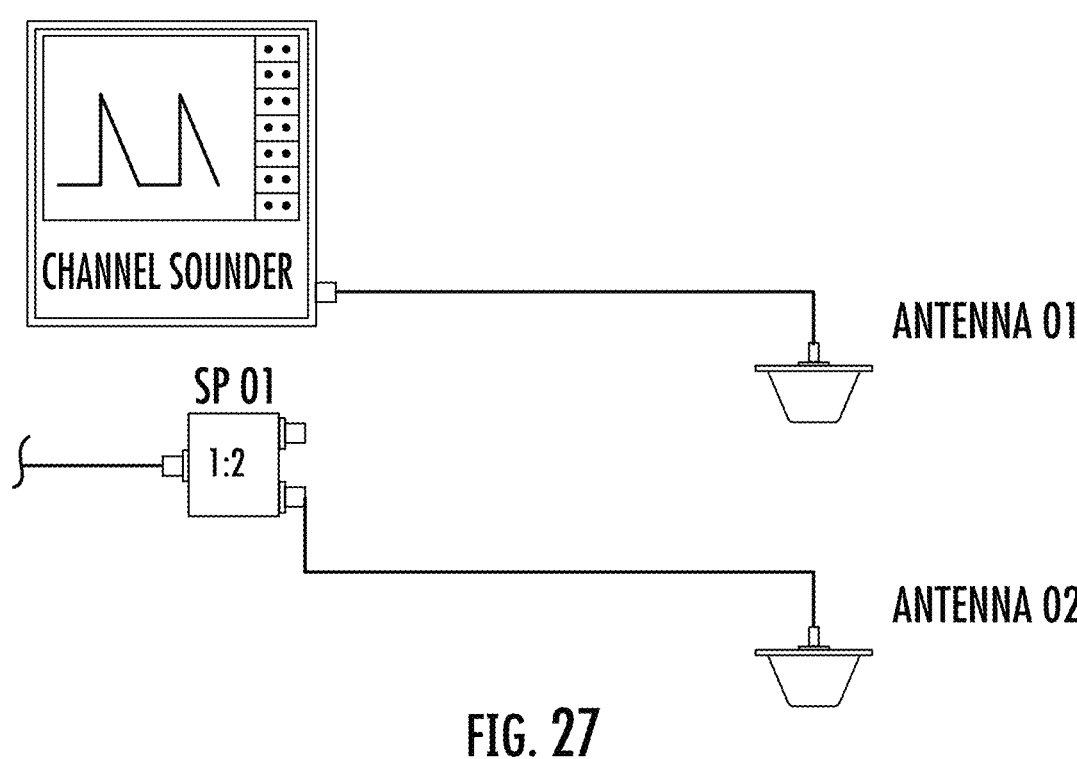

FIG. 27 shows testing being performed on the cable between SP 01 and Antenna 01.

Figure 28:
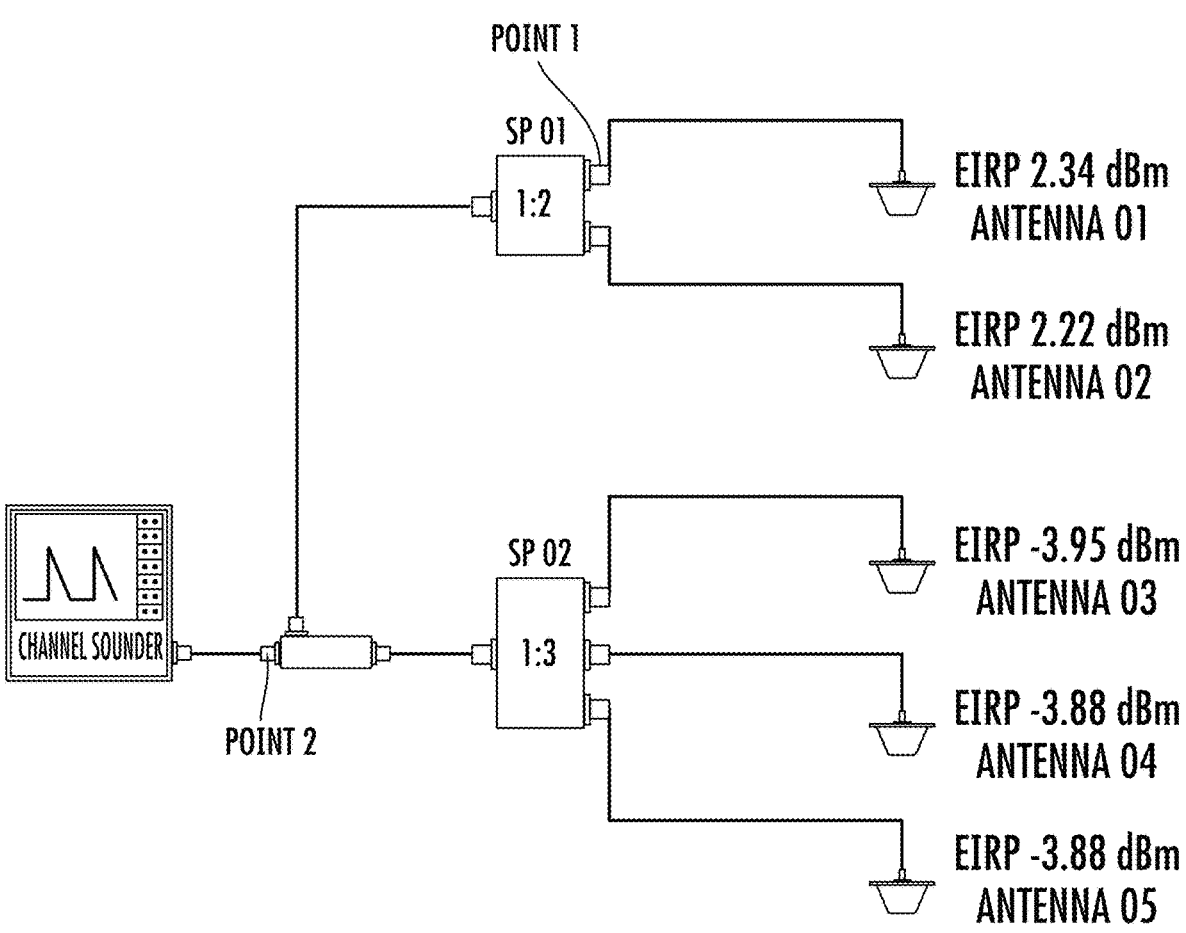

FIG. 28 shows DAS sub network connected to testing device.

DETAILED DESCRIPTION OF THE INVENTION

A system determines indoor positioning. The system includes design, implementation, monitoring of channel parameters, and testing tools for indoor and outdoor distributed antenna system (DAS) infrastructure. The system provides mobile network operators with a near-instant method of positioning, defining subscribers' location and track their movement as needed or desired.

The value of the system includes:
1. Commercial: such as targeted advertisement, indoor navigation and guidance service.
2. Public safety and the E-911 mandate of locating 911 service callers for example in high rise buildings.
3. Lawful indoor tracking of criminals by law enforcement agencies.
4. Mobile network optimization: as a result of the knowledge of the location of the handset, a network operator can determine a general location of certain network anomalies (such as service outages and call drops, low signal levels). With the aid of machine learning this is a vital part in self organized networks and automated optimization.
5. Indoor navigation of first responders.
6. Active and passive DAS performance monitoring and asset tracking.

The design concept and the hardware components to implement it aim at providing a DAS design and DAS implementation (e.g., installation) that enables the mobile network operator (also public safety E-911 public system answering point (PSAP) and law enforcement agencies) to identify the location of the subscriber using the standard network-based methods currently used for outdoor positioning. Using a method described in this patent, the system enables reproducible results with greater or higher accuracy in determining the location of the user than what is mandated by the E-911 requirements and state of the art proximity methods.

The design process produces a special DAS system design that delivers a unique and measurable RF channel characteristics and features for each logical location (a logical location is defined as a particular room, floor level, or other location), allowing the mobile network to identify the location of the user by comparing these measurements with a database of measurements and locations.

This database can be prepopulated with simulated values then calibrated or optimized using a calibration procedure and testing hardware.

Some details include: The design methods will result in a planned and studied modifications on the indoor radio frequency (RF) channel characteristics as opposed to a typical channel produced by the current industry approved design methods. The planned modification will result in having a unique RF channel characteristics for every logical location and elimination of ambiguities that cannot be resolved post implementation.

These unique channel characteristics are measured and reported to the mobile network by the mobile handset in regular intervals during its normal operation as defined by the communication standard, both in idle or active call states.

This allows the mobile network to identify the location of the mobile handset by comparing the measured values to a database of previously measured values in defined logical locations. Resulting in an accurate location determination.

The time needed to produce the location estimate is minimal since mobile measurement results are reported to the network at all times prior to making a call or data connection.

The RF channel characteristic is measured by the network under different names depending on the standard ultimately these values try to describe the channel impulse response in both time domain and power levels.

The method also utilizes the measurement of channel impulse response (CIR) in both uplink or downlink paths which are not necessarily the same specially with the active component delays in the middle. Uplink or upload link (UL) and downlink or download link (DL) gains and hardware delays are not always identical.

The method and hardware deal with the detailed channel impulse response if measurable by the network or any measurable values, or both, defined in the standard which may have a less resolution and accuracy. However, designed method described for the DAS is adaptable any measurement quantities.

Some examples of such measurement quantities that helps describe the physical channel impulse response, but not limited to, are:

1. Channel impulse response of both uplink and downlink
2. Power delay profile
3. Time of arrival
4. Delay spread
5. Round trip time
6. Received signal strength
7. Timing advance quantities in uplink and downlink
8. Observed time difference of arrival
9. Sounding reference signal 10. Any values define by the current or future standard that can be regarded as an abstract of a channel impulse response Since the modifications are done on the physical layer on the channel impulse response, this allows a reproducible positioning results given that all modification parameters are maintained.

A hardware channel controller is an integrated part of DAS hardware, or as an add-on to the installed DAS infrastructure, to automate the introduction of designed changes required to implement the unique channel characteristics.

This channel controller acts on the DAS channel in both uplink and downlink communication channel as a group or uplink or downlink channel separately. Also if needed producing an asymmetrical channel delays in terms of uplink and downlink allowing for an additional degree of freedom and more features to look at in fingerprinting Special test tools can be used as a method to manually or automatically fine tune and calibrate the designed parameters. Also the same tools are used to generate and prepopulate the database with channel impulse response (CIR) measurements tagged with the accurate location. The database is then postprocessed to generate technology specific values for the lookup tables and database correlation.

The process of looking up a fingerprint in a database is normally referred to as database correlation method. In the described method of design, the resulting database features to be monitored is a small subset of the typically used in the low performance in use.

In other words, eliminating the ambiguity and providing a one-to-one mapping of the small set of monitored features of the channel against a logical location.

Distributed antenna systems. Some details of distributed antenna systems are in a dissertation (e.g., chapter 2) by the inventor: Ahmed Sallam Mohamed Ibrahim, A Study of DAS delays and their Impact on the Wireless Channels with Application to Indoor Localization (2015) (published M.S. thesis, Rochester Institute of Technology), available at scholarworks.rit.edu/theses/8872/. This document is incorporated by reference.

Design method for power. It is important to understand the current design method and improved methods that incorporate hardware parts. Current method of indoor design will target signal level availability. Design for coverage, in other words, can be formalized in the flow graph below.

Figure 1B:
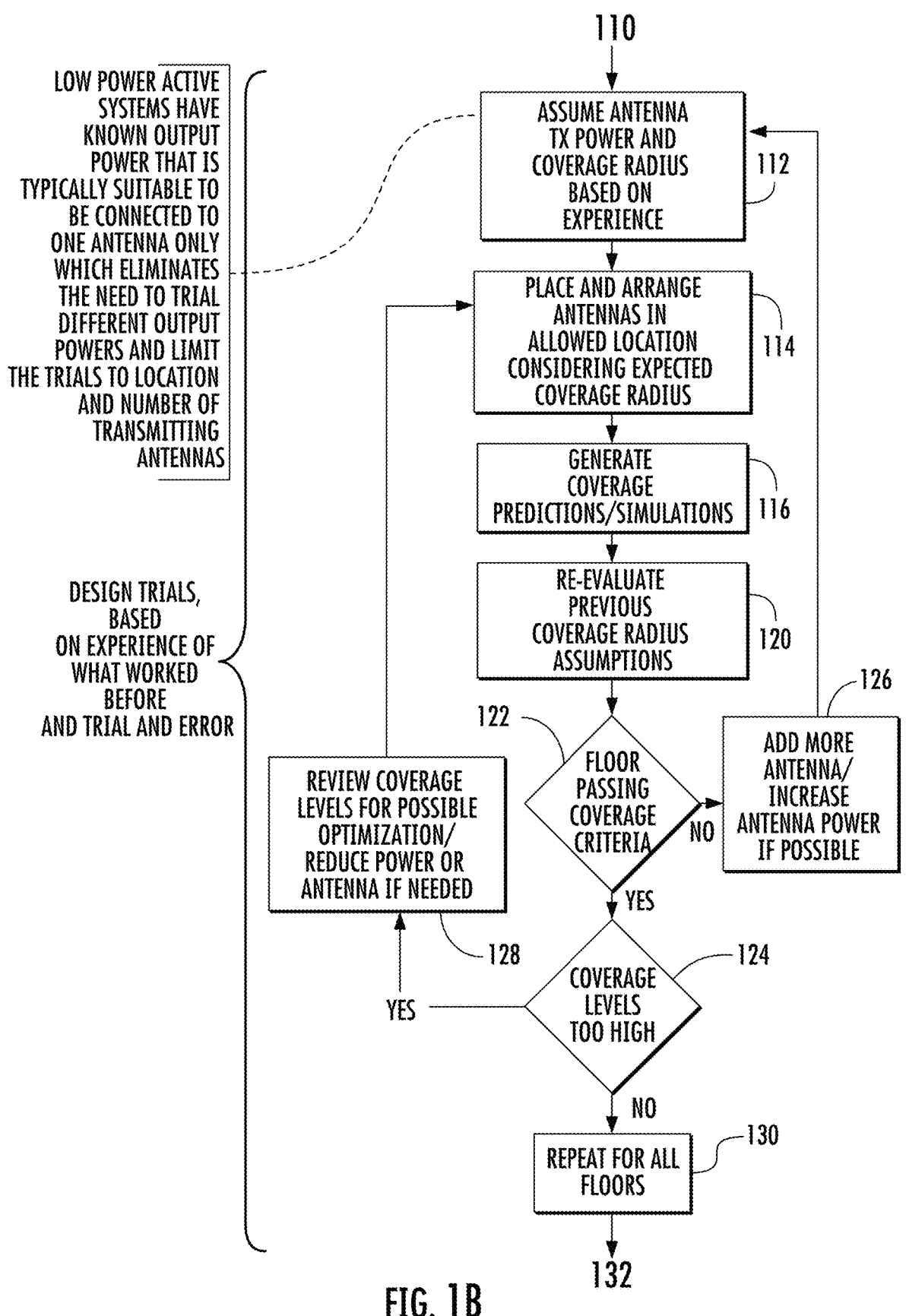

FIGS. 1A-1C show a design process for a distributed antenna system. A flow 102 is for DAS design for coverage using software tools. This flow relates to passive DAS design, but can apply also to high power and medium power active design. Using a constant antenna power for all antennas for the purpose of coverage, simulations, and trials. Once antenna power and location are satisfactory to the user, the user then moves to the passive splitting network design to deliver the required signal power from the signal source to the antenna locations. This involves the use of power splitters and coaxial cables of various diameters and losses.

In a step 104, import floors and layouts. In a step 106, define layout dimensions and floor order and distance between floors. In a step 108, define walls and their types. Steps 104-108 relates to a three-dimensional building model.

A line 110 connects step 108 of FIG. 1A to a step 112 of FIG. 1B. In step 112, assume antenna transmission (Tx) power and coverage radius based on experience. In a step 114, place and arrange antennas in allowed location considering expected coverage radius. In a step 116, generate coverage predictions or simulations. In a step 120, reevaluate previous coverage radius assumptions.

In a step 122, determine if floor passing coverage criteria. If yes, proceed to step 124. If no for step 122, proceed to step 126. In step 126, add more antenna or increase antenna power if possible. Then, return to step 112.

In step 124, determine if coverage levels too high. If yes for step 124, proceed to step 128. In step 128, review coverage levels for possible optimization or reduce power or antenna if needed. Then return to step 114.

If no for step 124, proceed to step 130. In step 130, repeat for all floors. For steps 112 to 130, low power active systems have known output power that is typically suitable to be connected to one antenna only. This eliminates the need to try different output powers and limit the trials to location and number of transmitting antennas. Design trials can be based on experience of what has worked before as well as trial and error.

A line 132 connects step 130 of FIG. 1B to a step 134 of FIG. 1C. In step 134, design splitting network from signal source to all antennas in the building across all floors. In a step 136, run final coverage predictions based on the splitting network software calculates all losses from signal source to antenna to calculate its EIRP. In a step 138, produce design documents and quantities. This can include: (i) schematics of the distribution network, (ii) floor layouts showing the antennas and the cable routes, and (iii) link budget calculations, can be in various forms but essentially they show the power levels and losses from source to antenna and finally the antenna EIRP values.

In a step 140, this is an end of the design flow for coverage.

Design process and method for LocationDAS. An approach to design indoor sites is to design for location services in mind. The outcome of this design is an infrastructure that enables standard outdoor location methods to be used indoors. Moreover, recommendation of new set of measurement to be monitored to determine location in addition to the standard values. The general process of DAS design for a location can be thought of as in FIGS. 2A-2B.

The final result of the design will be optimized and emulated and checked in the software tools against different telecommunication standards detection methods. These telecom standards will have a different set of measurement values to be monitored with certain resolutions. The worst case scenario is normally linked to the method of lowest resolution.

The design can be optimized to a certain detection method relaxing the modification required by other lower resolution methods.

For all methods described in this section a physical modification on the channel is required and can be achieved by the design methods and tools described below.

Figure 2A:
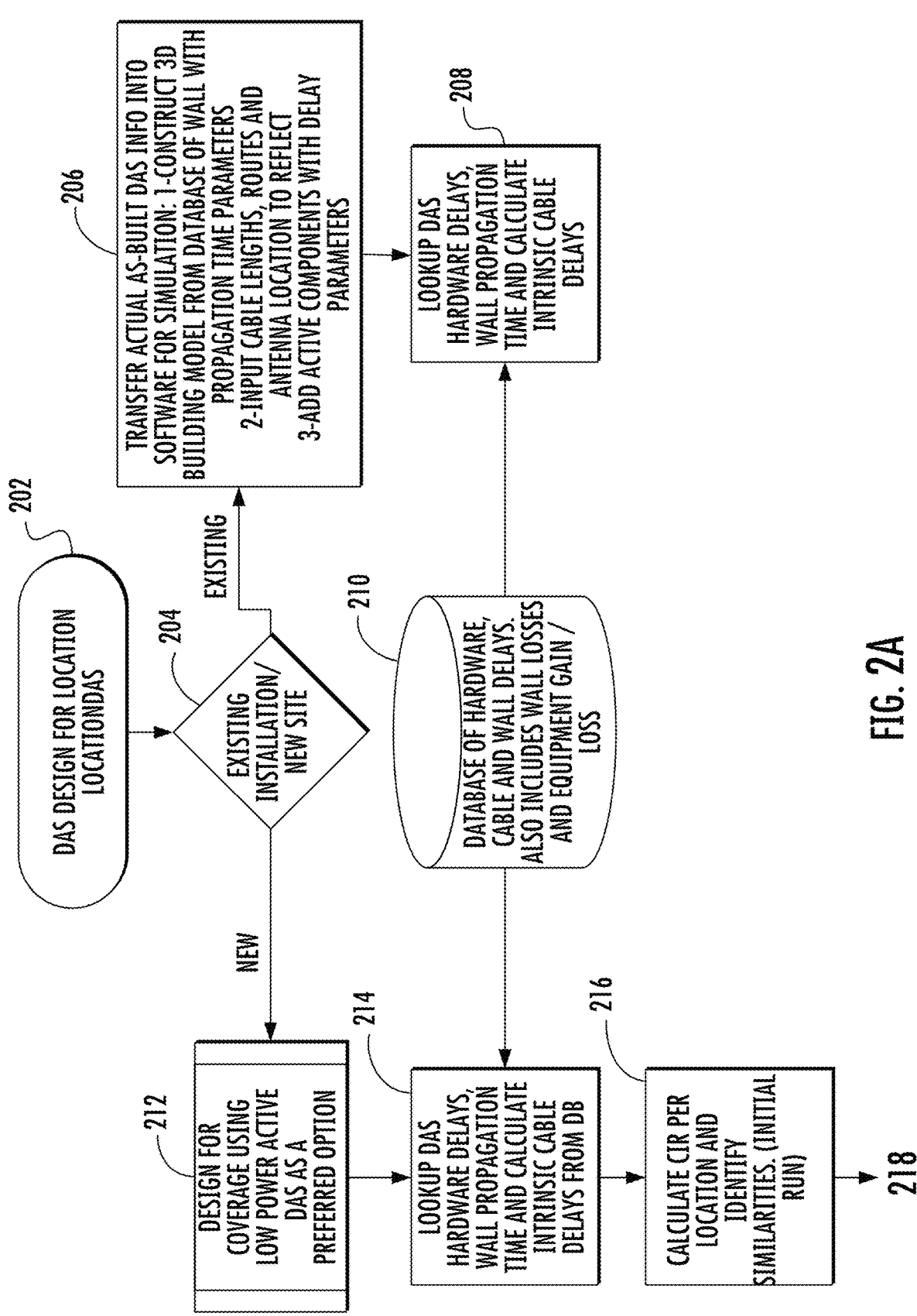

FIGS. 2A-2B show a design process for indoor positioning for a distributed antenna system. A flow 202 if for DAS design for a system (e.g., can be referred to as a LocationDAS system). In a step 204, determine if existing Installation or new site. If existing, proceed to a step 206. In step 206, transfer actual as-built DAS info into software for simulation. This can include (i) construct three-dimensional building model from database of wall with propagation time parameters, (ii) input cable lengths, routes, and antenna location to reflect, and (iii) add active components with delay parameters.

In a step 208, lookup DAS hardware delays, wall propagation time, and calculate intrinsic cable delays from a database 210. Database 210 is a database of hardware, cable, and wall delays. The database also includes wall losses and equipment gain and loss.

In new for step 204, proceed to a step 212. In step 212, design for coverage using low power active DAS as a preferred option. In a step, 214; lookup DAS hardware delays, wall propagation time, and calculate intrinsic cable delays from database 210. In a step 216, calculate CIR per location and identify similarities. This can be an initial run.

A line 218 connects step 216 of FIG. 2A to a step 220 of FIG. 2B. In step 220, adjust delays to provide unique CIR mapping to each location using the monitored set of features. This can be achieved by one of several methods, or a combination of them: (i) adding physical cable length to certain branches of the DAS, (ii) add attenuation to some antennas to create unique fingerprints, (iii) cell split and inverse TOA, RTT gradient method, (iv) cell split, or (v) uniform gradient.

In a step 222, simulate channel impulse response or CIR or coverage levels or round trip times, or time of arrival or TOA, or any combination. This can be a simulation for all monitored features including external inputs. In a step 224, perform search for locations with similar features and location ambiguity.

In a step 226, determine if ambiguity in defining location exist in any technology. If yes, return to step 220. In no, proceed to step 228. In step 228, produce lookup database exports for different technologies. This can include measurement type parameters and counters corresponding to logical locations.

Methods for designing a LocationDAS System. A list of methods and tools to achieve a location aware and optimized DAS is listed below. One particular LocationDAS system can utilize a single method or a combination of them Uniform travel time gradient method. One method of designing indoor sites for location is to achieve an increasing and uniform travel time (or time of arrival measurement) gradient across the three dimensions of the coverage area and building. This can be achieved by controlling transmit delay to have the required gradient. One method to achieve this physically, but not limited to that, is by avoiding parallel branching of coaxial cables and maintaining a single path of power transport per RF sector. This will result in a uniformly increased transmit time of the transmitting elements.

Time stretching for clear detection window per antenna. As an incremental improvement on this method, a stretching of time scale is to have higher transmit time differences between the transmit antennas. Such time stretching will result in a higher gradient which translates to higher accuracy of location detection.

Some details include: This will help achieving clear detection window of the monitored set of attributes. By stretching time domain of the CIR components, this will produce a higher guard band in the measurements. This is more suitable to the lower resolution measurement methods. In essence, the dominant CIR component will have a clear time window of detection linking it to a specific antenna and location.

Figure 3:
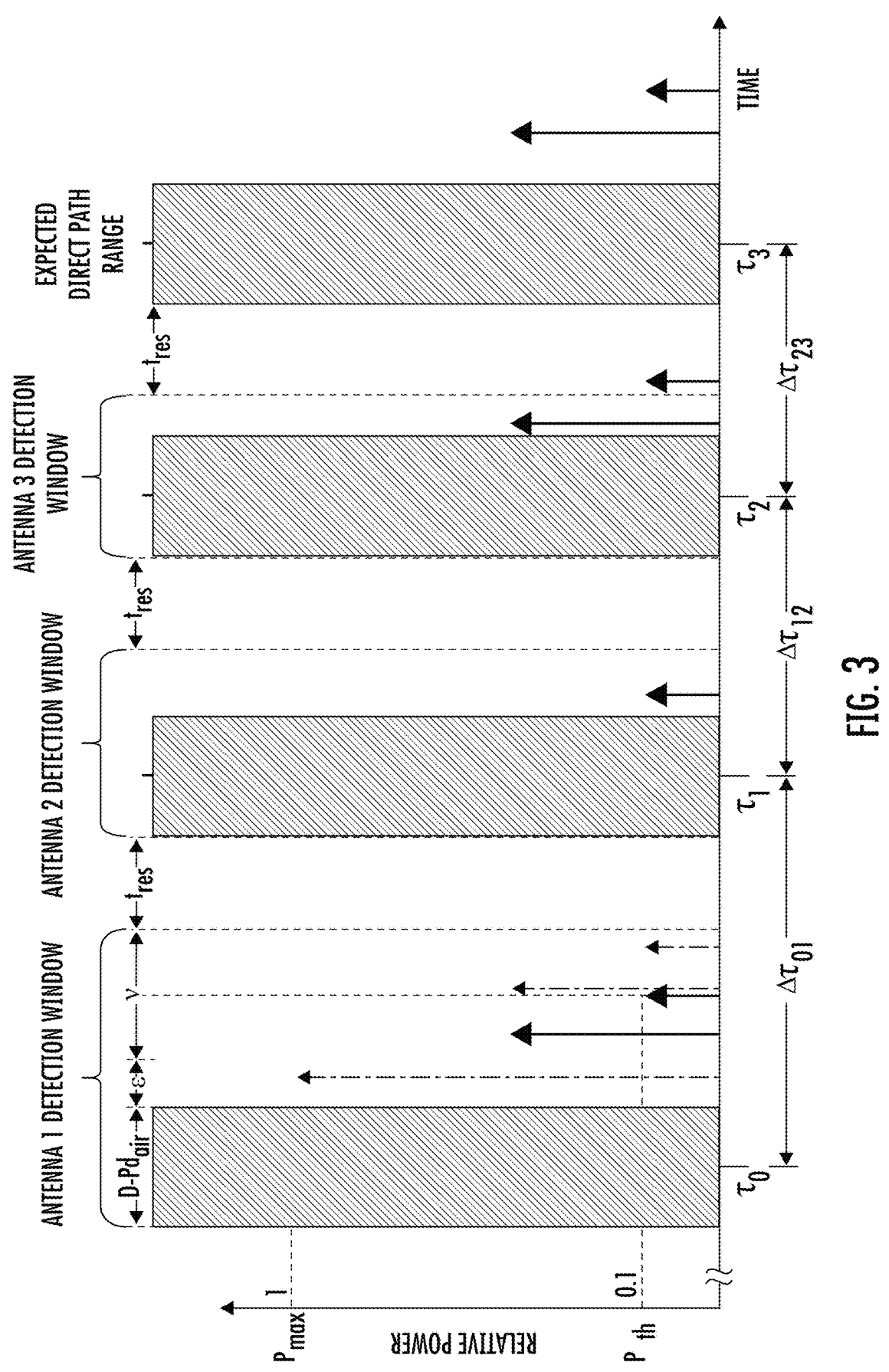
FIG. 3 shows a timing diagram of various detection windows per antenna with various delays and relative power.

FIG. 3 shows a timing diagram of various detection windows per antenna with various delays and relative power. The diagram or graph shows relative power versus time for antenna detection windows including an antenna 1 detection window, antenna 2 detection window, antenna 3 detection window, and expected direct path range.

There is a difference or delta in time (dt01) between the antenna 1 and 2 detection windows. There is a difference in time (dt12) between the antenna 2 and 3 detection windows.

There is a difference in time (dt23) between the antenna 2 detection window and the expected direct path range.

Time stretching with channel modification to produce unique CIR and power PDP. Additional to the time stretching method described above, modification of antenna transmission power, transmit timing, and gains to differentiate CIR for locations with multiple path components. This method will require monitoring of CIR and some power measurements to be added to the monitored set of measurements and their derivatives including but not limited to: delay spread, received signal power, signal to noise ratio. Below is an example of different designed CIR or power delay profile (PDP) for different physical locations.

Figure 4:
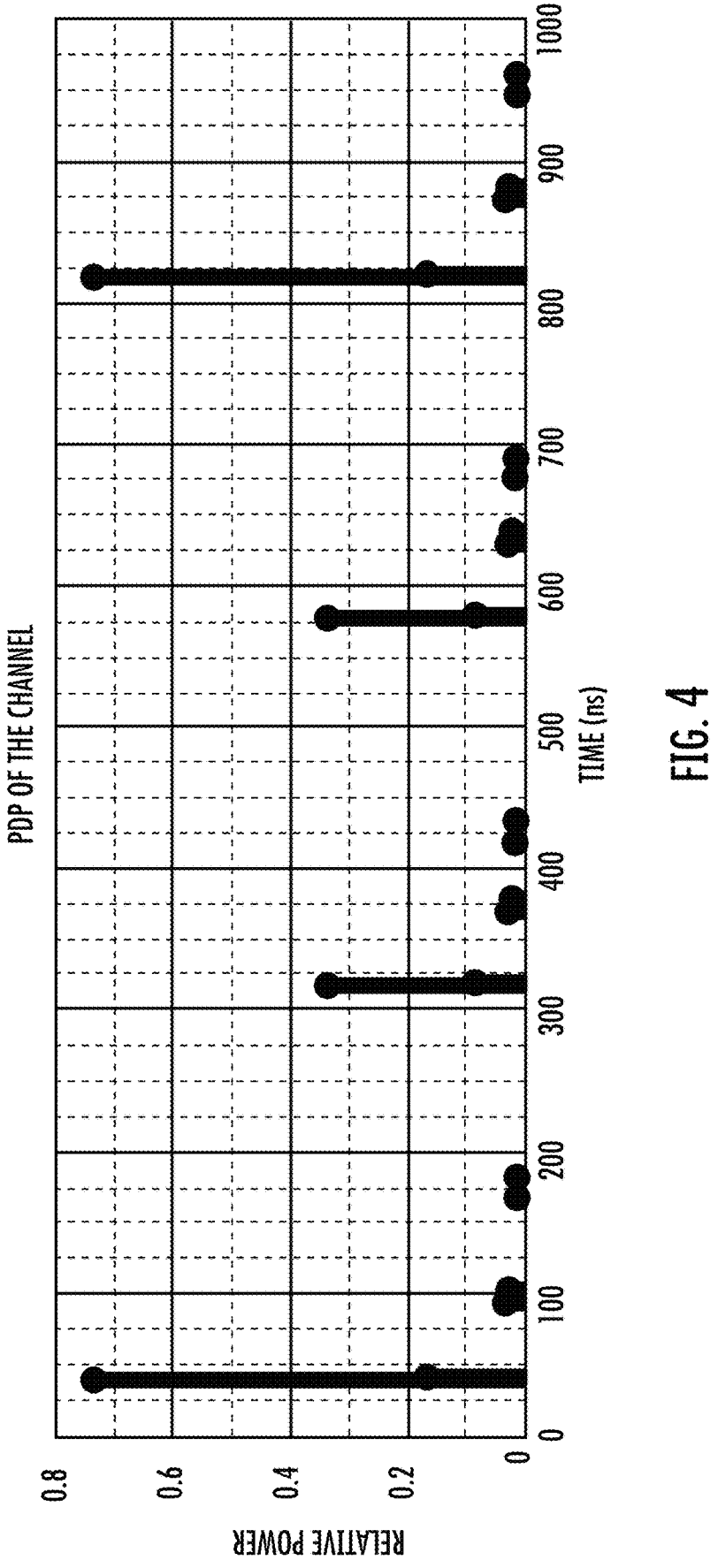
FIG. 4 shows an example of a power delay profile.

FIG. 4 shows an example of a power delay profile. The diagram or graph shows relative power versus time in nanoseconds, from 0 to 1000 nanoseconds. A power delay profile is another representation of a channel impulse response.

Figure 5:
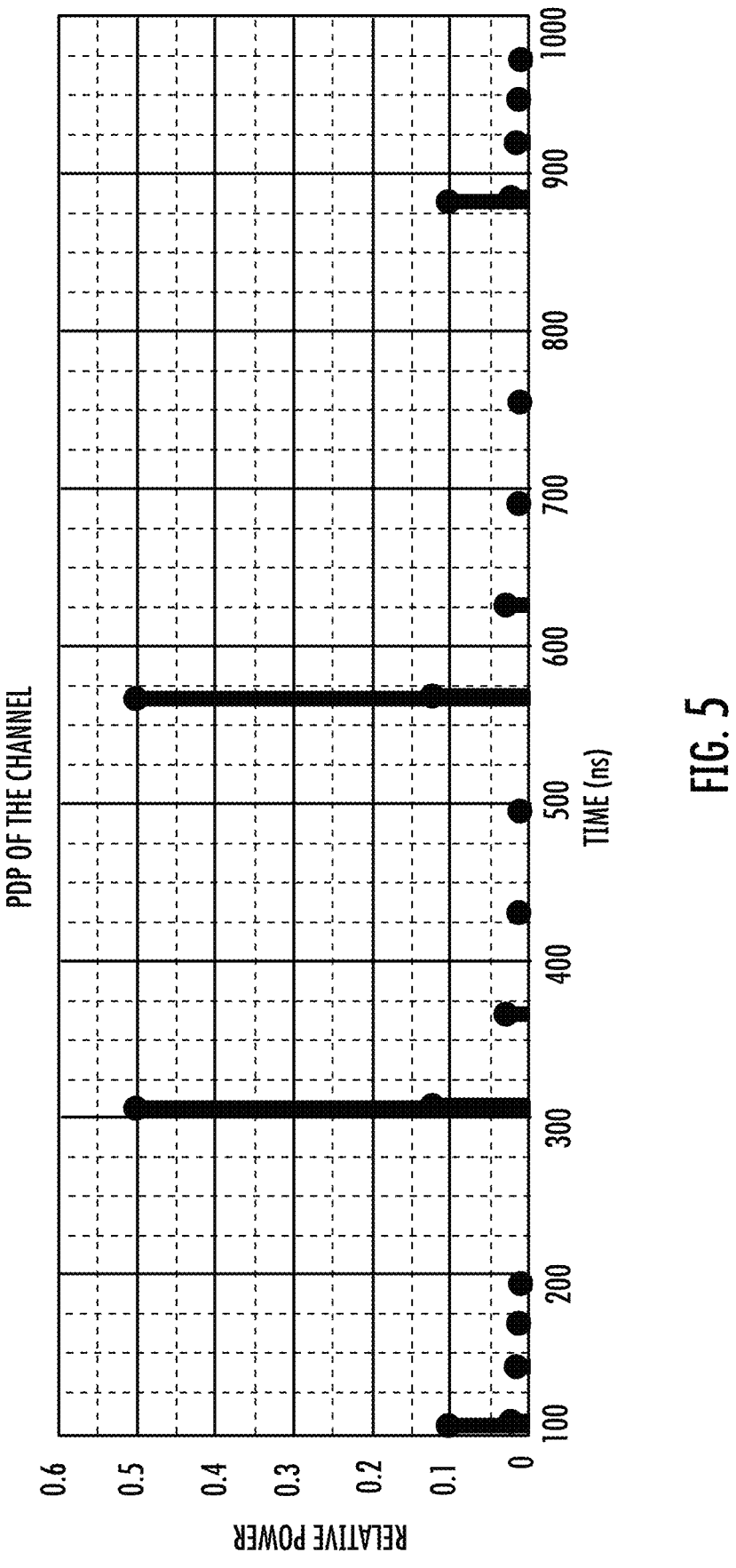
FIG. 5 shows another example of a power delay profile.

FIG. 5 shows another example of a power delay profile.

Inverse travel time gradients method. As described above, one method of designing indoor sites for location is to achieve an increasing and uniform travel time (time of arrival) gradient across the area of coverage. A significant improvement on this method is to utilize two or more different indoor RF sectors to produce a well defined time difference of arrival measurement. The time difference of arrival both in uplink or downlink will have a very unique feature where slope is doubled for the governing relation of location and time difference of arrival readings.

Standard method of design will produce an almost constant travel time difference between different sectors indoor.

Modifying the physical connectivity routes will create an increasing and decreasing Travel time (time of arrival) of two sectors with respect to the receiver's position. As one increase with a certain rate. The second is decreasing with a similar rate. And hence the difference is double the rate with respect to position.

Using a DAS channel controller there is no need to change the route of cabling and hence solve a real installation and implementation problem.

Figure 6A:
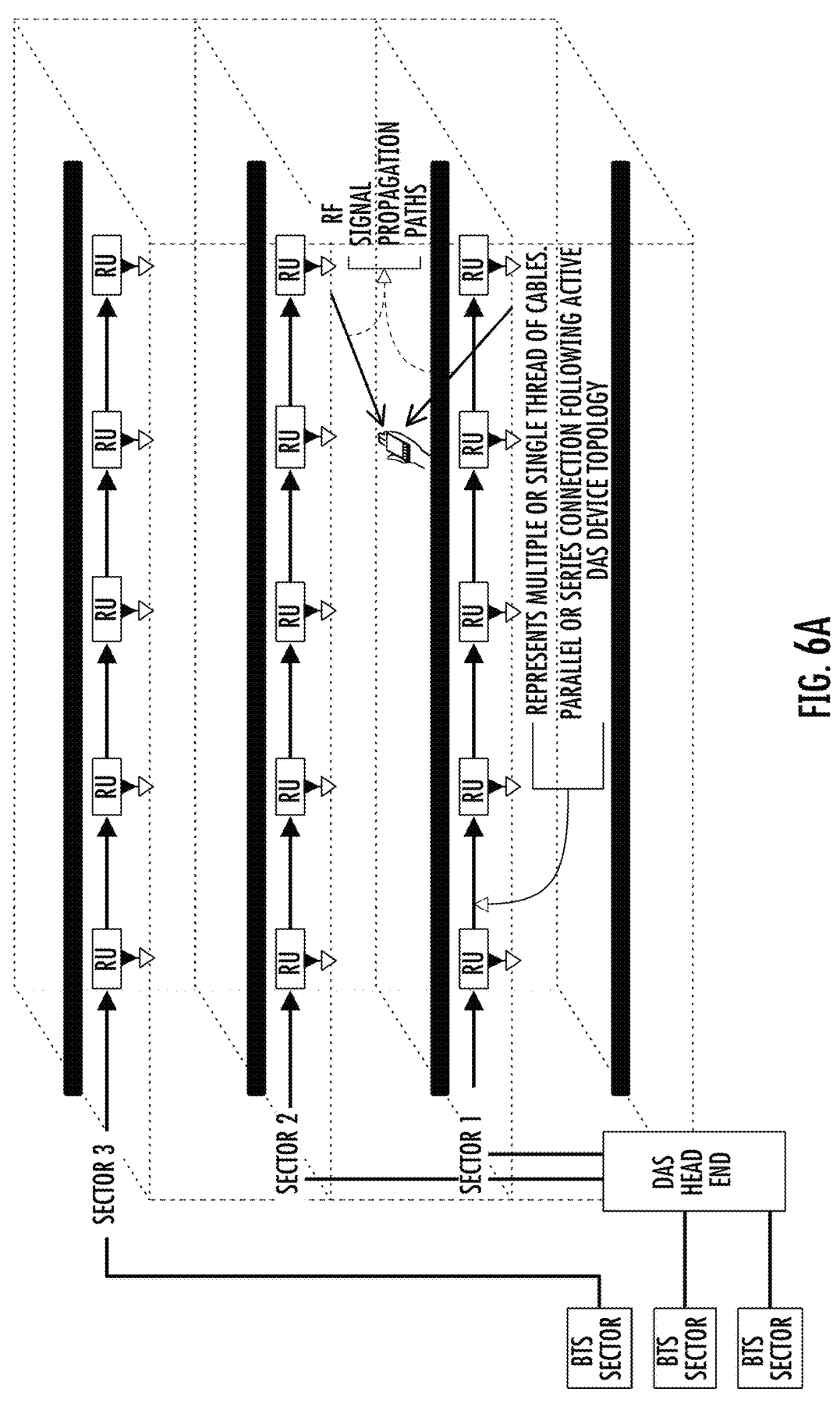
FIGS. 6A-6B show a method of design that will produce an almost constant travel time difference between different sectors indoor.
Figure 6B:
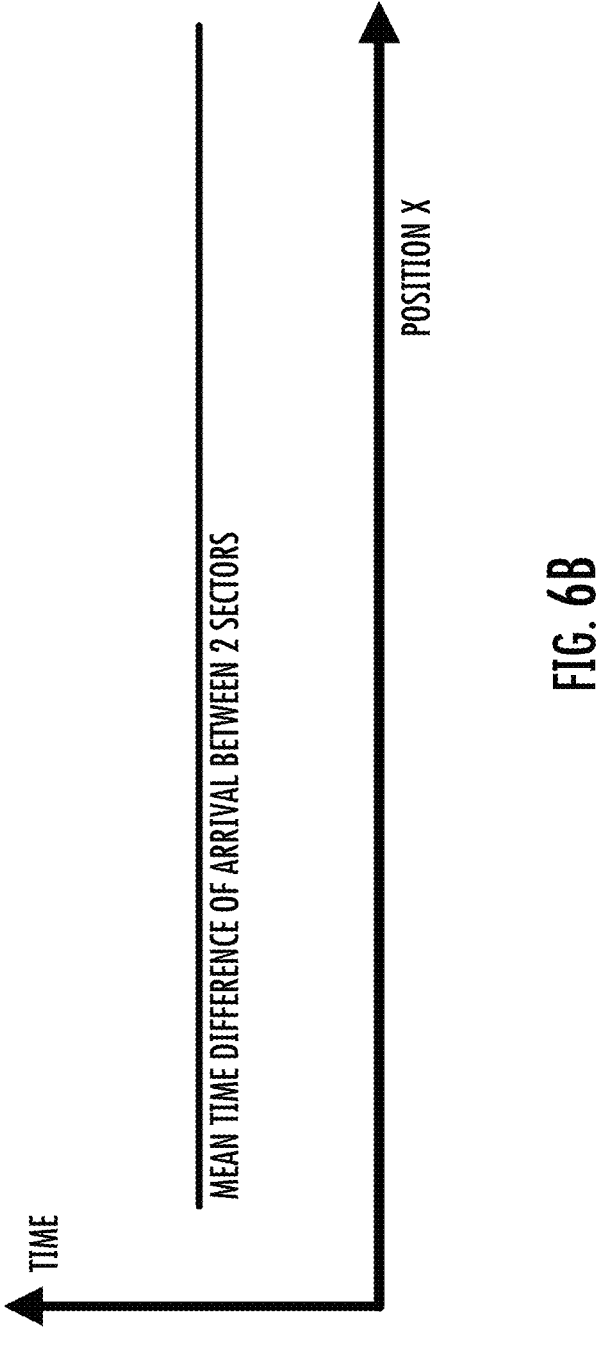

FIGS. 6A-6B show a method of design will produce an almost constant travel time difference between different sectors indoor. FIG. 6A shows an organization or positioning of receiving units (RUs) and antennas within a structure, such as a multistory building. For example, there are three sectors, which can represent three different floors. FIG. 6B shows diagram of timing versus position, indicating a mean time difference of arrival between two sectors.

Figure 7A:
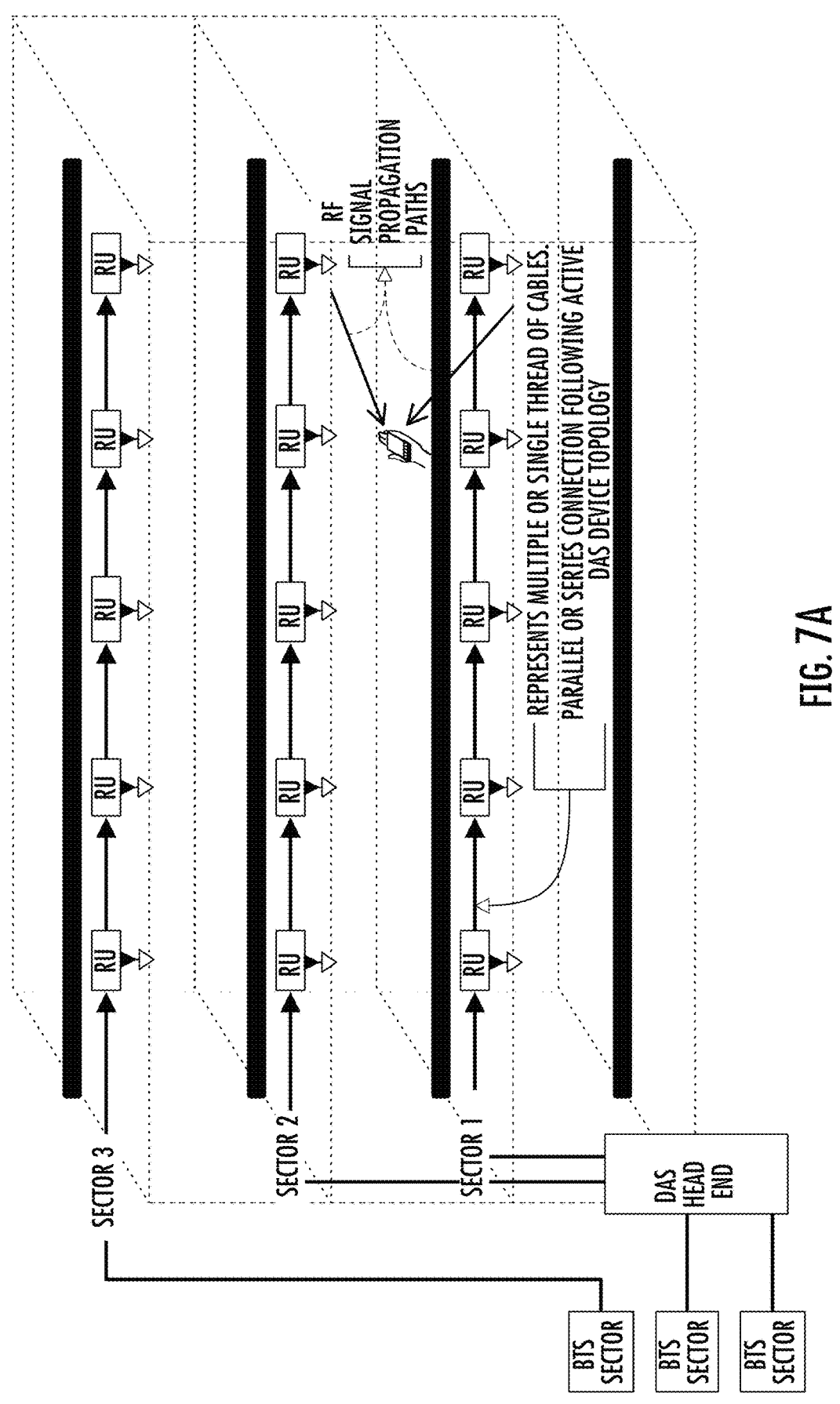
FIGS. 7A-7B show a method of design where modifying the physical connectivity routes will create an increasing and decreasing time of arrival of two sectors with respect to position.
Figure 7B:
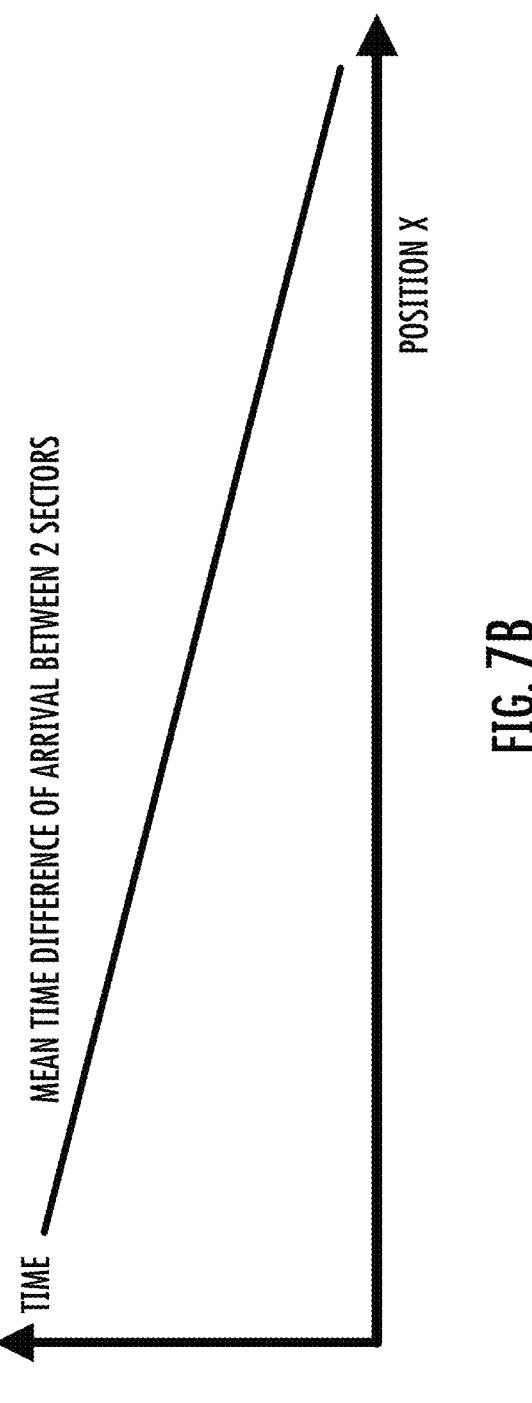

FIGS. 7A-7B show a method of design where modifying the physical connectivity routes will create an increasing and decreasing time of arrival of two sectors with respect to position. FIG. 7A shows an organization or positioning of receiving units and antennas within a structure, such as a multistory building. For example, there are three sectors, which can represent three different floors.

FIG. 7B shows diagram of timing versus position, indicating a mean time difference of arrival between two sectors. As one increase with a certain rate. The second is decreasing with a similar rate. And hence the difference is double the rate with respect to position.

Inverting spiral method. This method can be thought of as a special case of the inverse time gradient method except this one uses a single RF sector. In essence this means this method will use a different set of measurement to monitor the location. Namely the travel time or its variants (e.g. time of arrival, round trip time, and others) in addition to monitoring the channel impulse response or its variants (e.g., power delay profile, delay spread, and others)

The connection of transmitting antenna will follow an alternating direction in consecutive floors. A first floor will have the connection following a clock wise direction and a counter clock wise direction on the following floor. Utilizing this method each location can be identified by a unique set of channel impulse response and travel time of first multipath component. That can be measured in its simplest form by a unique round trip time and delay spread values.

Figure 8:
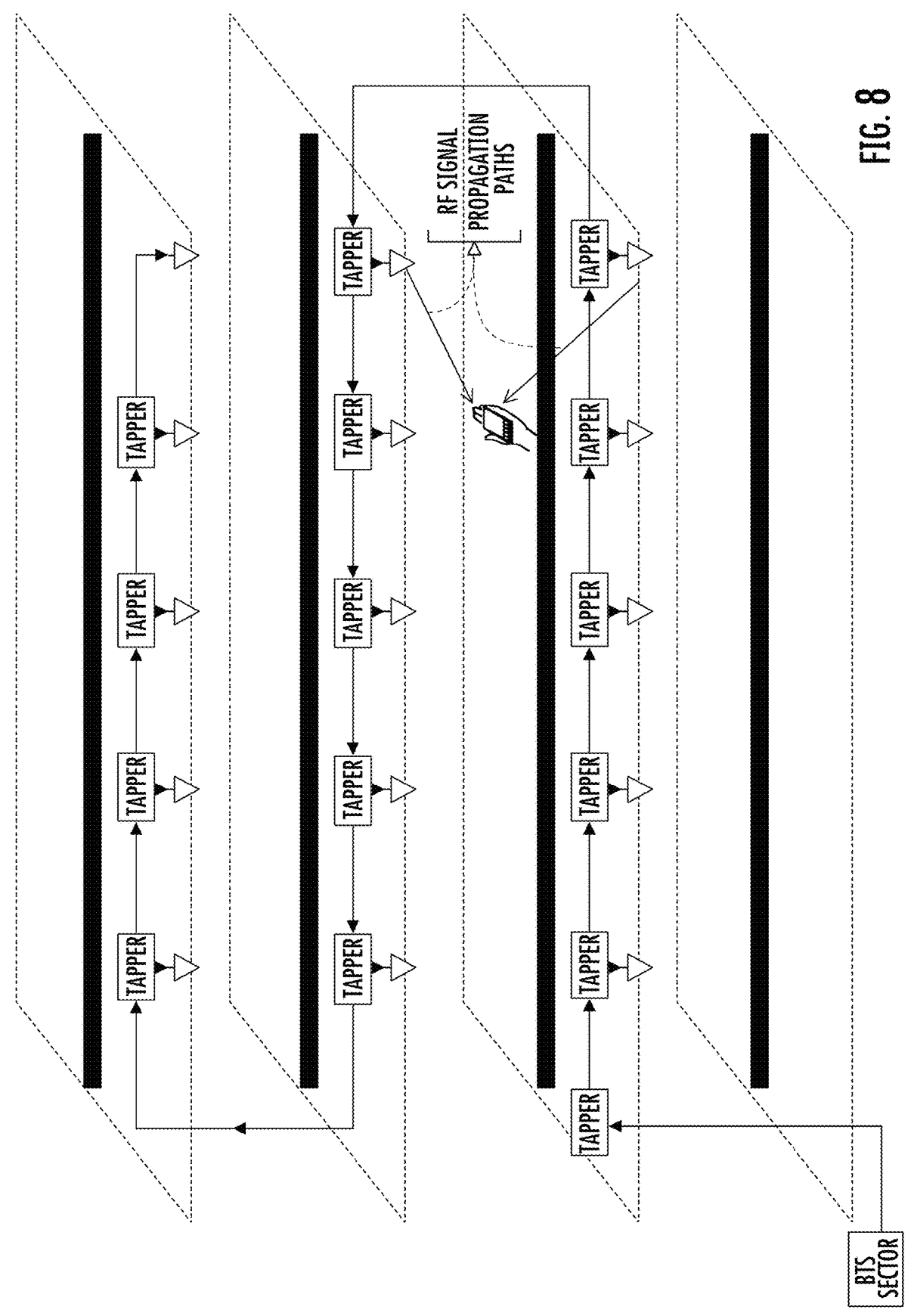
FIG. 8 shows a distributed antenna system connection using an inverting spiral method.

FIG. 8 shows a distributed antenna system connection using an inverting spiral method, assuming antennas are simplified and aligned in one direction. However, the general case can be of any arrangement in any direction across the floor.

Combining indoor and outdoor time readings of travel time (e.g., time of arrival) and other ranging methods to construct imaginary dimensions and reference lookup table. Assuming a site is well configured to have an increased gradient of time of arrival (TOA) across the coverage area. The time difference of arrival (TDOA) and all their variants measurements can be translated into a look up location adding an additional feature to look for.

Since the indoor delay is not linearly related to the distance from base transceiver station (BTS) (which is located inside a room). The standard method of time difference of arrival will produce erroneous results. A look-up table is designed and extracted from the modified indoor design to produce the correct time difference of arrival to location translation.

Location service system architecture. Several components contribute to a complete indoor positioning method. A simplified process and system components is described in Ahmed Sallam Mohamed Ibrahim, A Study of DAS delays and their Impact on the Wireless Channels with Application to Indoor Localization (2015) (published M.S. thesis, Rochester Institute of Technology), available at scholarworks.rit.edu/theses/8872/. This document is incorporated by reference.

The described methods and addition to the existing mobile network components are realized in both hardware and software components.

Software tools components represent, simulate, and predict the results of physical channel modifications to be carried out.

Channel changes are implemented through physical modification at the implementation phase. These modifications deviate from the standard approach of design and implementation of a distributed antenna system.

Additional hardware component are introduced that reduces the required physical modification and automate channel manipulation.

Figure 9A:
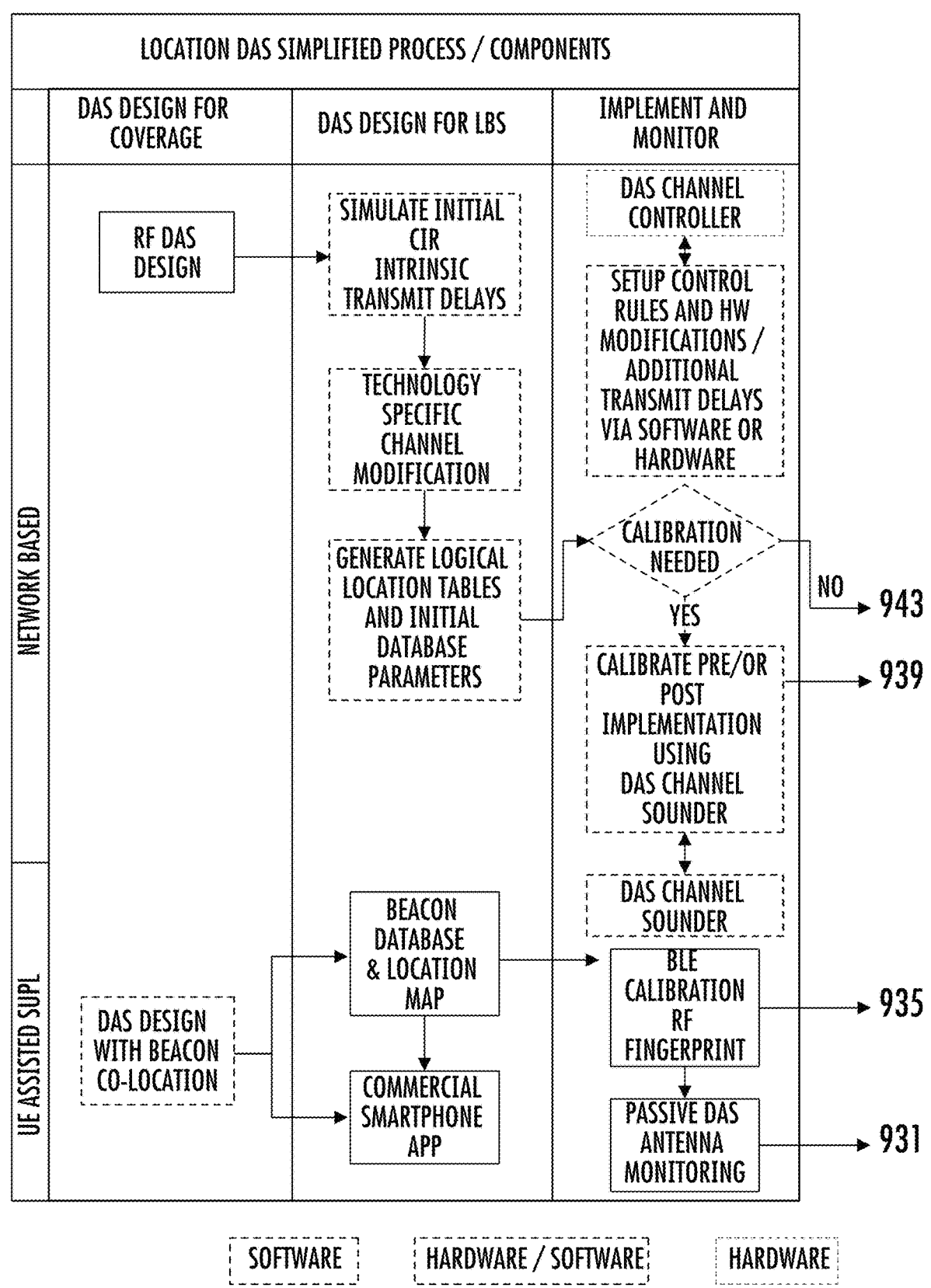
FIGS. 9A-9B show a simplified process and components for location determination on a distributed antenna system.
Figure 9B:
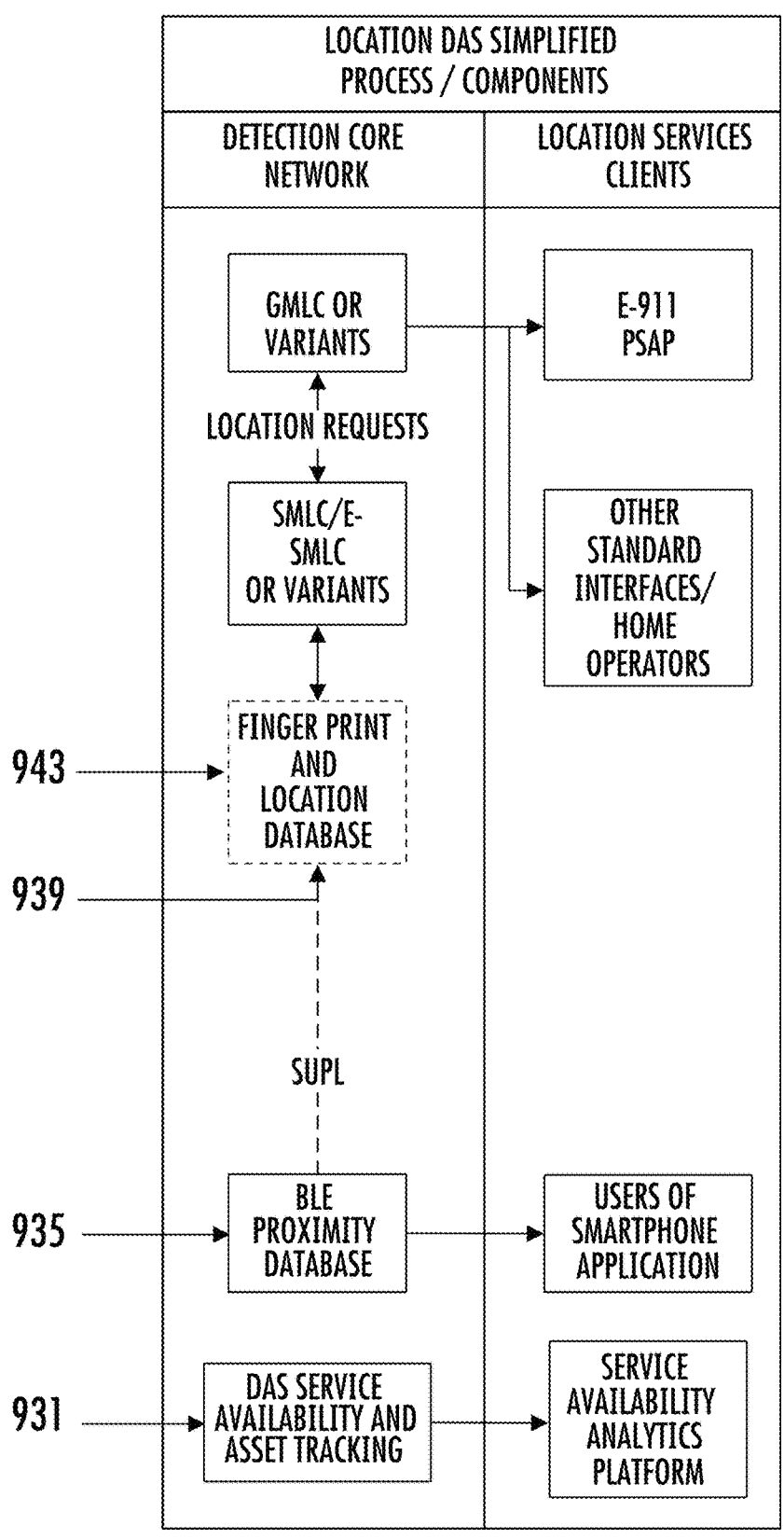

A special set of test equipment and tools are used to measure and calibrate the channel in real life. Also to provide continuous monitoring and update of location database and servers FIGS. 9A-9B show a simplified process and components for location determination on a distributed antenna system. Line 931, 935, 939, and 943 connect blocks in FIG. 9A to blocks in FIG. 9B.

Some of the blocks are software. These blocks include DAS design with beacon co-location, simulate initial CIR intrinsic transmit delays, technology specific channel modification, generate logical location tables and initial database parameters, and fingerprint and location database.

Some of the blocks are software and hardware. These include setup control rules and hardware modification and additional transmit delays via software or hardware, and calibrate pre or post implementation using DAS channel sounder.

Some of the blocks are hardware. These includes DAS channel controller and DAS channel sounder.

Physical channel modification methods and devices to control the CIR. Implementation of all methods described earlier on the infrastructure will require addition of calculated delays to the physical path of the signal either via digital delay or physical delay hardware. In addition to delays, modification of power output (e.g., amplitude of a signal) and gain settings is also a tool to be used.

Advantages and disadvantages of digital and physical delays and the role of the new channel controller for post installation modifications. Physical delay: Controlling the channel impulse response of a DAS system via introducing physical delay proves to be the most stable method of delay introduction into the system. However, trying to realize this using extra length of fiber and coaxial cables runs proves to be very hard to achieve from installation perspective. Also prone to uncontrolled modification by unaware users of the system (e.g., port changes and connection swaps).

Spooling physical cables to add more delay will require additional area and volume in installation.

The need for a device to control the channel impulse response for each location without any additional cable installation is crucial and a key success factor of the concept.

Digital delay: While controlling the delay using electronic delay lines or digital delays appears to be a straight forward method (e.g., using filters a digital signal processor (DSP) or a field programmable gate array (FPGA) circuit), the digital delay step proves to be large compared to desired resolution. To have a fine control over the channel impulse response a step of as low as, for example, 10 nanoseconds might require a very high sampling speed for the digitization of the signal. Fine adjustment and control over digital delay adds another complexity to the control system. Synchronization circuitry is also a source of complexity over the physical delays methods.

A digital system introduces a fixed digitization delay that might be beyond what is allowed by some technologies over the air interface.

Introducing the CIR modifications using a digital system is possible but going to increase such delays and render the DAS system incompatible with some technologies. A controllable physical delay is the most suitable method for all technologies.

DAS channel controller hub includes:
1. Physical channel controller as an add-on or integrated into DAS equipment over any transmission medium such as optical fiber and copper.
2. Allows the designer to insert, sort and arrange additional fiber length beyond the minimum required cable length to connect two active DAS elements.
3. DAS channel modifications such as delays can be introduced in downlink (forward) or uplink (reverse) paths independently allowing the designer to control the uplink and downlink channel impulse response independently.
4. Independent changes on uplink and downlink paths add additional degree of freedom when crafting a special CIR and location detection techniques to eliminate location ambiguity. This addition can be made on the downlink only keeping uplink intact or vise versa.
5. Main use case of the channel controller is to create a unique CIR in either uplink or downlink. Minimizing a multipath effect is not the target of this delay as used in previous approaches. Specifically, it is important to mention that "minimizing multipath components" and delay is not a target of this DAS channel controller and not considered a desired outcome, on the contrary to previous methods where introduction of delays was done solely to minimize multipath at a certain reception point. The methods described maintain multipath and controls it in a unique manner to allow identification of user equipment location.
6. This DAS channel controller eliminates the need to spool cables externally or add additional cable lengths other than the needed for installation purpose. This applies for all methods described in this document
7. The device has a processing and communication units to perform needed calculations with the aid of other system components in DAS hardware, testing tools and system servers
8. The device performs the following task in addition to its main task: Measure, calibrate monitor, and control the CIR in terms of its different component timing and amplitude in both the downlink and uplink directions associated with a certain location coordinate in a predefined indoor coordinate system.
9. Measure and perform calculations of user equipment processing retransmission time.

FIG. 10 shows distributed antenna system channel controller inline with active distributed antenna system components. Some functions of the DAS delay controller can include: Periodically or continuously monitor the predefined das cable lengths. Maintain the predefined settings against uncontrolled changes such as cable changes and cable swaps. Alarm and notification of changes on connected cable lengths. Cable types can be fiber or coaxial cable.

Components for FIG. 10 include:
1. RF signal Source, BTS, LTE eNodeB, and others.
2. DAS head and equipment and hubs.
3. Duplex cable pairs (two core for uplink and downlink communication).
4. Channel controller. External or integrated with DAS head end (first stage).
5. DAS.
6. Channel Controller. External or integrated with DAS HUB (second stage).
7. Duplex cable pair or any other medium of transmission implemented in DAS hub (coaxial, twisted pair, or others).
8. DAS RF remote unit connected to DAS hub.
9. DAS antenna connected to remote unit using coaxial cable.
10. DAS RF remote connected directly to first controller.
11. Coaxial cables.

In FIG. 10, a number of RF transceivers is connected via cables to the DAS head end equipment and hubs. The DAS head end is connected via fiber to the DAS channel controller. The DAS channel controller is connected to a number of DAS hubs. A DAS hub is connected to another DAS controller, which is connected to a number of remove units, which are connected to antennas.

FIG. 11 shows active distributed antenna system channel controller details. Components for FIG. 11 include:
1. External or Embedded Channel Controller n duplex inputs n duplex outputs.
2. Optical Cross Connect n×n (duplexed port).
3. Delay lines (fine adjustment stage 1).
4. Delay lines (fine adjustment stage 2).
5. Delay lines (coarse adjustment stage 1).
6. Duplex Port.

In FIG. 11, a number of cross connect circuits or blocks are connected in a daisy-chained configuration.

FIGS. 12A-12B show when using a distributed antenna system channel controller there is no need to change the route of cabling and hence solve a real installation and implementation problem. More specifically, these figures show an example of a specific detection method (e.g., time difference of arrival) as applied to a three-floor structure.

FIG. 12A shows an organization or positioning of receiving units and antennas within a structure, such as a multi-story building. For example, there are three sectors, which can represent three different floors. FIG. 12B shows diagram of timing versus position, indicating a mean time difference of arrival between two sectors.

Multiple cables method for passive design using coaxial cables. Multiple propagation velocity factor cables are used within a single installation to produce the desired CIR. The type of cable is selected to produce the maximum time stretching between adjacent antennas in the same floor based on the designer choice.

Different cable types for typical floors setup provides unique fingerprint to each floor. The same concept applies for active DAS with different fiber cable types producing different speeds of light.

FIG. 13 shows different fiber refractive index method. Using a high refractive index fiber in an installation will allow for increased time stretching between different transmitters. In star configuration a mix of cables can be used to allow for control over propagation time. The velocity factor of propagation in fiber cables are related to the refractive index of the fiber.

Additionally, using a higher refractive index fiber in one installation will guarantee a higher time stretching. Adding a second or third type of optical fiber cables with different refractive indexes allow for more time stretching.

Some selection of cables types has n=2.5 or n=1.5 or any available refractive index.

FIG. 14 shows hardware delay tapper or power divider method. A physical delay hardware tapper introduces a fixed delay to one side only of the signal output to delay the signal in that particular branch with a predetermined delay value.

Measurement, monitoring, and control system. A special monitoring and control hardware board embedded into the DAS channel controller described above and DAS system in different points continuously produce a test signal outside the communication band to monitor any changes in the cable length. Compares the value with stored baseline values of cable lengths to trigger an alarm when these values are changed for all connected signal paths. The system will have the following components and functions.

Bidirectional distributed channel estimation and sounding with location logging includes:

1.1. One Direction 1.1.1. Single TX→Multiple Transmit Antenna→over the air channel→Single RX antenna→Channel sounder receiver.

1.1.2. Single TX→Single Transmit Antenna→over the air channel→Multiple RX antenna→single RX receiver.

1.2. Round Trip Channel Sounding of the overall complete indoor area:

1.2.1. Single TX→Multiple Transmit Antenna→over the air channel→Reflection back from indoor channel to the same Antennas→returned values to the same Transmitter location over the same channel where an RX is collocated 1.3. Round Trip Channel Sounding of a Single point in indoor space:

1.3.1. Single TX→Multiple Transmit Antenna→over the air channel→RF repeater device (emulating the user equipment at a defined point)→over the air channel→multiple antenna to a co-located Single RX.

FIG. 15 shows distributed antenna system sounder interaction with a distributed antenna system. External and internal parts of the channel sounder performs continues tests on fiber, coaxial, and over the air channel components with result correlated to a physical position.

Independent Location logger channel sounder. Channel anomaly detection and reporting. (physical change on infrastructure). Calibration and auto adjust of the delays to deliver required CIR per location in an automated procedure at infrastructure commissioning stage and adjusting phase for baseline creation.

Functions of the DAS Sounder can include: DAS channel sounder in downlink with location logging. DAS channel sounder in uplink with location logging. Collective uplink and downlink channel sounding using frequency translation and retransmission in a transceiver (TRx2) with location logging. Works with any type of DAS; passive, active, and hybrid.

Components for FIG. 15 include:

1. DAS sounder transceiver (TRx).
2. DAS head end equipment and hubs.
3. Duplex cable pairs (two core for uplink and downlink communication).
4. Channel controller. External or integrated with DAS head end (first stage)
5. DAS.
6. Channel Controller. External or integrated with DAS HUB (second stage).
7. Duplex cable pair or any other medium of transmission implemented in DAS hub (coaxial, twisted pair, and others).
8. DAS RF remote unit connected to DAS hub.
9. DAS antenna connected to Remote unit using coaxial cable.
10. DAS RF remote unit connected directly to first controller level.
11. Coaxial cables.

In FIG. 15, a DAS sounder is connected to DAS head equipment and hubs via cable (e.g., copper wire). The DAS head equipment is connected via fiber to the controller with n duplex inputs and n duplex outputs. The DAS channel controller is connected to a number of DAS hubs. A DAS hub is connected to another DAS controller (having n duplex inputs and n duplex outputs), which is connected to a number of remove units, which are connected to antennas. A DAS sounder transceiver (TRx2) with location logging can transmit and receive wireless (e.g., via a RF signal propagation path) to the antennas connected to the remote units.

Continuous feedback and adjusting process. Post processing of collected results applying machine learning algorithms to simplify pattern matching and detection algorithms.

Live adjustment of detection database.

Fingerprint database. Live detection of coverage quality and reporting of anomaly with location.

Location antenna patch. An RF power harvesting device is patched to DAS antenna. Transmitting an RF beacon signal to identify an antenna. The power harvesting mechanism is built over the Transmitted Power from the serving antenna. In other versions or options it can harvest power from light or power supplied via power over Ethernet. The patch can have an optional short life battery.

Harvest antenna RF signal power. Transmits a periodic coded signal containing the beacon ID and identifying parameters. The coded signal can be encrypted to eliminate the possibility of cloning the beacon data or rouge beacons.

A database of the coded beacon IDs and encrypted message keys and installation locations is maintained in a core network.

Mobile handsets read the beacon ID, when a distress call is initiated for example, and transmit them back to the location server in the mobile network using a Secure User Plane Location (SUPL) protocol. The transmitted data can also be communicated via a smartphone application or app or via the operating system to the location database.

The database returns back the location of the user as a response to the lookup request.

Same patch can serve as a standard location and proximity beacon with harvesting option.

The same patch reports back to the servers, through a gateway device and mesh network, the status of the nearby antenna. If the antenna is not transmitting power as per the baseline value, an alarm is triggered at the monitoring server to initiate a maintenance request. Serving as a mobile service monitoring device as well as proximity and location beacon with asset tracking functionality.

To maintain the previously described network based methods of localization, the RF signal output of the DAS is also monitored to make sure the channel characteristics are maintained as per the designed values. The channel characteristic is subject to change if one of the antennas in the DAS system is malfunction. The patch will report back to the server via an independent mesh and network connection that a particular antenna is not transmitting. This will allow the server to dynamically recalculate and update the CIR to adjust the lookup tables for the affected location. Any subsequent location requests from the affected area will have the most appropriate response depending on the new CIR. If there is no possible ambiguity in the new calculated CIR the results will be accurate. However the mobile signal levels should be fixed to maintain the proper coverage in case the simulation shows a possible ambiguity with other locations. The location response will be flagged accordingly with the other locations and an immediate request to fix the antenna issues will be sent to concerned parties.

There can be a dynamic recovery of the lookup tables in case of a signal loss of any of the antennas. When the patch monitoring the antenna coverage detects a signal loss of one of the antennas. This will trigger simulation of the lookup database to produce new set of data for lookup.

Software and simulation tools. A part of the previously described methods of location is the ability to simulate and emulate the actual performance of the system in both the design phase and the dynamic update operation of the system. Software tools are part of the system to implement and aid in the design will have the below software components and algorithms.

1. Design tools
1.1. RF propagation simulation software with channel impulse response simulation and DAS hardware delay database.
1.1.1. Database of coaxial cable loss and delay
1.1.2. Database of wall loss and delay
1.1.3. Ray tracing propagation algorithms with Wall loss and phase shift calculations
1.1.4. Ray tracing and propagation algorithms with super-position of CIR considering accumulated Transmit delays of all antennas in the region 1.1.5. Simulate and generate delay profiles for different location
1.1.6. Simulate and generate CIR profiles for different locations.
1.2. Automation algorithm to suggest best design methodology out of the described methods to achieve clear location information with minimum modification
1.3. Automate the Elimination detection ambiguity
1.4. Simulate LBS accuracy and CIR based on a given design.
1.5. Simulate LBS accuracy and CIR Based on Technology specific detection methods (e.g., 3G, WCDMA, CDMA, LTE) for a given design
1.6. Simulate all described methods above with all readings per location (e.g., logical location)
1.7. Optimize the design to minimize needed modifications on existing infrastructure and installation cost and material.
1.8. Prepopulate the location database with initial information needed for location lookup of each technology
1.9. Simulate database lookup time and efficiency.
2. Software tools and algorithms to simulate and reconstruct CIR from channel sounder DATA for the following cases
2.1. One Direction
2.1.1. Single TX→Multiple Transmit Antenna→over the air channel→2.1.2. Single RX antenna→Channel sounder receiver.
2.1.2. Single TX→Single Transmit Antenna→over the air channel→Multiple RX antenna→single RX receiver.
2.2. Round Trip Channel Sounding of the overall complete indoor area:
2.1.2. Single TX→Multiple Transmit Antenna→over the air channel→Reflection back from indoor channel to the same Antennas→returned values to the same Transmitter location over the same channel where an RX is collocated
2.3. Round Trip Channel Sounding of a Single point in indoor space space:
2.3.1. Single TX→Multiple Transmit Antenna→over the air channel→RF repeater device (emulating the user equipment at a defined point)→over the air channel→multiple antenna to a co-located Single RX.
2.4. Software to super impose individual channel sounding results of individual antennas on TX and RX to reconstruct actual CIR
3. Location database and management tools
3.1. Optimization modules for location-based services.
3.2. Dynamic update of the database
3.3. lookup time minimization techniques
3.4. Machine learning algorithms to extract service coverage data anomalies.
3.5. Manage installed devices including patch devices and channel controller.

FIG. 16 shows a distributed antenna system 1608 including a receiver 1615, channel controller 1622, a first antenna branch 1627 having antennas 1 (1634) and 2 (1638), and a second antenna branch 1647 having antennas 3 (1654) and 4 (1658). The receiver is connected to first configurable delay 1 (D1) 1663 of the controller and a second configurable delay (D2) 1669 of the controller. The controller has a first input 1672 (connected to D1) and second input 1674 (connected to D2).

The first input of the controller is connected to the first antenna branch, including antennas 1 and 2 connected in series. A first end 1676 of the first antenna branch is connected to antenna 1 while a second end 1678 is connected to antenna 2. The first input of the controller is connected to antenna 1 at the first end of the first antenna branch.

The second input of the controller is connected to the second antenna branch, including antennas 3 and 4 connected in series. A first end 1681 of the second antenna branch is connected to antenna 3 while a second end 1685 is connected to antenna 4. The second input of the controller is connected to antenna 4 at the second end of the second antenna branch.

In an implementation, the first end of the first antenna branch is physically closer to the channel controller than the second end of the first antenna branch. The first end of the second antenna branch is physically closer to the channel controller than the second end of the second antenna branch. A distance bar 1692 indicates positioning of the antennas and ends of the antenna branches are indicated by a distance bar relative to the controller.

An implementation relates to capturing and presenting parameters related to and affecting physical systems to generate a digital twin that help in operating, maintaining, monitoring, and upgrading systems to deliver the desired operational results.

In particular, this implementation invention relates to, but is not limited to, distributed antenna systems and in-building systems. The patent application describes systems and methods for seamless measurement collection, analysis, and integration with design software to create and maintaining exact as-built digital twins and capturing deviation of deployed systems from designs.

By utilizing the methods, procedures and systems described in this patent application, stake holders can:

1. Streamline as-built documents creation with automated data collected from various sources and types of measurements.
2. Reduce number of measurement points on a system to achieve full documentation of system's parameters and performance taking into consideration specific testing tools limitations.
3. Reduce time and cost creating and analyzing standard measurement reports.
4. Auto detect faults and warnings.
5. Autogenerate measurement plans based on a system design and measurement rules that reduces the overall measurements effort.
6. Avoid costly mistakes on installations.
7. Remote supervisory monitoring.

Introduction. Designing and building systems go through common phases like design, deployment, commissioning, and operations. Although every industry has its own characteristic processes, these industries depend on feedback and lessons learnt from designs and deployments to build knowledge bases and improve future design factors, systems, and processes.

For some industries, the knowledge feedback loop of comparing the designed systems against built ones can be as simple as surveying quantities and comparing them with design quantities. For other industries, the learning process comparing designs and deployed system involves complicated processes, KPIs and outputs measured with certain measurement inaccuracies. It is important to have as accurate as possible representation of the delivered system parameters to compare against designs to extract insights used in future designs. The simplest form of such representation is to document the as-built system quantities and parameters.

For example, design of Wireless communication systems involves Electromagnetic wave propagation models that were derived empirically or calculated with deterministic methods such as raytracing. Wireless Design software such as "FullRays® Design" (a trademark of LocationDAS Inc.) can be used to design wireless infrastructure and calculate Transmitted signal power from Transmitting Antennas, it can then be used to predict received signal strengths at specific physical locations using Electromagnetic propagation models. These propagation models are configured with parameters and assumptions based on experience and feedback from previous designs and deployments. To improve propagation model parameters and assumptions further, an accurate measure of the Actual Real life transmitted RF power from installed antennas should be obtained and design documents are updated through the as-built documentation process.

For a deployed Distributed Antenna System (DAS), it is extremely hard to measure the actual RF signal delivered to the Transmitting antenna port due to access difficulties, not to mention human error factors. A technician can perform the measurement on the last point prior to a transmitting antenna on a live system or during injection tests to measure the power delivered to the antenna but connect back the antenna in a wrong way causing a reduced transmitting power compared to available power and provides a source of error in consecutive baseline and calibration process.

An alternative way is to perform a go/no-go check below the antenna to see if an antenna is transmitting or not or have a range of expected RF power at the known distance from the antenna under test. This includes the sum of all components affecting the coverage like the antenna pattern and multipath fading which can be significant. Adding to that, these measurements are done without verified information on what is the actual power transmitted from the antenna. Making it much harder to calibrate a design process and optimize it with all these variances adding up together.

Up to date, best practices of DAS acceptance tests depend on a guesstimate of antenna transmitting power based on a desktop design that is sometimes far from the actual implementation with no way to verify what is the actual transmitted RF power, especially for high power DAS with longer runs of passive coaxial cables and splitting components.

Thus, all over-the-air coverage analysis done on these inaccurate as-builts will result in an error affecting the RF propagation models. Such errors will only be compensated with Design safety margins leading to over-designs and reduced cost efficiency both as Capital expenses and Operational expenses.

Having a practical and easy way to determine the actual RF transmitted power of a deployed system without introducing changes to the deployment will eliminate any sources of uncertainties in the final outcome. This in turn will improve the process of propagation model calibration and reduces unjustified safety design margins leading to a cost optimized and environmentally friendly systems. Furthermore, this will clear a path to build a better knowledge about RF propagation models. Additionally, this will help capture deployment and design mistakes at the very beginning of infrastructure construction. Wireless design process is tolerant to dimension and drawing scale setting mistakes. The variation in the dimensions scale is normally unnoticed since it is always compensated with quantity safety margins and Design target safety margins which normally lead to extra material being consumed and installed. A 5 percent to 15 percent error in the design document scale can go normally unnoticed. However, if other factors do not compensate for the errors, this can lead to an underperforming infrastructure.

In this invention, multiple sources of test and measurement results will be aggregated and analyzed against a set of modified instances of the design representing accurate models of the Subsystems being tested. These designs are autogenerated based on the test type then simulated to extract the actual indoor channel model considering cable and device reflections and indoor channel models. Various analysis, comparison and artificial intelligence algorithms can be applied on both the simulated and the measured quantities to cross validate and extract the most accurate model of the final composite system.

Measurements can include, but not limited to, standard sweep tests done on Segments of the DAS cables, Reflection measurements done on completed subsets of the branch network of the DAS, Spectrum Analysis, injection test done on point of intercepts, Passive intermodulation tests, etc. Other nonstandard measurements such as distance to fault and Channel impulse response performed on a compound subsystem to reduce multiple measurements into single one. Utilizing methods described hereafter to aggregate measurement and yet provide the same expected results with lower testing points to troubleshoot installation and to extract data required for accurate as-built and live digital-twin generation.

2.1. Main-Stream Best Practices and Their Limitations.

The following tests and practices are considered the best practices for System acceptance tests to check the quality of a DAS or network installation and to verify coverage conformance with design requirements. These tests may vary in names and adoption depending on region and are mentioned here for reference.

2.1.1. RF Continuity Tests.

A Signal generated with specific frequency is injected into a point in DAS and its output is measured at a different point. Difference between injected power and measured power represents the loss or gain of power between the two points.

This provides a quick and easy way to check if signal pass through all intended paths and loss or gain values are consistent with expected.

2.1.1.1. Advantages:

Quick and easy test used at the commissioning stage before site on air.

2.1.1.2. Drawbacks:

Done on a segment of system and requires downtime. Involves disconnecting part of the system and reconnecting it again which may introduce faults during reconnection.

2.1.2. RF Injection Test.

A Signal generated with single or multiple frequencies is injected into the final deployed Distributed Antenna System replacing the planned Base Station Systems (BTS).

The RF power is then measured at the intended coverage areas of the building or venue.

This provides a full End-to-End testing to capture the delivered Wireless coverage levels to different areas of the building. A similar approach is done in the reverse communication direction by placing a transmitter below each antenna and measure the received signal at a time delivered to the testing device located at the root of the network.

2.1.2.1. Advantages:

Quick and easy end-to-end test of the outcome of a deployed system.

2.1.2.2. Drawbacks:

Measurements are done over the air with Human body losses and variable receiver heights, movements of other people occupying the building and inaccuracies of mapping measurements to the exact position of the receiver. In addition, variation due to fast and slow fading inside the building environment can vary the signal levels significantly when measured below antenna at a known distance.

Such test cannot provide information about insignificant problems with the system. It sometimes can highlight major disconnecting parts of the DAS network to check continuity.

Relying on this test to calibrate propagation model will not be accurate as the actual transmitted power is probably different than the designed value.

2.1.3. Reflection Tests

Tests performed on DAS networks to verify conformance to the specification across the operational frequency range. The goal is to capture an overall measure of signal transmission through the DAS network across the operational range. Since Reflection test can measure reflections up to certain depth of the network. It must be done on smaller segments of the network to guarantee capturing any possible issues with the entire installation. The assumption is that if all components are tested individually, the final system will be fully functional.

This is unfortunately will not capture issues that can arise while connecting various system components together. A completely disconnected antenna may not show on the overall reflection test performed on the root of the DAS network.

2.1.3.1. Advantages:

Provides a safety check for power reflected to BTS.

2.1.3.2. Drawbacks:

Reflection tests cannot identify problems deep down a passive DAS network.

2.1.4. Distance to Fault

Distance to fault (DTF) is a variant of the reflection test where the measurement is done in the time domain and displayed in Distance domain. DTF tests can provide location of anomalies on a cable under test.

2.1.4.1. Advantages:

Saves time finding and troubleshooting a problem in DAS network.

2.1.4.2. Drawbacks:

Must be performed on a single cable with no branching.

2.1.5. Passive Intermodulation.

Passive intermodulation provides a measure of how linear the system is at high power inputs with multiple tones.

2.1.6. Uplink Noise Measurement

Noise level measurement is important to optimize the performance of integrated electronic devices carrying and transmitting an RF signal. Optimizing the Dynamic range of the system requires accurate measurement of introduced RF noise at specific Gain settings. Changes on gain settings or number of devices connected to an active DAS hub affects the overall noise performance. Measurement should be done on the final and approved gain setting.

FIG. 17 shows a digital-twin life cycle.

3. Digital Twins of Systems 3.1. General Function and Representation of a Digital Twin A digital twin computer implementation analyses the real time output data of the system and all available control parameters to continuously evaluate and assess changes to the physical system and infrastructure to indicate faults and suggest remedies and priorities to address. A functional block diagram of a digital twin can be seen in FIG. 17.

A problem often discovered while operating systems for the first-time post implementation is the huge deviation of the actual as-built system compared to the documented system. This is attributed to a gap and inaccuracy of information transfer between different stakeholders. Building live digital twins while deployment is still undergoing can prevent such problem. In that context one can classify digital twins into different types 3.1.1. Types of Digital Twins
1. Static Digital Twin: Represents a snapshot of the System and Digital Twin.
2. Live Digital Twin: Represents The physical system at any given time with live updates between physical system its twin
3. Future Digital Twin: A representation of the system if certain changes were introduced in the future. It is used to for upgrade scenario analyses and modeling for informed decision making.

FIG. 18 shows a generic representation of live digital-twin and its interactions with actual systems.

3.2. Live Digital Twin and System Components
1. Physical Environment Database
2. Interaction Controller/Digital twin controller
3. Systems Control Mediator
4. System Parameters Database
4A. Semi Variable input parameters
4B. Static Input parameters
4C. Gain Settings
4D. Variables and controllable input parameters
5. Parameters interpretation Engine
6. Individual Element twins
7. Live Desired output Twin
8. Digital twin controller
9. Digital twin computer model
10. Live Desired output parameters and information
11. Physical System
11A. Actual System elements
11B. System controller
11C. Physical Environment
11D. Actual system output
12. Other coexistent systems
13. External Systems
4. Techniques Used for Testing, Digital Twin Generation, Maintenance, and Live Update of Physical System and Environment Changes.

It is important to highlight that measurements done on a DAS branch or a Device Under Test (DUT) like antenna are corresponding to a smaller subsystem taken out of the final intended system for the period of the measurement. These measurements can be invalidated when the subsystem is put back to its final assembly. Measurements should be evaluated based on the exact status of the devices under test during the measurements. The information needed to be extracted from the measurement should consider how this device or a subsystem is going to be integrated in the final system.

For example, measuring an onsite terminated cable to check connectors' quality after fabrication is merely a representation of that particular cable loss and reflection parameters of the cable with or without a known termination load, while when integrating this to the final setup, the termination load and the cables and connectors have a set of measured subsystems removed, such as the termination load, and unmeasured variables introduced to the system, such as the quality of connector tightening with other components. In short, the measured values, however detailed, are merely an indication of some of the system components but not an exact representation of the final system assembly.

The main steps to build an accurate as built and a digital twin are as follows.
1. Design and document the design.
2. Deploy the system based on the documented design then perform troubleshooting if need be.
3. Perform measurements on the full system or Subsystems.
4. Generate Modified versions of the Design equivalent to the measured subsystem.
5. Extract and Analyze measurements data.
6. Compare it to its equivalent subsystem.
7. Construct the final as built and digital twin by analyzing of the superposition of individually measured subsystems and results accounting only for the component and values related to the final system design.

The following are set of techniques used individually or combined to construct detailed information about the installation and deployment of a system in telecommunication space.

4.1. System Impulse Response
4.1.1. Simulating Point-to-Point System Impulse Response: System impulse response is the full characteristic of the system's behavior, changes on the system or its interacting environment reflect on the System's characteristic and can be detected by monitoring System's response to the impulse signal. Simulating and performing an impulse response on the system or its subsystems then analyzing both results enable full and accurate system characterization.

4.1.1.1. Steps for Simulating Impulse Responses of a System or a Subsystem:

The following steps explains the process of calculating impulse responses on an arbitrary segment of a system to be used in further analysis and comparisons with real life system.
1. Apply a unit-power/zero-phase impulse Sample with initial time zero to the input point (port) of the system or subsystem in question then flag this sample as unprocessed.
2. Simulate the output of the unit power impulse sample on the System model by tracing the effect of this sample throughout different system interactions. The result is a new set of impulse samples at different points of calculations in the system.
3. A counter keeps track of how many interactions related to a
4. This will generate new set of output impulses at different output points in the system the device impulse responses and generate new unprocessed impulses in the output signals of all device ports, and flag the input samples as processed, and increment the reflection and transfer counters of these processed samples at this step. Repeat this step for all samples marked as unprocessed at every point in the system including previous output points.
5. For every unprocessed sample in the system outputted from any device port, apply the connection (cable) response, and add new samples as inputs to the devices at the other side of the cable, then flag the processed samples as processed.
6. Repeat steps 3 and 4 until all samples are either processed or reached the tracing threshold limits sample tracing conditions by
6a. either reaching a maximum reflection or
6b. Maximum transfer counts or a
6c. Minimum power threshold or
6d. any additional conditions.
7. The samples stored for every point or port represents the impulse response at the respective points for the unity sample signal applied at the initial point sample.

FIG. 19 shows a system impulse response generation process.

4.1.2. Reconstruction of Impulse Responses From Real Life Measurements:

To measure an impulse response of a subsystem in real life, one needs to inject a pulse signal into the first point and monitor the output on the second point with proper signal generation and measurement tools. However, this is not a practical approach since impulse signal is theoretical and requires infinite bandwidth which is not the case with band limited systems.

Alternative ways to do so is by injecting a specially designed band limited signal into the first point and measuring and storing the time domain results from the second point. Devices capable of measuring impulse responses of a system are referred to as Channel Sounders. Channel sounders apply different techniques and methods in both time and frequency domain to measure the CIR through different signal transfer media. One way of measuring the impulse response between two points of a subsystem described in 4.1.1 is by using complex measurement data obtained from a band limited time domain measurement. Readings can be deconvoluted by dividing its Fast Fourier transform (FFT) by the FFT of the spreading signal then calculating the inverse IFFT of the result.

4.1.3. Creating As-builts and Updating Digital Twins Based on Measurements Data

Since the reconstructed system from measured subsystems described in 4.1.24.1.2 should share the same design parameters with the designed system and can be compared. The time delay of every sample in 4.1.1 can be analyzed to extract cable lengths and device delays then compared to what was extracted from measurements on all the cables and devices in the sample path. The amplitude of the sample can also be analyzed and compared to measurements to extract cable and device losses.

With the knowledge of the specifications and limitation of the Testing Device such as dynamic range, sensitivity and time resolution, Analysis done on the channel impulse response on each point of the system, the simulation can advise the maximum depth of aggregated subsystem that can be analyzed without ambiguity when decomposing the aggregated measurement to map to individual measurements.

By comparing 4.1.1 and 4.1.24.1.14.1.2 responses at each expected sample time and around it we can 1. Deduce as-built system parameters.
2. Identify faults in installation post testing or during the test.

This will allow us to fully capture the actual as-built of a fully deployed system in view of the simulated results obtained by method described in 4.1.1.

4.1.4. Design Support and Design Release Comparisons.

In the Design phase before committing to its final release, designers may want to do Propagation tests on the environment to calibrate the propagation parameters. Simulation of Channel impulse responses for specific external physical structure and transmitter-receiver configuration while designing helps to calibrate the propagation parameters and wall losses before committing to a design. Test points and locations are suggested by the software after analysis of the 3D structure to devise the lowest number of points to capture all propagation losses inside the building structure in hand.

4.2. Extracting Infrastructure As-Builts From Standard Measurements

FIG. 20 shows a passive DAS or high-power DAS.

FIG. 21 shows testing points for sweep tests.

In a standard sweep test, all cable segments should be tested for reflections while far ends are terminated with a matched load. If a cable segment is intended to connect to an antenna at the end, antenna can be part of the measurement to get the overall response including the antenna effect.

Distance to fault measurements can also be part of these measurements for troubleshooting if the device under test did not pass the required operational limits.

Introducing distance to fault measurement DTF as an additional test for all cables with an open, short and matched far-end will produce an accurate measure of the cable length that can be used to update the as-built value of this cable.

Measurements on test points TP01 to TP08 provides information about the respective single cable segment. With the knowledge of the final construction of the cables and how they are connected to in the design, a super position of all data in a particular mathematical model appropriate to the required KPIs will be sufficient to extract certain physical data of the resultant system.

FIG. 22 shows distance to fault measurement expressed as return loss versus distance. Sample measurements can be seen in FIG. 22's distance to fault measurement expressed as Return loss with an open or short termination. Marker on the high reflection point at the end of the cable shows the exact cable length.

FIG. 23 shows distance to fault performed on a completed DAS system.

4.3. Extracting Infrastructure As-Builts From Non-Standard Measurements.

Reflection measurements on the root of the DAS system, or other types of systems, after connecting all components serve as a final check to verify there is no reflected signals that can damage the transmitters.

Measuring a distance to fault while doing the reflection measurement on a full system is not a standard procedure and not the intended use of a DTF measurement. Since reflected signals going back to the testing device are interpreted in the time domain and power domain based on knowledge of the specific cable under test type and its nominal loss with a clear assumption that the signal does not branch. As an example, in FIG. 21, DTF measurement at TP9 represents cable L12 up to the 4-way splitter. Then shows the reflections of the input and output ports connectors, followed by a combined reading of all the four branches and cables 6, 7, 8 and 9.

Such DTF measurement can be useful when a method exists that can eliminate or reduce ambiguity of a combined reading to extract as much information as possible. Subject to the specific parameters of a test device, the same method can be extended to a deeper branching network to extract all quality parameters and installation information. This will allow a single measurement on a DAS root performed by the testing device to be used to capture the required information. The testing circuit can also be embedded into the actual signal source to perform this job periodically and report quality and infrastructure changes.

FIG. 23 shows an example of a DTF on a full DAS system. DTF on a root of a DAS is one example of non-standard measurements that can reduce the measurement effort when combined with a method and system to interpret the information from the given combined information.

Other examples of nonstandard measurements are Channel impulse responses performed on a combined das root using channel sounders, Vector Network Analysis with phase information and many other non-standard measurements can be used to eliminate ambiguity and enhance testing speed.

4.3.1. Testing Plan With Reduced Number of Testing Points for as Built Creation.

The measurement system and software will analyze the design and the testing tool specification to devise a minimal testing plan where a full system measurement is performed in addition to possible additional points to eliminate ambiguities that are impossible to eliminate by post processing.

A complete equivalent RF mathematical model with all unknowns is created for the system to be tested where each element in the DAS design is replaced with its equivalent RF model parameters and unknowns. The system model is then analyzed for ambiguities and conflicts to provide end user with a testing plan that is lower in the number of testing points than standard plan, however, can still be used to provide means of extracting full As-built parameters. Complementary to the plan is the production of all possible combinations of test results that can be produced as a result of all combinations of expected installation faults and errors such bad terminations, lose connection, swapped tappers, and others. These simulated combinations are used in the process of comparison to the real measurements performed on the system or any of its subsystems.

4.4. Testing Plan With Reduced Number of Points for Installation Troubleshooting Performing analysis on the measurement plan described earlier is considered a post processing task for design parameters extraction. To extend the usability of the test plan to decision maker on site while doing the test, a live assessment capability should be provided to the technician performing the tests to avoid doing further tests before fixing the faults. The testing plan will be based on the knowledge of the design with a Decision tree implementation that reduces the testing points to a minimum as low as a single test verify the quality of the full system.

A testing device capable of performing Time domain reflectometry analysis, including a full CIR, should be used with a storage unit and a processor to store the full Design of the full system, perform analysis on the design and advise the user with the step by step procedure through the decision tree. The testing devise will analyze the design and create the equivalent RF mathematical model of the system and advise the exact measurement points required to capture the full design parameters. It will also create a custom pass-fail limit function with distance curve for the reflection measurement that accounts for all the different components measured in that testing point unlike the standard pass fail fixed value limit line that is horizontal in the case with single segment measurement.

The technician will be able to select the intended testing point and get an updated limit line displayed on the testing device and warnings on points where the measurements fail. If the measurement fails corresponding to a point in distance (time) with multiple possible devices contributing to this point. The user will be presented with the next testing points on the Design display that will clear the ambiguity. All of this while maintaining lower number of measurements than they would in a standard measurement procedure while capturing also any changes that might occur on the network while connecting it.

It's worth mentioning that some slight design modifications can be advised to eliminate ambiguity while testing. For example, a four-way splitting device is usually used with a jumper cable before connecting it to the cable segment of the DAS. These four jumpers of the output can have distinguishable lengths instead of fixed lengths to clearly identify each cable contribution.

FIG. 24 shows system distance to fault measurement expressed as return loss versus distance with limit lines or limit function.

FIG. 25 shows a DAS design.

FIG. 26 shows an original DAS branch.

FIG. 27 shows testing being performed on the cable between SP 01 and Antenna 01.

FIG. 28 shows DAS sub network connected to testing device.

4.5. Buildings' Physical Structure Signature Simulation, Collection, and Comparison Being able to detect such changes on the 3D structure of the building and reflect it to a live digital twin helps optimizing the system parameters to accommodate expected requirements and many other applications that can trigger based on 3D structure change of the building. This is done with the aid of a 3D digital twin of the building structure and simulations of the signature.

Permanent Building Physical structure can change in cases such as renovation, repartitioning of building space (Adding partitions to make more closed rooms from the same space), Removing partitions to make larger open space, etc. such changes affect the original design of the system and hence affects it outputs. Adding more walls reduces the signal propagation distance and affects end user experience.

Temporary Structure changes can be seen in hotels and convention centers where a very large hall can be adjusted as need be to accommodate different space requirement by deploying a movable partition system, for example, a large ballroom can be converted to three smaller event rooms. Different Quality of Service cases can be programmed in the system and used with different structures once a change is detected. For example, improvement on data traffic capacity can be made as a benefit of additional RF isolation by deploying more RF sectors dynamically.

Detecting the temporary change on the physical building structure is also key to maintaining indoor positioning (localization) system performance. Lookup data based can be dynamically adjusted and regenerated based on the active building structure.

Several techniques can be used utilizing the same systems or utilizing other systems coexisting within the same physical location to capture physical structure changes.

The following subsections list some of these techniques.

4.5.1. Electromagnetic Signature

Base line RF signature of a building can be performed post deployment to capture the baseline RF signature of the building structure as it is seen and interacted with by the installed system.

The installed system will have a Transmit and Receive capability where a special signal is transmitted from a single or multiple Transmitters and Received via single or multiple receivers where the signals can be detected.

RF signal characteristics is recorded at each reception point with the known Transmit configuration and all possible combinations then stored in the storage units attached to the system.

The system continuously or periodically performs the same procedure, or a slightly different one, to create this signature and alerts once these signatures are change. Analyzing the different combination of the changed signature transmitters and receivers the system can identify the area of the change, furthermore, with deep analysis of the simulated signatures of possible changes, automatic prediction of actual change can be done, i.e. Certain wall has been removed, and so forth.

The change on the signature can also indicate planned or unplanned changes on the physical location of the transmitter.

4.5.1.1. Overall Signature of the System Including All External Interactions

A signature can be obtained using any combination of signal paths with any combination of receivers when creating the baseline signature. The same configuration should be used when comparing and examining changes on the system or external environment. Examples of some of these combinations are:

1. Multiple Input and Multiple output Paths for Transmit and Receive for systems with complete different layers of Transmit and Receive.
2. Tx Path for transmit and RX path for reception.
3. A Passive DAS with Isolators to isolate forward and reflected signals.
4. Active DAS
5. Any of the above system Aided with Frequency shifting repeating devices anchored in known locations to shift the signal back to the system on a different frequency The generated signature on the fully deployed system or subsystem will produce a full signature that includes the effect of both the system and the external environment.

4.5.1.2. Isolating System and External Environment Signatures.

System only signature can be generated with the knowledge of the system parameters verified by the measurements and methods described earlier. The system and the overall signatures can then be used to derive an isolated signature of the external environment without any effect of the system. This signature can be used to model and visualize the external environment to detect any relative or absolute changes.

4.5.2. Optical LiDAR.

Light detection and ranging (LIDAR) is a special case of Electromagnetic signature and follows the same description of the previous point.

4.5.3. Acoustic Signature

Same methodology can be applied to a system that can emit acoustic waves or augmented another collocated system that does transmit and receive acoustic signals. The 3D digital twin of the physical structure should have the acoustic parameters of the materials as opposed to the electrical and electromagnetic parameters in the previous cases.

4.6. Capturing Systems Output With Accurate Location Reference.

To be able to close the feedback loop, an actual measure of the system's intended output should be collected with adequate location logging. The location logging accuracy is decided by the type of system and the nature of the output. A testing device with an attached or integrated inertial and LIDAR sensors can be used to reduce the location error. Testing device can also have additional acoustic sensors to add more accuracy to the location measurement. The testing device with a knowledge of the physical infrastructure can automatically log the location and the measurements then produce a complete log with measurements versus location and timestamps.

The readings can be then imported into the Digital Twin to be further processed for propagation model calibration.

4.7. Detection of Physical Relocation of System Components.

In some cases, changes on the system and its performance can occur due to unplanned and unintentional relocation of system components that cannot be detected otherwise via other methods. In such cases, utilization of inertial sensors to detect vandalism or movements beyond what the system allows is key to maintain digital twin accuracy. Indoor positioning data based on fingerprinting technique is one example of such data that could be invalidated.

Updates to digital twin based on the feedback of physical movement sensors can be done automatically or manually by dispatching a service technician to examine and capture the actual physical changes to recover invalidated data. Another aspect of movement detection is to flag the existing digital twin data as invalid until further examination by technicians. Physical relocation can also be detected by methods of physical structure signature change since a change in location will essentially change the signature observed by these system components.

5. Detailed Application of Digital Twins for Inbuilding Systems.

Historically, In-building telecommunications systems referred to wireless cellular equipment that provide coverage inside a building through equipment installed within the same buildings such as Distributed Antenna Systems, Small-cells and Wi-Fi® LAN. In-building coverage systems can now be extended to cover other systems existing in a building such as Mesh network, Low Voltage Networks, and others.

As an example of a live digital twin applications for telecommunications systems is active or passive distributed antenna systems used to provide indoor or outdoor coverage. A DAS system can be installed in high-profile venues like airports and stadiums where service window is limited due to access restriction and approvals difficulties. Such system is expected to support the high telecom demand at any given time and have a very high availability. Signal coverage levels amongst other KPIs should be maintained to guarantee good end-user experience.

In a standard process of developing an indoor Distributed antenna system, the developer may build a 3D model of the venue and use Computer Aided Design RF tools to estimate cable lengths and routes of DAS. RF design tools can be used to calculate the RF output level of Antennas and use this to predict coverage in the targeted output areas. In some cases, the designer may perform indoor coverage test in the actual propagation environment, usually referred to as Continues Wave Tests, to compare the predictions against real life measured data and to calibrate wall losses and propagation parameters before committing to the design.

During and after deployment the system integrator performs several tests to verify quality and build initial baseline of the RF coverage to get acceptance.

A digital twin system can provide the tool whereby measurements are interpreted automatically with no dependency on technicians' skills. Eliminating the variation of knowledge effect on outcome. Making outcome more consistent and faster.

Over the time few intentional physical changes might be introduced on the system such as configuration updates or optimizations. In many cases these changes do not get documented in a proper usable way.

These following subsections show some examples of the Digital twin applications at different phases of a system lifecycle.

5.1. During System Construction.

With the gradual collection of Data During Construction phase of the system, some systemic deviations of deployment from design can be extracted from measurements and Flagged before a full project is completed with the common faults. Initial measurements collected from the installed segments and subsystems can be analyzed for important trends.

5.1.1. Quantity Deviation Detection.

Being able to extract cable lengths from measurements allows the construction manager to have quick feedback with a sample of deployment completed. For example, if all cables installed and tested on one floor out of 30 story building show a constant percentage increase in their length, this indicates a common scale setting error that can be prevented and will automatically trigger a design review alarm for designers to analyze root cause of such error. Early-stage detection of these deviation help complete the final acceptance of the system properly.

5.1.2. Reduced Measurements Plans.

Incorporating design digital twins into test and measurement devices allow for complex analysis of combined measurements that can be used in reducing the number of measurements required to verify construction quality.

5.1.3. Capture Technician Mistakes.

Additional benefit of digital twins incorporation into T&M devices is the ability to capture more details that would have never been possible when measuring individual cable segments such as the connector fastening quality.

5.2. Post Construction Complete.

5.2.1. Initial Baseline Digital Twin Creation of the Deployed System

Baseline digital twin is very important to capture the final parameters of the deployment and compare it to the design. The design and deployment process can now be Modeled and analyzed for Trends and KPIs and compared to similar building types. Trends such as Quantity changes over different stages of designs ending up with the actual deployed quantities can help businesses Provide budgetary estimates based on previously modeled buildings.

5.2.2. Initial Physical Structure Baseline of the Building

A baseline signature can be generated that characterizes the specific building structure where the system is deployed.

5.3. Live Digital Twins and System Monitoring 5.3.1. System Configuration Changes Detection of any intentional or non-intentional changes on the physical deployment of the system or any parameters in the configuration. The changes can be reflected on the digital twin and desired output twin is updated to reflect the anticipated effect. Human operator can make an informed decision of when and how to rectify the problem knowing the actual degree of degradation. The process of alarming human operator and suggesting remedy can also be done via artificial intelligence based on previous and similar cases. Example of some of these detectable changes are based on continues injection and monitoring of test signals outside communication band of the connectivity system or part of the communications itself. Digital twin gathers and analyzes all input types and act on them according to the planned and programmed procedure.

5.3.2. System Component Location Change Detection and Updates

In cases where a system component relocation affects the desired output, measures can be taken to continuously monitor these components for movement or relocation. The new locations, if obtainable can be used to reevaluate the desired-output-twin and do the necessary configuration changes automatically. A good example of updates based on location change detection is the update of positioning lookup data based on changes of anchors or transmitter locations.

5.3.3. Building Structure Change Detection

Detecting the changes in building physical structure, however planned or unplanned, helps in adjusting the system parameters to accommodate the new configuration. Such as providing a higher traffic or quality of service to areas where it is required with different coverage configurations. Stadiums and Conference centers are examples of venues where planned changes require different configuration and system parameters such as sectorizations and coverage levels.

5.4. Future Upgrades Planning

Planning minor or major modifications on an existing system to upgrade or fix an existing problem requires careful study of different combinations of the existing sub systems with newly introduced subsystems. Future upgrades can be only planned perfectly if existing digital twins are up to date with all the changes on the physical system. A snapshot of planned digital twin can be used to compare its results with the existing digital twin and evaluate the feasibility of such an upgrade with minimum design changes.

5.5. Resilient Designs and Redundancy Analysis

For Critical communication systems, a Resilient System is designed and configured to have maximum usability with significant system outage. Many methods and techniques can be applied to achieve such configuration such as interleaved coverage. Actual effect of system partial outage can be analyzed using the real-life values stored in the digital twin with application of future random or calculated outage scenarios like Single points of failure analysis considering meantime between failures of individual type of devices in the system. Each of the outage scenarios can be analyzed to devise the recovery plans for each possible scenario, either automated, or with human interaction. The recovery plans advise the required hardware spare parts to replace and recover from the outage scenario and is used to statistically calculate the minimum spare parts required to solve a certain availability percentage.

The Live Digital twin can keep updating outage expectations and the required recovery procedures and hardware spare parts with the feedback and statistics of actual mean time between failures extrapolated statistically from the operations of the specific system.

Three further points are discussed below:

1. Wireless Through wall pose detection paper and the limitations of this methods and how we can solve this with Specially designed DAS.
2. Detecting physical changes in environment.
3. Training Deep learning model on interpreting environment using 3D models and Digital Twin.

While researchers have established that it's possible to detect human pose using RF signals either directly or through wall. This research is based on direct signal transmitted and received via multiple individual transceivers dealing with the propagation through Air only or through few walls.

The core concept is similar to RADAR, to Transmit special signals and measure the reflected signatures to correlate them with known object types and Human poses and to train Deep learning models. Inputs of training data is comprised of Camera captured pictures with corresponding RF Readings This method can have some limitations as follows.

1. Signal Quality and Variability: One major challenge in using radio signals for through-wall human pose estimation is the variability and quality of the signals. Walls and other obstacles can cause attenuation, reflection, diffraction, and scattering of radio signals, which can significantly degrade the quality of the data used for pose estimation.

2. Environmental Interference: The presence of various materials and objects in the environment can interfere with the radio signals, introducing noise and making it difficult to isolate the signals reflecting off the human body from other reflections.

3. Multipath Propagation: Radio signals can take multiple paths to reach the receiver, including bouncing off walls and objects. This multipath propagation can create complex patterns that are difficult to interpret accurately for pose estimation.

4. Resolution Limitations: The spatial resolution of radio frequency signals is generally lower than that of optical devices like cameras. This lower resolution can limit the detail and accuracy of the estimated poses, especially for small or subtle movements.

5. Generalization across Environments: The effectiveness of RF-based pose estimation methods might vary significantly across different environments due to variations in wall materials, room sizes, and the presence of furniture and other objects. Developing a system that generalizes well across different settings is a significant challenge.

6. Deployment and Calibration: Deploying such systems in real-world scenarios might require extensive calibration to account for the unique characteristics of each environment, which can be time-consuming and limit scalability.

Using active or passive DAS infrastructure for the same purpose imposes new challenges with the addition of a new layer of propagation medium with its own characteristics. The DAS channel contributes to the signal with attributes such as adding propagation delays, increase noise levels, multipath effect, and reflections within the DAS network not to mention limiting the number of transceivers to one transceiver transmitting and receiving delayed version of the signal through different antennas distributed inside a building.

Despite the additional complexity, with the right processing system and method, all of these effects can be accounted for to leverage the DAS in such applications and to allow RF signal to be used in a radar-like system over the DAS.

A complex calculation needs to be carried out to untangle and decompose the signal components reflecting from the objects and environment covered by the DAS to produce a mapping of Reflected RF signature and both the location of this reflection and type of Objects.

Detecting physical changes in the environment. To be able to detect objects using DAS, the DAS should pass through a unique design process for positioning and detectability then creation of as-built baseline digital twin to be able to digitally model the internal DAS and all external interactions.

DAS Design Phase:

DAS should be designed to be both able to locate wireless transmitters from the Network Side and guarantee the detection of the smallest desired objects.

Design for positioning optimizations.

DAS to be designed with the concept of DAS optimized for indoor positioning where DAS is designed in a manner that allows time domain analysis of the signal propagation time and roundtrip time and Channel impulse responses to be correlated to a unique area of interest within a building and avoid location ambiguity. (as explained by previous patents)

Design for environment changes detection:

With the knowledge of the following:

Limitations and dynamic ranges of the Wireless Transceivers (noise floor and saturation points, and others), The particulars of a given 3D building model, The wireless RF losses of the building material.

A proposed DAS design and cable routing configuration.

RF signature and Reflection signature of objects of interest (Human movement, Partition modifications, and others.

The Software analyses the losses, reflections intrinsic to the DAS system and over the air of the propagation environment to consider the limitation effects of DAS on the weakest detected object signature. This in turns is used to determine if a DAS system needs to be redesigned with more transceivers to guarantee detection.

The software highlight and suggests modifications on DAS design to guarantee the detectability of the smallest object and changes required by the Application. This can be in the form of splitting DAS network to smaller networks with more transceivers or using a different transceiver with higher sensitivity. Or positioning more antenna in a given areas to capture signal.

For example, a moving shopping cart will produce a certain RF signal reflection signature. The software calculates the noise floor of the Wireless System including all the reflections and losses attributed to the environment and deducts the noise floor above which the shopping cart signature can be identified accurately and scans the design and environment for gaps of detectability of such object. Complex Statistical and yield analysis are applied to include different interactions with other moving objects such but not limited to Monte-Carlo analysis or Discrete optimization.

Different objects will have different reflected RF signature. A metal rifle or a gun will have a different reflection signature with probably a smaller power levels that might not be detected with a system designed for detection of a larger object as the wireless signal measured might be received well below the noise floor.

Creation of a DAS as-built baseline digital-twin (described in this patent application):

1. After the designed system has been deployed. An accurate Create a Baseline of the DAS system is needed to guarantee the proper processing of signals.

2. This accurate as built should document in a digital twin the location of all antenna, the 3D model of environment, length of cables. Measured base line reflections and all component that can affect the calculations.

3. This phase is basically the infusion of multiple real life information sources related to DAS and the building before being occupied.

4. Signal interactions maps intrinsic to the DAS systems and Isolated from any external environment interaction.

4a. Through combining DAS testing in Time and Power domain using a channel sounder or a DTF testing results at all levels of the DAS to build a complete picture of the Signal interactions at every point in the DAS 4a1. This can be done with All antennas disconnected and ports shorted or kept open.

4b. Repeating the same with Antennas connected to the system and signal interacting with an empty environment (e.g., no people moving) to analyse the contribution of the external environment.

Deep learning training using Digital Twin. Once an as-built digital twin has been created and verified, it can be used to generate training Data to feed the machine learning models. The digital twin is able to generate training data for cases beyond what can be generated in real life to account for emergency situations, active shooter incidents, hidden metal objects or bombs, crowd movements, and others.

In an implementation, a method includes: positioning a first antenna at a first location of a first section inside a building; positioning a second antenna at a second location of the first section inside the building, where the first antenna is connected in series to the second antenna to form a first antenna branch, a first end of the first antenna branch is connected to the first antenna, and a second end of the first antenna branch is connected to the second antenna; positioning a third antenna at a third location of a second section inside a building; and positioning a fourth antenna at a fourth location of the second section inside the building, where the third antenna is connected in series to the fourth antenna to form a second antenna branch, a first end of the second antenna branch is connected to the third antenna, and a second end of the second antenna branch is connected to the fourth antenna.

The method further includes connecting a first input of a channel controller to the first end of the first antenna branch; connecting a second input of a channel controller to the second end of the second antenna branch, where the channel controller includes a first configurable delay between the first input to one or more outputs of the channel controller, a second configurable delay between the second input to the one or more outputs, and the first configurable delay is selected to be different from the second configurable delay, and the channel controller produces a test signal outside a communication band to monitor any changes in a cable length, and the channel controller compares a received value with stored baseline values of cable lengths to trigger an alarm when these values are changed for connected signal paths; and receiving the one or more outputs of the channel controller at a receiver circuit, where the one or more outputs includes a signal from the first antenna branch including the first configurable delay and a signal from the second antenna branch including the second configurable delay.

The method further includes providing (e.g., calculating, generating, measuring, simulating, or other) an expected system response for a combination of the first, second, third, and fourth antennas; for the expected system response, generating a limit function for the expected system response; and receiving an actual system response of the combination of the first, second, third, and fourth antennas; and comparing the actual system response to the expected system response and identifying the actual system response of the first, second, third, or fourth antenna differ from the generated limit function by more than a threshold value.

In various implementations, the receiving an actual system response includes measuring the actual system response of the combination of the first, second, third, and fourth antennas. The measuring can include sending a special signal any one or combination of the first, second, third, and fourth antennas; and receiving a reflection of the special signal from any one or combination of the first, second, third, and fourth antennas where the special signal was sent.

The method can further include based on the received first configurable delay, determining a signal is from the first antenna at the first location inside the building; and based on the received second configurable delay, determining a signal is from the third antenna at the third location inside the building. The first end of the first antenna branch can be physically closer to the channel controller than the second end of the first antenna branch, and the first end of the second antenna branch is physically closer to the channel controller than the second end of the second antenna branch.

The first antenna branch can include a fifth antenna connected in series between the first and second antennas, and the second antenna branch includes a sixth antenna connected in series between the third and fourth antennas. The first signal and second signal can be radio frequency or RF signals. The first configurable delay and second configurable delay may configured by a user or system administrator. The first configurable delay and second configurable delay can be created without introducing a physical delay via varying cable lengths. The first configurable delay and second configurable delay can be created by way of a digital delay by way of using at least one of a digital signal processor (DSP) integrated circuit or field programmable gate array (FPGA) integrated circuit.

The first configurable delay and the second configurable delay may not minimize a multipath effect between the first antenna and the second antenna. The determining a signal is from the first antenna at the first location inside the building can include based on the received first configurable delay, determining the signal is from the first antenna branch inside the building. The method can include: after determining the signal is from the first antenna branch based on the received first configurable delay, based on a delay between the first antenna and the second antenna, determining the signal is from the second antenna at the second location inside the building. The first configurable delay can be between the first input to a first output of the one or more outputs of the channel controller, and the second configurable delay can be between the second input to a second output of the one or more outputs of the channel controller.

In an implementation, a method includes: positioning a first antenna at a first location of a first section inside a building; positioning a second antenna at a second location of the first section inside the building, where the first antenna is connected in series to the second antenna to form a first antenna branch, a first end of the first antenna branch is connected to the first antenna, and a second end of the first antenna branch is connected to the second antenna; positioning a third antenna at a third location of a second section inside a building; and positioning a fourth antenna at a fourth location of the second section inside the building, where the third antenna is connected in series to the fourth antenna to form a second antenna branch, a first end of the second antenna branch is connected to the third antenna, and a second end of the second antenna branch is connected to the fourth antenna.

The method further includes connecting a first input of a channel controller to the first end of the first antenna branch; connecting a second input of a channel controller to the second end of the second antenna branch, where the channel controller includes a first configurable delay between the first input to one or more outputs of the channel controller, a second configurable delay between the second input to the one or more outputs, and the first configurable delay is selected to be different from the second configurable delay. The channel controller produces a test signal outside a communication band to monitor any changes in a cable length, and the channel controller compares a received value with stored baseline values of cable lengths to trigger an alarm when these values are changed for connected signal paths.

The method further includes receiving the one or more outputs of the channel controller at a receiver circuit, where the one or more outputs includes a signal from the first antenna branch including the first configurable delay and a signal from the second antenna branch including the second configurable delay; and based on reflections detected for the first antenna, second antenna, third antenna, or fourth antenna and received at the receiver circuit, detecting physical characteristics or changes in an environment associated with the first antenna, second antenna, third antenna, or fourth antenna.

In various implementations, the method can include generating a signal at the first antenna, second antenna, third antenna, or fourth antenna to assess the environment associated with the first antenna, second antenna, third antenna, or fourth antenna. The detected physical characteristics or changes in the environment can include at least one of a change in pose, movement, or position of a human being, change in position of an object or furniture in a vicinity of one or more associated antennas, an estimation of a number of human beings in a vicinity of one or more associated antennas, an estimation of a size of a room, or partitioning of a room.

The method can include training artificial intelligence models to determine reflected signatures that correlate them with known object types and human poses. The method can include using generative artificial intelligence and deep learning models to train a system determine special signals and associated reflected signatures that correlate them with known object types and human poses. The method can include training of artificial intelligence models including correlating human poses and locations of objects by cameras, microphones, or any other means that provides this input information.

An implementation can includes having arbitrary antenna positions and a distributed antenna system arrangement where no channel controller is present. Then providing system response for this distributed antenna system and measuring the actual system response to compare them for the sake of detecting deviations and anomalies of installations with less testing points. An implementation has only two antennas in distributed antenna system directly or through a channel controller. Aspects as described in this patent application can be applied to the above specific implementations. Further, aspects as described in this patent application can also be applied to types of systems other than wireless systems.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
positioning a first antenna at a first location of a first section inside a building;
positioning a second antenna at a second location of the first section inside the building, wherein the first antenna is coupled in series to the second antenna to form a first antenna branch, a first end of the first antenna branch is coupled to the first antenna, and a second end of the first antenna branch is coupled to the second antenna;
positioning a third antenna at a third location of a second section inside a building;
positioning a fourth antenna at a fourth location of the second section inside the building, wherein the third antenna is coupled in series to the fourth antenna to form a second antenna branch, a first end of the second antenna branch is coupled to the third antenna, and a second end of the second antenna branch is coupled to the fourth antenna;
coupling a first input of a channel controller to the first end of the first antenna branch;
coupling a second input of a channel controller to the second end of the second antenna branch, wherein the channel controller comprises a first configurable delay between the first input to one or more outputs of the channel controller, a second configurable delay between the second input to the one or more outputs, and the first configurable delay is selected to be different from the second configurable delay, and
the channel controller produces a test signal outside a communication band to monitor any changes in a cable length, and the channel controller compares a received value with stored baseline values of cable lengths to trigger an alarm when these values are changed for connected signal paths;
receiving the one or more outputs of the channel controller at a receiver circuit, wherein the one or more outputs comprise a signal from the first antenna branch including the first configurable delay and a signal from the second antenna branch including the second configurable delay;
providing an expected system response for a combination of the first, second, third, and fourth antennas;
for the expected system response, generating a limit function for the expected system response;
receiving an actual system response of the combination of the first, second, third, and fourth antennas; and
comparing the actual system response to the expected system response and identifying the actual system response of the first, second, third, or fourth antenna differ from the generated limit function by more than a threshold value.

2. The method of claim 1 wherein the receiving an actual system response comprises measuring the actual system response of the combination of the first, second, third, and fourth antennas, wherein the measuring comprises
sending a special signal from any one or combination of the first, second, third, and fourth antennas; and
receiving a reflection of the special signal from any one or combination of the first, second, third, and fourth antennas where the special signal was sent.

3. The method of claim 1 comprising:
based on the received first configurable delay, determining a signal is from the first antenna at the first location inside the building; and
based on the received second configurable delay, determining a signal is from the third antenna at the third location inside the building.

4. The method of claim 1 wherein the first end of the first antenna branch is physically closer to the channel controller than the second end of the first antenna branch, and the first end of the second antenna branch is physically closer to the channel controller than the second end of the second antenna branch.

5. The method of claim 1 wherein the first antenna branch comprises a fifth antenna coupled in series between the first and second antennas, and the second antenna branch comprises a sixth antenna coupled in series between the third and fourth antennas.

6. The method of claim 1 wherein the signal from the first antenna branch and the signal from the second antenna branch are radio frequency signals.

7. The method of claim 1 wherein the first configurable delay and second configurable delay are configured by a user.

8. The method of claim 1 wherein the first configurable delay and second configurable delay are created without introducing a physical delay via varying cable lengths.

9. The method of claim 1 wherein the first configurable delay and second configurable delay are created by way of a digital delay by way of using at least one of a digital signal processor integrated circuit or field programmable gate array integrated circuit.

10. The method of claim 1 wherein the first configurable delay and the second configurable delay do not minimize a multipath effect between the first antenna and the second antenna.

11. The method of claim 1 wherein the determining a signal is from the first antenna at the first location inside the building comprises based on the first configurable delay, determining the signal is from the first antenna branch inside the building.

12. The method of claim 11 comprising after determining the signal is from the first antenna branch based on the first configurable delay, based on a delay between the first antenna and the second antenna, determining the signal is from the second antenna at the second location inside the building.

13. The method of claim 1 wherein the first configurable delay is between the first input to a first output of the one or more outputs of the channel controller, and the second configurable delay is between the second input to a second output of the one or more outputs of the channel controller.

14. A method comprising:

positioning a first antenna at a first location of a first section inside a building;

positioning a second antenna at a second location of the first section inside the building, wherein the first antenna is coupled in series to the second antenna to form a first antenna branch, a first end of the first antenna branch is coupled to the first antenna, and a second end of the first antenna branch is coupled to the second antenna;

positioning a third antenna at a third location of a second section inside a building;

positioning a fourth antenna at a fourth location of the second section inside the building, wherein the third antenna is coupled in series to the fourth antenna to form a second antenna branch, a first end of the second antenna branch is coupled to the third antenna, and a second end of the second antenna branch is coupled to the fourth antenna;

coupling a first input of a channel controller to the first end of the first antenna branch;

coupling a second input of a channel controller to the second end of the second antenna branch, wherein the channel controller comprises a first configurable delay between the first input to one or more outputs of the channel controller, a second configurable delay between the second input to the one or more outputs, and the first configurable delay is selected to be different from the second configurable delay, and the channel controller produces a test signal outside a communication band to monitor any changes in a cable length, and the channel controller compares a received value with stored baseline values of cable lengths to trigger an alarm when these values are changed for connected signal paths;

receiving the one or more outputs of the channel controller at a receiver circuit, wherein the one or more outputs comprise a signal from the first antenna branch including the first configurable delay and a signal from the second antenna branch including the second configurable delay; and based on reflections detected for the first antenna, second antenna, third antenna, or fourth antenna and received at the receiver circuit, detecting physical characteristics or changes in an environment associated with the first antenna, second antenna, third antenna, or fourth antenna.

15. The method of claim 14 comprising:

generating a signal at the first antenna, second antenna, third antenna, or fourth antenna to assess the environment associated with the first antenna, second antenna, third antenna, or fourth antenna.

16. The method of claim 15 comprising:

training artificial intelligence models to determine reflected signatures that correlate them with known object types and human poses.

17. The method of claim 15 comprising:

using generative artificial intelligence and deep learning models to train a system to determine special signals and associated reflected signatures that correlate them with known object types and human poses.

18. The method of claim 15 comprising:

training of artificial intelligence models comprising correlating human poses and locations of objects by cameras, microphones, or any other means that provides this input information.

19. The method of claim 14 wherein the detected physical characteristics or changes in the environment comprises at least one of a change in pose, movement, or position of a human being, change in position of an object or furniture in a vicinity of one or more associated antennas, an estimation of a number of human beings in a vicinity of one or more associated antennas, an estimation of a size of a room, or partitioning of a room.

\* \* \* \* \*